US011182866B2

(12) United States Patent
Lee et al.

(10) Patent No.: US 11,182,866 B2
(45) Date of Patent: Nov. 23, 2021

(54) DIGITAL PROPERTY AUTHENTICATION AND MANAGEMENT SYSTEM

(71) Applicant: AON RISK SERVICES, INC. OF MARYLAND, New York, NY (US)

(72) Inventors: Lewis C. Lee, Spokane, WA (US); Daniel Crouse, Seattle, WA (US); David Craig Andrews, Carnation, WA (US); Samuel Cameron Fleming, Spokane, WA (US)

(73) Assignee: AON RISK SERVICES, INC. OF MARYLAND, New York, NY (US)

( * ) Notice: Subject to any disclaimer, the term of this patent is extended or adjusted under 35 U.S.C. 154(b) by 346 days.

(21) Appl. No.: 16/280,766

(22) Filed: Feb. 20, 2019

(65) Prior Publication Data

US 2020/0265534 A1 Aug. 20, 2020

(51) Int. Cl.
*G06F 21/00* (2013.01)
*G06Q 50/18* (2012.01)
*H04L 9/06* (2006.01)
*G06F 21/62* (2013.01)
*G06F 21/60* (2013.01)

(52) U.S. Cl.
CPC ......... *G06Q 50/184* (2013.01); *G06F 21/602* (2013.01); *G06F 21/6218* (2013.01); *H04L 9/0637* (2013.01); *H04L 2209/38* (2013.01)

(58) Field of Classification Search
CPC . G06Q 50/184; H04L 9/0637; H04L 2209/38; H04L 63/12; H04L 63/102; H04L 9/3239; G06F 21/6218; G06F 21/602; G06F 21/64; G06F 21/6209
See application file for complete search history.

(56) References Cited

U.S. PATENT DOCUMENTS

| 7,343,310 | B1 | 3/2008 | Stender |
| 9,449,080 | B1 | 9/2016 | Zhang |
| 10,396,985 | B1* | 8/2019 | Nagelberg ............ H04L 9/0866 |
| 10,454,677 | B1* | 10/2019 | Nagelberg ............ H04L 9/0643 |
| 10,762,114 | B1 | 9/2020 | Annunziata et al. |
| 2003/0097282 | A1 | 5/2003 | Guse et al. |
| 2005/0228684 | A1 | 10/2005 | Pogodin et al. |
| 2006/0288267 | A1* | 12/2006 | DeSpain ................. G06F 40/18 715/212 |

(Continued)

FOREIGN PATENT DOCUMENTS

WO    WO2017145019    8/2017

OTHER PUBLICATIONS

PCT Search Report, and Written Opinion dated May 14, 2020 for PCT Application No. PCT/US2020/018999, 17 pages.

(Continued)

*Primary Examiner* — Mahfuzur Rahman
(74) *Attorney, Agent, or Firm* — Lee & Hayes, P.C.

(57) ABSTRACT

Systems and methods for digital property authentication and management are disclosed. A document representing a trade secret may be requested to be registered with a trade secret registry. A document obfuscation value corresponding to the document may be generated and may be registered with a blockchain. A record of the registration may be generated for the trade secret registry. The registry may be searchable and/or offer functionality such as valuation, insurance provision, and/or verification, among other benefits and functionalities.

17 Claims, 23 Drawing Sheets

(56) References Cited

U.S. PATENT DOCUMENTS

| | | | |
|---|---|---|---|
| 2014/0164262 A1 | 6/2014 | Graham | |
| 2015/0248391 A1 | 9/2015 | Watanabe | |
| 2016/0226976 A1 | 8/2016 | Ciabarra, Jr. et al. | |
| 2017/0365021 A1 | 12/2017 | Stading et al. | |
| 2018/0096175 A1* | 4/2018 | Schmeling | G06Q 10/08 |
| 2018/0218342 A1 | 8/2018 | Lim et al. | |
| 2018/0218343 A1 | 8/2018 | Kolb et al. | |
| 2018/0227131 A1 | 8/2018 | Ebrahimi et al. | |
| 2018/0307859 A1 | 10/2018 | LaFever et al. | |
| 2019/0182047 A1* | 6/2019 | Andreina | G06F 21/6281 |
| 2019/0280856 A1* | 9/2019 | Yeap | G06Q 50/184 |
| 2020/0186354 A1 | 6/2020 | Balinsky et al. | |
| 2020/0213329 A1* | 7/2020 | Simons | H04L 9/3226 |
| 2020/0250778 A1 | 8/2020 | Spangenberg et al. | |
| 2020/0265530 A1 | 8/2020 | Lee et al. | |
| 2020/0265531 A1 | 8/2020 | Lee et al. | |
| 2020/0265532 A1 | 8/2020 | Lee et al. | |
| 2020/0265533 A1 | 8/2020 | Lee et al. | |

OTHER PUBLICATIONS

Shwarts, "Blockchain: Not Just A Platform For Cryptocurrency But A Potential Method For Protecting Trade Secrets And Other IP", Feb. 2018, Retrieved from the Internet: <URL https://www.jdsupra.com/legalnews/blockchain-not-just-a-platform-for-72978/>; 4 pages.

Skellem, "Blockchain in the Real World #4: Intellectual Property", Oct. 2018, Retrieved from the Internet: <URL https://medium.com/ecomi/blockchain-in-the-real-world-4-intellectual-property-ec311b0ff9d>; 12 pages.

Office Action for U.S. Appl. No. 16/280,703, dated Feb. 9, 2021, Lee, "Digital Property Authentication and Management System", 17 Pages.

Office Action for U.S. Appl. No. 16/280,622, dated Nov. 30, 2020, Lee, "Digital Property Authentication and Management System", 46 Pages.

Office Action for U.S. Appl. No. 16/280,703, dated May 18, 2021, Lee, "Digital Property Authentication and Management System", 23 pages.

Office Action for U.S. Appl. No. 16/280,622, dated Mar. 23, 2021, Lee, "Digital Property Authentication and Management System", 58 pages.

* cited by examiner

1500 ─↘

```
┌─────────────────────────────────────────────────────────────────────────┐
│ Cause display of user interface including first selectable portion      │
│ indicating option to register trade secret in trade secret registry     │
│ associated with remote system                                           │
│                                  1502                                   │
└─────────────────────────────────────────────────────────────────────────┘
                                    ↓
┌─────────────────────────────────────────────────────────────────────────┐
│ Receive, via user interface, first input indicating selection of first  │
│ selectable portion                                                      │
│                                  1504                                   │
└─────────────────────────────────────────────────────────────────────────┘
                                    ↓
┌─────────────────────────────────────────────────────────────────────────┐
│ Cause, based at least in part on receiving first input, display of      │
│ second selectable portion requesting identification of document to be   │
│ registered as trade secret                                              │
│                                  1506                                   │
└─────────────────────────────────────────────────────────────────────────┘
                                    ↓
┌─────────────────────────────────────────────────────────────────────────┐
│ Receive, utilizing second selectable portion of user interface, second  │
│ input identifying document                                              │
│                                  1508                                   │
└─────────────────────────────────────────────────────────────────────────┘
                                    ↓
┌─────────────────────────────────────────────────────────────────────────┐
│ Cause, based at least in part on second input, display of record        │
│ associated with trade secret registry, record indicating: that hash     │
│ value generated based at least in part on document has been registered  │
│ in association with trade secret registry; that cryptographic hash      │
│ value associated with block of blockchain has been registered in        │
│ association with trade secret registry; and time value associated with  │
│ at least one of generation of cryptographic hash value or generation    │
│ of record                                                               │
│                                  1510                                   │
└─────────────────────────────────────────────────────────────────────────┘
```

FIG. 15

DIGITAL PROPERTY AUTHENTICATION AND MANAGEMENT SYSTEM

BACKGROUND

Trade secrets are can be valuable assets to companies and individuals. However, unlike other forms of intellectual property, governmental registration and/or grant of trade secret rights is not offered. Described herein are improvements in technology and solutions to technical problems that can be used to, among other things, assist in the protection of trade secrets.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 15 illustrates a flow diagram of an example process associated with a user interface in accordance with a digital property authentication and management system.

DETAILED DESCRIPTION

Figure 1:
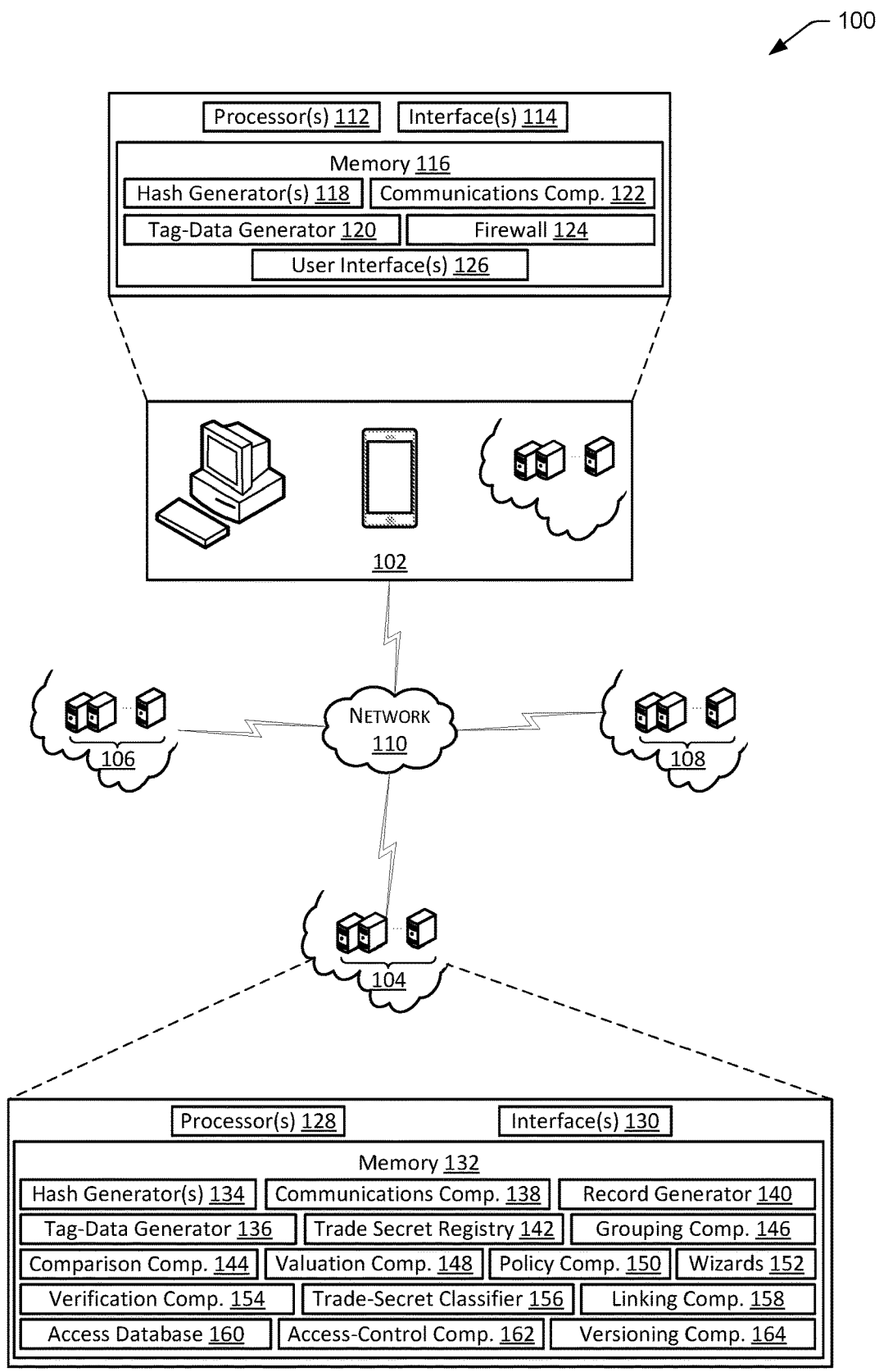
FIG. 1 illustrates a schematic diagram of an example environment for a digital property authentication and management system.

Systems and methods for digital property authentication and management are disclosed. Take, for example, a company or individual, described herein as an entity, that owns one or more intellectual property assets. While some of those intellectual property assets may be registerable by a governmental entity, such as patents and trademarks being applied for and issued by the United State Patent and Trademark Office or copyrights being registered by the United States Copyright Office, other types of intellectual property, such as trade secrets, may not be registerable by a governmental entity. Additionally, information that may not meet a particular (e.g., legal) definition of a trade secret, and/or may not meet multiple, disparate definitions of a trade secret, sometimes referred to as confidential information or know-how, may still be valuable to the entity. In these and other examples, a system that allows for the registration of such property (collectively referred to herein as "trade secret") in a way that establishes indicia of ownership, credibility of possession, or other information useful in assessing protecting, insuring, or enforcing such property would be beneficial to such entities.

The innovations described herein provide a digital property authentication and management system that, among other things, enables the registration of information, documents and/or other property, provides user interfaces for registration and management of such property, enables verification of registration and/or analysis of potentially misappropriated property, assists in asset valuation, assists in insurance provision, and utilizes data generated by and/or available to the system to increase functionality associated with the registered property.

For example, a client-side device and/or system, herein described as an electronic device, may include an application that enables a user of the device and/or system to provide input to the device. The input may indicate a document, for example, that represents or is used to describe a trade secret, and/or has been designated as a trade secret, and/or has been designated as a document of importance to the entity. The client-side device and/or system may include a obfuscation component that may receive data representing the document and may generate a document obfuscation value corresponding to the document. The document obfuscation value may include, for example, a string of numbers and/or letters and may be based at least in part on the content of the document and/or one or more information fields associated with the document. It should be noted that while document obfuscation value generation and use is described by way of example in this disclosure, one or more other forms of digital obfuscation may be utilized in addition to, or instead of, document obfuscation value generation. The digital obfuscation techniques may allow for repeatable production of output data given the same input data, such as the same document.

The client-side device and/or system may send, to a registry system, the document obfuscation value and, in examples, request data indicating a request to register, in association with the trade secret registry, the document obfuscation value. The registry system may receive the document obfuscation value and/or the request data and may initiate a process of registering the document obfuscation value in association with the trade secret registry. For example, the registry system may send the document obfuscation value and/or request data to a blockchain system managing one or more blockchains. In other examples, the client-side device may send the document obfuscation value and/or request data to the blockchain system, as described more fully elsewhere herein. In still other examples, the registry system and the client-side device may send instances of the document obfuscation value and/or the request data in parallel or near-parallel to the blockchain system. The request data may indicate a request to register the document obfuscation value and/or identifying information associated with the document obfuscation value and/or the document with the blockchain. The blockchain system may register the document obfuscation value and/or the other information described herein in association with a block of the blockchain. A cryptographic document obfuscation value may be generated by the registry system that may represent the block in the blockchain. Additionally, or alternatively, a time value may be determined that indicates a time and/or day at which the document obfuscation value and/or the other information described herein was registered with the blockchain. The blockchain system may then send the cryptographic document obfuscation value to the registry system associated with the trade secret registry. The blockchain system may additionally, or alternatively, send the cryptographic document obfuscation value to the client-side device, particularly in instances where the request data to register the document obfuscation value was received from the client-side device.

The registry system may generate a record in the trade secret registry. The record may include information associated with the trade secret. For example, the record may include data indicating an identifier of the record, a naming indicator associated with the trade secret, a description of the trade secret, a naming indicator associated with the document, one or more tags associated with the trade secret, a status indicator for the trade secret, the document obfuscation value, a block number associated with the block of the blockchain that the document obfuscation value is registered with, the cryptographic document obfuscation value, the time value, and/or one or more other types of data associated with the trade secret and/or registration of the trade secret, such as valuation, insurance policy information, versioning information, etc. The registry system, in examples, may generate confirmation data indicating that the record has been generated, and the confirmation data may be sent to the client-side device and/or system for display via a user interface.

Additionally, or alternatively, the registry system may be configured to identify, determine, and/or generate one or more indicia of nonpublication of a trade secret. For example, a user of the registry system may provide information and/or documentation indicating that the trade secret has not been published. In examples, the client-side device may be configured to analyze the document and/or information corresponding to the trade secret and may be configured to perform a search of publicly-available databases and/or resources, such as Internet browsing and/or searching resources to determine whether the information and/or document corresponding to the trade secret has been published. If the client-side device and/or the registry system determines that the trade secret has not been published, the registry system may record indicia of such nonpublication. These indicia may be utilized, in examples, for insurance application and/or provision and/or for legal means.

Additionally, or alternatively, the registry system may be configured to determine whether the document to be registered with the trade secret registry is unique with respect to other documents registered with the trade secret registry. For example, the registry system may compare the document obfuscation value to one or more other document obfuscation values representing other documents registered with the trade secret registry. If the document obfuscation value is the same as at least one other registered document obfuscation value, then the registry system may determine that the document is not unique. In other examples, a degree of similarity may be determined between the document obfuscation value and the registered document obfuscation values, and if the degree of similarity is greater than a threshold degree of similarity, the document may be determined to be not unique.

Additionally, or alternatively, the comparison of a to-be-registered document obfuscation value and registered document obfuscation values may be utilized to determine if documents associated with the trade secret registry are different versions of the same document, such as, for example, different versions of source code. For example, the registry system may determine that a degree of similarity between two document obfuscation values is greater than a threshold degree of similarity. Additionally, in examples, the registry system may determine that an entity identifier indicating the entity associated with the documents is the same. In these and other examples, the registry system may determine that the two documents are different versions of the same document. The registry system may provide an indication of this determination to the client-side device and/or system. Additionally, or alternatively, the registry system may generate a record for the to-be-registered document and may associate that record with the record for the registered document. A selectable link may be associated with the records such that, upon selection of the link via a user interface, the associated record may be displayed.

In examples, the functionality described herein may be provided, at least in part, via a user interface. The user interface may include one or more selectable portions that, when selected, may cause one or more processors to perform the operations described herein. For example, the user interface may include selectable portions indicating an option to register the trade secret in association with the trade secret registry, enabling a user to select and/or identify a document corresponding to the trade secret, enabling a user to view a record of the trade secret registry, enabling a user to acquire and/or view information associated with an insurance policy on the trade secret, enabling valuation of the trade secret, enabling input of text for tag data generation, enabling searching capabilities of records associated with the trade secret registry and/or records associated with the entity, enabling verification that a document is registered with respect to the trade secret registry, and/or displaying links and/or associations between records.

Additionally, or alternatively, the registry system may be configured to determine a value for a trade secret and/or record information relevant to such a valuation. For example, during and/or after registration of a trade secret with the trade secret registry, an option to determine a value for the trade secret and/or record information relevant to such a valuation may be displayed, such as via a user interface of the client-side device and/or system. One or more dialog boxes and/or input fields may be caused to be displayed, and the dialog boxes may request information associated with the trade secret to aid in valuation of the trade secret. Such information may include, for example, the type of trade secret, an importance of the trade secret to the entity, entity revenue and profit including particularly revenues and profits attributable to the entity's use of the trade secret, the development costs of the trade secret, entity value, date of trade secret creation, expected life of the trade secret, etc. Additionally, in examples, the input fields may include a request for supporting documents that include information that may be relevant to valuation of the trade secret. In these examples, the user may identify the supporting documents. A document obfuscation value may be generated for a given supporting document and/or the supporting document and/or the document obfuscation value may be registered in association with the blockchain. The record for the trade secret may include information associated with the supporting document, such as the corresponding document obfuscation value and/or the cryptographic document obfuscation value corresponding to the block in the blockchain where the supporting document is registered. The registry system may utilize some or all of this information to generate a value associated with the trade secret.

Additionally, or alternatively, the registry system may be configured to utilize access controls to restrict access to certain records and/or portions of records. For example, access-control data may be stored in association with the registry system. The access-control data may indicate who is authorized to view a given record and/or given information associated with a record. In these examples, a user, to access a record, may be required to authenticate the user's identity, such as by inputting a username and/or password, for example, and could be required to acknowledge and affirm the sensitive nature of the record and the user obligations associated with access. As such, the registry system may generate an access log that may indicate user identifiers for users that accessed a given record, a time value associated with access of the record, and/or what information was displayed and/or manipulated by the user. The access log may be utilized by the registry system to assist in maintaining confidentiality and/or secrecy of the trade secret. For example, alerts may be generated and/or sent when a record is accessed and/or when unusual activity is detected. In other examples, when a user leaves a company, the access record may be utilized to determine what sensitive information was viewed by the user and what confidentiality obligations the departing user should be reminded of. In other examples, such as when the trade secret is associated with an insurance policy, the access log may be utilized to satisfy one or more conditions of the insurance policy, such as, for example, periodic reminders about confidentiality to users that have accessed the record.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example architecture 100 for digital property authentication and management. The architecture 100 may include, for example, one or more client-side devices, also described herein as electronic devices 102, that allow clients to register and manage their trade secrets or other intangible or digital assets. The architecture 100 includes a first or trade secret registry system 104 associated with a trade secret registry that is remote from, but in communication with, the client-side electronic devices. The architecture 100 further includes a second or distributed ledger system 106 that is remote from, but in communication with, the client-side devices 102 and the trade secret registry 104. The distributed ledge system 106 utilizes blockchain technology to accept entries in a secure, verifiable manner, such as document obfuscation values associated with the trade secrets or other digital assets being registered by the trade secret registry. The architecture also has an insurer system 108, which may also be described herein as a third remote system associated with an insurer. The insurer system 108 may utilize information from the registry system 104 and/or the distributed-ledger system 106 to, for example, issue insurance policies associated with the trade secrets and/or other digital assets being registered by the trade secret registry. Some or all of the devices and systems may be configured to communicate with each other via a network 110.

The electronic devices 102 may include components such as, for example, one or more processors 112, one or more network interfaces 114, and/or memory 116. The memory 116 may include components such as, for example, one or more obfuscation component obfuscation components 118, a tag-data generator 120, a communications component 122, a firewall 124, and/or one or more user interfaces 126. As shown in FIG. 1, the electronic devices 102 may include, for example, a computing device, a mobile phone, a tablet, a laptop, and/or one or more servers. The components of the electronic device 102 will be described below by way of example. It should be understood that the example provided herein is illustrative, and should not be considered the exclusive example of the components of the electronic device 102.

By way of example, the user interface(s) 126 may include a selectable portion that, when selected, may enable identification of a document representing a trade secret. For example, the selectable portion and/or another portion of the user interface 126 may include text requesting that a user of the user interface 126 select the selectable portion to identify a document including information to be registered as a trade secret in association with the trade secret registry. The user may provide input to the electronic device 102 indicating the information and/or document to be registered as a trade secret. The input may include selection of a naming indicator for the document.

The obfuscation component 118 may receive data corresponding to the document, such as from one or more databases and/or other storage locations associated with the electronic device 102 and/or remote storage accessible by the electronic device 102. The obfuscation component 118 may then generate a document obfuscation value corresponding to the document. The obfuscation component 118 may also be described herein as a hash function, and may be configured to map data of an arbitrary size to data of a fixed size. The document obfuscation values may also be described herein as hash codes, digests, and/or hashes. The hash functions may utilize one or more algorithms to generate document obfuscation values. The algorithms may include, for example, trivial hash functions, perfect hashing, minimal perfect hashing, hashing uniformly distributed data, hashing data with other distributions, hashing variable-length data, special-purpose hash functions, rolling hashes, universal hashing, hashing with checksum functions, multiplicative hashing, hashing by nonlinear table lookup, efficient hashing of strings, and/or one or more other hashing algorithms. In general, the obfuscation component 118 may receive, as input, text data, image data, formatting data, and/or other data corresponding to the document, and may generate, as output, a document obfuscation value that corresponds to the input. In examples, the electronic device 102 may include multiple obfuscation components that each employ a different hashing algorithm. In these examples, each obfuscation component may output a different document obfuscation value for the same document.

The tag-data generator 120 may be configured to generate tag data associated with the document. For example, one or more input fields may be caused to be displayed via the user interface(s) 126. The input fields may include a request to "tag" or otherwise provide keywords for the document. For example, a document that corresponds to source code to operate a sewing machine may be associated with keywords such as "source code," "sewing," "sewing machine," "version 1.1.20," etc. A user of the electronic device 102 may input text corresponding to these tags and the tag-data generator 120 may utilize such input to generate the tag data. Additionally, or alternatively, the tag-data generator 120 may automatically generate tag data. For example, the tag-data generator 120 may analyze the document to be registered in association with the trade secret registry to identify keywords associated with the document. For example, the tag-data generator 120 may identify one or more fields of the document and/or values associated with those fields. By way of illustration, the tag-data generator 120 may identify a title field, a document-type field, one or more sections of the document, etc. The values, such as the text data, associated with these fields may be utilized to generate tags. Additionally, or alternatively, text data of the document may be analyzed to determine which words are commonly used in the document, with the user having the ability to review, edit and/or delete the determined words, e.g., to ensure that particularly sensitive terms (e.g., a material element of trade secret compound) are not further processed. These words may be identified as keywords and may be utilized to generate the tag data.

The communications component 122 may be configured to enable communications between the electronic device 102 and the other components of the architecture 100, such as the registry system registry system 104, the distributed-ledger system 106, and/or the insurer system 108. The communications component 122 may further generate data to be communicated and/or may format already-generated data for transfer to one or more of the remote systems. The communications component 122 may also be configured to receive data from one or more of the remote systems.

The firewall 124 may be configured to receive data from the communications component 122 and/or from one or more other components of the electronic device 102. The firewall 124 may be described as a network security system that may monitor and/or control incoming and outgoing data based on security rules. The security rules may indicate that the electronic device 102 is configured to send certain data to the registry system registry system 104, and/or the distributed-ledger system 106, and/or the insurer system 108. The security rules may also indicate that the electronic device 102 is configured to receive certain data from the registry system 104, and/or the distributed-ledger system 106, and/or the insurer system 108. By way of example, the security rules may indicate that the electronic device 102 is permitted to send document obfuscation values to the registry system 104, but is not permitted to send documents to the registry system 104. The firewall 124 may be utilized to control the distribution of sensitive information, particularly when the architecture 100 is being utilized to register confidential documents with the trade secret registry.

The registry system 104 may include components such as, for example, one or more processors 128, one or more network interfaces 130, and memory 132. The memory 132 may include components such as, for example, one or more obfuscation components 134, a tag-data generator 136, a communications component 138, a record generator 140, a trade secret registry 142, a comparison component 144, a grouping component 146, a valuation component 148, a policy component 150, one or more wizards 152, a verification component 154, a trade-secret classifier 156, a linking component 158, an access database 160, an access-control component 162, and/or a versioning component 164. The components of the registry system 104 will be described below by way of continued example. It should be understood that the example provided herein is illustrative, and should not be considered the exclusive example of the components of the registry system 104. It should be understood that when a system and/or device is described herein as a "remote system" and/or a "remote device," the system and/or device may be situated in a location that differs from, for example, the electronic device 102.

By way of example, the obfuscation component(s) 134 may perform the same or similar operations as the obfuscation component(s) 118 of the electronic device 102. For example, instead of or in addition to the use of obfuscation component(s) 118 by the electronic device 102, the registry system 104 may generate one or more document obfuscation values utilizing the obfuscation component(s) 134. In these examples, the electronic device 102 may send data corresponding to the document representing the trade secret to the registry system 104. The registry system 104 may receive the data and may utilize the data to generate a document obfuscation value via the obfuscation component(s) 134. The document obfuscation values may be generated in the same or a similar manner as the document obfuscation values generated by the obfuscation component(s) 118. In examples, the registry system 104 may include multiple obfuscation components 134 that each employ a different hashing algorithm. In these examples, each obfuscation component 134 may output a different document obfuscation value for the same document. Each of these document obfuscation values may be sent to different blockchain systems for registration, as described elsewhere herein.

In examples, the document may be segmented and each segment may be utilized to generate a document obfuscation value, regardless of where hashing is performed in the system. For example, two or more portions of the document may be identified and/or determined and a document obfuscation value may be generated for each of the portions. To illustrate, a document may be segmented into four portions and the obfuscation component(s) 134 may generate a document obfuscation value for each of the four portions. The four document obfuscation values may then be utilized by the obfuscation component(s) 134 to generate a document obfuscation value for the document.

The tag-data generator 136 may perform the same or similar functions as the tag-data generator 120 described with respect to the electronic device 102. For example, the registry system 104 may receive input data indicating one or more tags associated with a given trade secret. Additionally, or alternatively, the registry system 104 may generate tag data utilizing the data representing the document, such as described above with respect to the electronic device 102. The registry system 104 may also generate tag data reflective of the additional processing performed by the system. In examples, the tag data may be utilized for searching functionality. In these examples, a search may be requested for one or more records associated with the trade secret registry 142. The search may include text data representing a term to be searched for, and the text data may be utilized by the registry system 104 to search through at least the tag data to find the same or a similar term. Results of the search may be returned to the electronic device 102 for display, such as via the user interface(s) 126. Additionally, or alternatively, the user interface 126 may display the tags as generated by the tag-data generator 136. The user interface 126 may also display a selectable portion that, when selected, may allow a user to manipulate and/or change the tags.

The communications component 138 may be configured to enable communications between the registry system 104 and the other components of the architecture 100, such as the electronic device 102, the distributed-ledger system 106, and/or the insurer system 108. The communications component 138 may further generate data to be communicated and/or may format already-generated data for transfer to other components of the architecture 100. The communications component 138 may also be configured to receive data from one or more of the other remote systems and/or the electronic device 102.

For example, the communications component 138 may be configured to generate request data indicating a request to register a trade secret in association with a blockchain, such as a blockchain associated with the distributed-ledger system 106. The request data may be sent to the distributed-ledger system 106 along with, for example, the document obfuscation value and/or an identifier of the document and/or the trade secret, and/or other information associated with the document and/or the trade secret. The distributed-ledger system 106 may receive the request data and the document obfuscation value (or other data) and may register the document obfuscation value (or the other data) in association with a block of the blockchain. The distributed-ledger system 106 may generate a cryptographic document obfuscation value representing the block in the blockchain and/or the distributed-ledger system 106 may generate a time value indicating a time and/or day that the document obfuscation value (or the other data) was registered with the blockchain. The distributed-ledger system 106 may send the cryptographic document obfuscation value, the time value, and/or other information (such as a block number, for example) to the registry system 104 and/or the electronic device 102.

As used herein, a blockchain is a list and/or ledger of records, also described as blocks, that are linked using cryptography. A block in the blockchain contains a cryptographic hash of the previous block, a time value or timestamp, and, in examples, transaction data. The blockchain may be utilized to record transactions between two entities and/or systems. In these examples, the blockchain may be utilized to record the transaction of registering a trade secret in a trade secret registry between the electronic device 102 and the registry system 104. As described in more detail elsewhere herein, the blockchain may also be utilized to register valuation documentation, insurance policy documents, and/or other information associated with the trade secret registry. The blockchain may be managed by a peer-to-peer network collectively adhering to a protocol for inter-node communication and validating new blocks. Once recorded in a block, the data cannot be altered without alteration of all subsequent blocks, which would require a majority of the network to agree upon.

In examples, multiple blockchain systems may be utilized to register the transaction between the registry system 104 and the electronic device 102. For example, the document obfuscation value may be sent to multiple blockchain systems, and each blockchain system may return a cryptographic document obfuscation value corresponding to a block in their respective blockchains. As described more fully below, the record indicating registration of the trade secret with the trade secret registry 142 may include the multiple cryptographic document obfuscation values and/or other information associated with registration of blocks in the multiple blockchains.

The record generator 140 of the registry system 104 may then generate a record in the trade secret registry 142. For example, the record may include an identifier of the record, a naming indicator for the trade secret, a description of the trade secret, a naming indicator of the document, one or more tags, a status identifier for the record, the document obfuscation value, the cryptographic document obfuscation value, the block number, the time value (also described as the block timestamp), insurance policy details, valuation details, and/or other information associated with the trade secret. The record may be stored along with one or more other records in the trade secret registry 142. The registry system 104, in examples, may generate confirmation data indicating that the record has been generated, and the confirmation data, along with the record itself, may be sent to the electronic device 102 for display via a user interface 126. In examples, auditing of access and/or edit history associated with records may be performed such that if a user interacts with the record, data indicating interaction of that user with the information associated with the record may be surfaced and/or reported. In addition, audit logs and/or data may be registered to the distributed-ledger to verify when auditing was performed.

In examples, the trade secret registry 142 may be searchable. For example, an interface may be generated and configured to allow access to at least a portion of the trade secret registry 142 via the electronic device 102 and/or a remote docketing system associated with other intellectual property assets. Access information, as described more fully herein with respect to the access-control component 162, may be sent for accessing the interface. The registry system 104 may receive, such as from the remote docketing system, a request to perform a search of the trade secret registry 142. In these examples, the request may include text data to be utilized to search the trade secret registry 142. The text data may be utilized to identify results of the search and results data representing the results may be sent to the remote docketing system and/or the electronic device 102.

The comparison component 144 may be configured to analyze the document obfuscation values and determine degrees of similarity and/or degrees or differences between the document obfuscation values and/or the documents corresponding to the document obfuscation values. For example, as described above, the obfuscation component(s) 134 may generate document obfuscation values corresponding to documents representing trade secrets. Similar documents may have similar document obfuscation values. As such, the comparison component 144 may analyze the document obfuscation values to determine a degree of similarity between them. A threshold degree of similarity may be identified and/or determined and the degree of similarity between document obfuscation values may be compared to the threshold degree of similarity. Document obfuscation values with a degree of similarity that meets or exceeds the threshold degree of similarity may be determined to be similar, while hash-value pairs that fall below the threshold degree of similarity may be determined to be dissimilar. Additionally, document obfuscation values may be segmented and the segments may be compared to determine portions of the document obfuscation values that are similar and portions that are not. The number of similar versus dissimilar document obfuscation values may be utilized to determine an overall degree of similarity between document obfuscation values.

In other examples, the comparison component 144 may associate a feature vector with some or all of the document obfuscation values. The feature vector may correspond to characteristics of the document obfuscation value and/or the document. For example, the presence or absence of text data and/or image data from the document may impact the feature vector. In other examples, the text data and/or image data itself may impact the feature vector. Other factors such as document length, the entity associated with the document, the type of information included (e.g., source code, chemical formula, customer list), creation date, modification date, and/or other metadata may impact the feature vector. By way of example, a feature may be described as an individual measurable property or characteristic of a document. A given feature may be numeric and/or may be considered a string and/or a graphic. A set of such features may be described as a feature vector. As such, similar feature vectors indicate similar characteristics and/or properties of the documents they represent. A similarity and/or popularity score may be determined for a given pair of feature vectors, with more favorable scores indicating a high degree of similarity between documents.

In other examples, Levenshtein distances may be utilized by the comparison component 144 to determine a degree of similarity between trade secrets. A Levenshtein distance may be determined between two document obfuscation values and/or documents. A shorter Levenshtein distance may indicate more similarity than a longer Levenshtein distance. As used herein, a Levenshtein distance, also known as an edit distance, may be described as a string metric for measuring the difference between two sequences. For example, the Levenshtein distance between two words may be considered the minimum number of single-character edits to change one word into the other. As such, the Levenshtein distance between two very similar words would be shorter than a Levenshtein distance between two very different words. In these examples, a Levenshtein distance may be determined between two documents and/or two document obfuscation values representing those documents, with shorter Levenshtein distances indicating more similarity between documents.

The comparison component 144 may also be configured to determine if a to-be-registered trade secret is unique with respect to other trade secrets registered in association with the trade secret registry 142. For example, the document obfuscation values and/or documents may be analyzed as described herein to determine whether a given document obfuscation value is different from one or more stored document obfuscation values associated with registered trade secrets. If the document obfuscation value is different, then the to-be-registered trade secret may be identified as or determined to be unique with respect to other trade secrets associated with the trade secret registry 142. In examples, determining that the document obfuscation value is different from the stored document obfuscation values may include determining a degree of similarity between the document obfuscation values and determining that the degree of similarity does not exceed a threshold degree of similarity.

The grouping component 146 may be configured to group records and/or document obfuscation values corresponding to documents. For example, the grouping component 146 may utilize the results from the comparison component 144 to determine whether to group two or more records, document obfuscation values, and/or documents. For example, documents having a certain degree of similarity may be grouped together. Groups of documents may also be grouped with other groups of documents based at least in part on the results from the comparison component 144. Additionally, or alternatively, the grouping component 146 may receive an indication that an identifier of the electronic device 102 and/or the entity is the same as between multiple documents and/or records. In these examples, the grouping component 146 may associate the records having the same entity and/or device identifier with each other. In other examples, the grouping component 146 may group records that have both a common entity and/or device identifier and that meet or exceed a threshold degree of similarity.

The valuation component 148 may be configured to identify and/or determine a value to associate with a given trade secret. For example, during and/or after registration of a trade secret with the trade secret registry 142, an option to determine a value for the trade secret or otherwise preserve information related to valuation may be displayed, such as via a user interface 126 of the electronic device 102. One or more dialog boxes and/or input fields may be caused to be displayed, and the dialog boxes may request information associated with the trade secret to aid in valuation of the trade secret. Such information may include, for example, the type of trade secret, an importance of the trade secret to the entity, entity revenue and profits particularly including revenue and profits attributable to the entity's use of the trade secret, the development cost of the trade secret information, entity value, date of trade secret creation, expected life of the trade secret, etc.

Additionally, in examples, the input fields may include a request for supporting documents that include information that may be relevant to valuation of the trade secret. In these examples, the user may identify the supporting documents. A document obfuscation value may be generated for a given supporting document and/or the supporting document and/or the document obfuscation value may be registered in association with the blockchain. The record for the trade secret may include information associated with the supporting document, such as the corresponding document obfuscation value and/or the cryptographic document obfuscation value corresponding to the block in the blockchain where the supporting document is registered.

In other examples, the tag data generated as described herein may be utilized to determine some or all of the data described herein as being utilized to determine a value of a trade secret. For example, the tag data may be utilized to determine a trade-secret type. Trade secrets having the same or a similar type may be analyzed to determine a value for a trade secret in question. The remote system 104 may utilize some or all of this information to generate a value associated with the trade secret.

By way of example, a trade secret may be identified and/or determined to be source code and may be indicated to be extremely valuable to the entity associated with the source code. The input data received from the electronic device 102 may indicate that the value of the entity is $5,000,000 USD and the yearly revenue for the entity is $1,500,000 USD. The yearly profits attributable to use of the trade secret is $400,000. The development cost of the trade secret was $1,000,000. The expected life of the trade secret is 10 years. Additionally, the entity may have uploaded documents confirming some or all of this information. Based at least in part on this information, the valuation component 148 may determine the value of the trade secret. In examples, a discounted cash flow analysis of the attributable profit streams over the expected life may be determined. Comparison may be made to valuations of other registered trade secrets, such as other source code identified as important and with company statistics that are similar to those identified for the entity. The development cost may be considered. These alternative measures may be combined to produce a current and projected valuation range. In examples, the valuation component 148 may set one or more guardrails and/or limits on a value of the trade secret. For example, if an entity has a total value of $5,000,000 USD, a limit may be set that the value of the trade secret cannot exceed $5,000,000 USD. Additionally, or alternatively, data indicating that the trade secret has been registered with the trade secret registry 142, licensed to a third-party, insured by an insurance carrier, and/or has become more valuable as reflected in user updates to information associated with the trade secret since the registry was first established, may be utilized to influence the valuation of the trade secret.

In still other examples, a quantitative analysis of one or more factors may be utilized for valuation. For example, factors such as the relevant industry, the type of information, the scope of the intellectual property, the life span of the intellectual property, the distinctiveness and/or uniqueness of the intellectual property, the amount of secrecy and/or secrecy measures put in place, the reproducibility of the intellectual property, a likelihood of misappropriation, a detectability of the trade secret and/or misappropriation thereof, and/or an overlap with other intellectual property and/or known assets. Still other information such as the geographic reach of the intellectual property may be utilized. Values corresponding to these factors may be identified, determined, and/or generated and may be utilized, such as via machine learning algorithms, for example, to determine a value of a trade secret.

The policy component 150 may be configured to assist in the application, underwriting, and provision of one or more insurance policies for a given trade secret. For example, once registered with the trade secret registry 142, an option may be presented to gain insurance coverage on the trade secret. For example, a selectable portion of the user interface 126 may provide the option to apply for an insurance policy. When selected, the user interface 126 may display one or more dialog boxes and/or input fields configured to receive user input regarding application for an insurance policy. This information may include, for example, information relating to the applicant, a trade-secret type or category, a value of the trade secret (either determined from above or identified by the user), a desired policy period, desired policy limits and retention, an entity value, a date of creation of the trade secret, and/or a portion enabling uploading of supporting and/or requested documentation. In examples where supporting documentation is provided, the supporting documentation may be registered with the blockchain in the same or a similar manner as described above with respect to the supporting document for trade secret valuation.

The policy component 150, and/or the communications component 138, may be configured to receive input data corresponding to the user input and may send the input data to the insurer system 108, which is associated with an insurer. The insurer system 108 may process the input data and, in examples, underwrite and/or issue a policy insuring the trade secret from, for example, misappropriation. In these examples, confirmation data indicating that the policy has been issued and information associated with the policy may be received from the insurer system 108. This information may be incorporated into the record associated with the trade secret and may be displayed via the user interface 126, in examples. Some nonlimiting examples of information associated with the insurance policy may include a policy type, a limit of liability, a retention value, a policy premium, a policy form, a policy number, a policy period, a sub-limit of liability, and/or a valuation of the trade secret. Additionally, or alternatively, the information may include a payout value or values associated with amounts of money to be paid to the entity associated with the trade secret upon the occurrence of different classes of events including different levels of unauthorized access or use. In these examples, the policy component 150 may receive noncompliance data indicating that the entity has not complied with a condition of the insurance policy and may cause display of updated insurance-policy information including an indicating that curative action is required and/or an updated payout value. In these examples, the updated payout value may be less than the original payout value. As the condition is met, the payout value may be updated to reflect compliance with the condition of the insurance policy.

In examples, one or more smart contracts may be utilized in association with the policy component 150. For example, the insurance policy may be associated with a given trade secret using a smart contract associated with the blockchain. A smart contract, as described herein, may be a computer protocol to digitally facilitate, verify, and/or enforce the negotiation and/or performance of a contract. Transactions involving smart contracts may be trackable and irreversible. The smart contracts may utilize, for example, *Byzantine* fault tolerant algorithms that may allow digital security through decentralization of the contract. The smart contracts may be initiated, hosted, and/or implemented, at least in part, by the distributed-ledger system 106 associated with the blockchain. In these examples, the smart contract may indicate a condition for validating an insurance policy, such as management's continued investment in threshold level of digital and/or physical security, and validation data may be received that indicates the condition has been met. In these examples, the validation data may be sent to the distributed-ledger system 106, which may cause the smart contract to validate the insurance policy.

The wizards 152 as described herein may be a set of dialog boxes and/or input fields configured to be displayed, such as via the electronic device 102. For example, a wizard 152 may be utilized to receive user input for trade secret valuation determination or support. Additionally, or alternatively, a wizard 152 may be utilized to receive user input for insurance policy application, underwriting, and provision. In examples where a wizard 152 is utilized for insurance policy provision, the wizard 152 and/or information associated with the wizard 152 may be provided by and/or may be specific to a given insurer. Additionally, or alternatively, a wizard 152 may be utilized to submit a notice of a potential misappropriation event and/or an insurance claim, as described more fully herein.

The verification component 154 may be configured to verify that information included in a particular document has been registered with the trade secret registry 142. For example, once registered, the verification component 154 may be utilized to determine if and/or verify that other information, such as information alleged to have been misappropriated, matches or is similar to the information included in the registered document. In these examples, the misappropriated information, e.g., in the form of an accused document, may be identified, such as via a user interface 126 of the electronic device 102, as part of a user verification request. A document obfuscation value may be generated for the accused document in the same or a similar manner as described above with respect to the obfuscation component(s) 118, 134. The verification component 154 may be utilized to analyze the document obfuscation value for the accused document with respect to other document obfuscation values of registered documents or document segments. If the verification component 154 determines that at least one of the registered document obfuscation values matches the document obfuscation value for the accused document or document segment, the verification component 154 may determine that the accused document is the same or similar to the registered document or document segment. In other examples, the verification component 154 may determine a degree of similarity between the accused document and one or more registered documents. Determining the degree of similarity may be performed as described above with respect to the comparison component 144. In these examples, the accused document may be determined to be similar to a registered document when the degree of similarity meets or exceeds a threshold degree of similarity. In still other examples, the verification component 154 may be configured to determine which portions of an accused document match or are similar to at least one registered document. An indication of the matching or similar portions may be displayed, such as via the user interface(s) 126. Additionally, in instances where multiple versions of a document have been registered, the verification component 154 may be configured to determine which of the multiple versions is most similar to the accused document, and may provide an indication of the version that is most similar.

The trade-secret classifier 156 may be configured to determine a type and/or classification of a trade secret that is being registered and/or that has been registered. For example, input data received from the electronic device 102 indicating one or more properties of a given trade secret may be utilized by the trade-secret classifier 156 to determine the type of the trade secret. In other examples, tag data may be received, identified, determined, and/or generated as described elsewhere herein. The tag data may be utilized to determine the type of the trade secret. Additionally, or alternatively, the results of the comparison component 144 may be utilized to determine the type of the trade secret. For example, matching of similar registered trade secrets may be utilized to determine a trade-secret type for a given trade secret. Determining the type of the trade secret may be useful for one or more of the operations described elsewhere herein, such as for grouping, valuation, insurance policy provision, wizard display, record linking, and document version determination, for example.

The linking component 158 may be configured to associate one record with one or more other records in the trade secret registry 142. For example, when records are determined to be different versions of the same document and/or when records are associated with the same entity identifier, the linking component 158 may be utilized to generate an association between those records. Generating the association may include storing data indicating that the records are associated. Generating the association may also, or alternatively, include generating a link or other similar functionality that may be displayed along with a record via the user interface(s) 126. For example, the link may correspond to a selectable portion of the user interface(s) 126 that, when selected, may cause the linked record and/or a portion thereof to be displayed.

The access database component 160 may be configured to store data indicating details of access to one or more of the record associated with the trade secret registry 142. For example, access-control data may be stored in association with the registry system 104. The access-control data may indicate who is authorized to view a given record and/or given information associated with a record. In these examples, the access-control component 162 may be configured to require a user, in order to access a record, to authenticate the user's identity, such as by inputting a username and/or password, for example. As such, the registry system 104 may generate an access log that may indicate user identifiers for users that accessed a given record, a time value associated with access of the record, and/or what information was displayed and/or manipulated by the user. The access log may be utilized by the registry system 104 to assist in maintaining confidentiality and/or secrecy of the trade secret. For example, alerts may be generated and/or sent when a record is accessed and/or when unusual activity is detected. In other examples, when a user leaves a company, the access record may be utilized to determine what sensitive information was viewed by the user and what confidentiality obligations the departing user should be reminded of. In other examples, such as when the trade secret is associated with an insurance policy, the access log may be utilized to satisfy one or more conditions of the insurance policy, such as, for example, periodic reminders about confidentiality to users that have accessed the record. It should be understood that the systems and/or user interfaces described herein may be utilized to assist in auditing for maintaining trade secret secrecy and/or complying with policies and/or rules associated with trade secret maintenance, such as for insurance policy purposes. Scheduled, periodic, and/or random reminders may be sent to devices associated with the entity that registered a given trade secret. The reminders may request that certain tasks be performed and/or that certain information should be verified to comply with such policies and/or rules. Additionally, or alternatively, the user interfaces described herein may provide functionality that allows users of devices display the user interfaces to identify one or more priority tiers, which may otherwise be described as priority levels, to associate with a given trade secret. For example, if a user designates a trade secret with a high priority tier, certain actions may be prohibited, access controls may be more stringent, security measures may be more robust, and/or when disclosure of the trade secret is made a given non-disclosure agreement (which may be a non-form and/or non-boilerplate non-disclosure agreement) is identified, determined, and/or generated. By way of additional example, if a user designates a trade secret with a low priority tier, certain actions may be enabled that would not be enabled for a higher tier, access controls may be less stringent than those for a higher tier, and/or when disclosure of the trade secret is made, a form and/or standard non-disclosure agreement may be identified, determined, and/or generated.

In examples where two records are linked, as described more fully with respect to the linking component 158, the access-control data may be utilized to allow or prohibit access to linked records and/or portions of the linked records. For example, a given user may have been provided access to a first record but not a linked second record. In these examples, the first record may be displayed to the user, but when the user attempts to select a portion of the user interface 126 corresponding to a link to the second record, the access-control data may be utilized to refrain from displaying the second record. In other examples, the user may have been authorized to access some information associated with the first record but not other information associated with the first record. As such, only a portion of the first record may be displayed to the user, while other portions of the record may be redacted, removed from display, or otherwise not displayed to the user.

The versioning component 164 may be configured to determine that two or more documents and/or trade secrets are versions of the same document and/or trade secret. For example, the results from the comparison component 144, as described more fully above, may be utilized to determine that two documents are similar in one or more respects but not the same. The versioning component 164 may further receive, identify, determine, and/or generate information indicating that the two documents are associated with the same and/or a related entity identifier. The versioning component 164 may further receive, identify, determine, and/or generate information indicating that the two documents are associated with the same or a similar trade-secret type. Utilizing some or all of this information, the versioning component 164 may determine that the two documents are versions of the same document. An indication of this versioning may be stored with respect to the record(s) associated with the documents and/or a visual indication may be displayed via the user interface(s) 126.

The versioning component 164 may also be configured to generate alerts and/or reminders for document versioning. For example, the versioning component 164 may determine that, for a given entity, a version of a particular trade secret is historically registered at given times and/or within given time ranges. If a version is not registered in a way that comports with historical trends, an alert and/or reminder for registering the version of the document may be generated and sent to the electronic device 102. Additionally, or alternatively, if a given trade secret is of a type that generally is registered in multiple versions at given times and/or within given time ranges, the versioning component 164 may determine whether a version has been registered in a way that comports with this trend. If a version is not so registered, an alert and/or reminder may be generated and sent.

As shown in FIG. 1, several of the components of the registry system 104, the distributed-ledger system 106, and/or the insurer system 108 and the associated functionality of those components as described herein may be performed by one or more of the other remote systems and/or by the electronic device 102. Additionally, or alternatively, some or all of the components and/or functionalities associated with the electronic device 102 may be performed by the registry system 104, the distributed-ledger system 106, and/or the insurer system 108.

It should be noted that the exchange of data and/or information as described herein may be performed only in situations where a user has provided consent for the exchange of such information. For example, a user may be provided with the opportunity to opt in and/or opt out of data exchanges between devices and/or with the remote systems and/or for performance of the functionalities described herein. Additionally, when one of the devices is associated with a first user account and another of the devices is associated with a second user account, user consent may be obtained before performing some, any, or all of the operations and/or processes described herein.

It should be understood that anywhere in this disclosure where the term "trade secret" is used, it should be noted to include not only trade secrets, but any document and/or data and/or information including confidential information, know-how, and other information, and not necessarily documents, data, and/or information meeting a legal definition of the term "trade secret."

As used herein, a processor, such as processor(s) 112 and/or 128, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 112 and/or 128 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112 and/or 128 may possess its own local memory, which also may store program components, program data, and/or one or more operating systems.

The memory 116 and/or 132 may include volatile and nonvolatile memory, removable and non-removable media implemented in any method or technology for storage of information, such as computer-readable instructions, data structures, program component, or other data. Such memory 116 and/or 132 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 116 and/or 132 may be implemented as computer-readable storage media ("CRSM"), which may be any available physical media accessible by the processor(s) 112 and/or 128 to execute instructions stored on the memory 116 and/or 132. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 116 and/or 132, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 114 and/or 130 may enable messages between the components and/or devices shown in architecture 100 and/or with one or more other remote systems, as well as other networked devices. Such network interface(s) 114 and/or 130 may include one or more network interface controllers (NICs) or other types of transceiver devices to send and receive messages over the network 110.

For instance, each of the network interface(s) 114 and/or 130 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 114 and/or 130 may include a wide area network (WAN) component to enable message over a wide area network.

In some instances, the registry system 104 may be local to an environment associated the electronic device 102. For instance, the remote system 104 may be located within the electronic device 102. In some instances, some or all of the functionality of the remote system 104 may be performed by the electronic device 102. Also, while various components of the remote system 104 have been labeled and named in this disclosure and each component has been described as being configured to cause the processor(s) to perform certain operations, it should be understood that the described operations may be performed by some or all of the components and/or other components not specifically illustrated.

Figure 2:
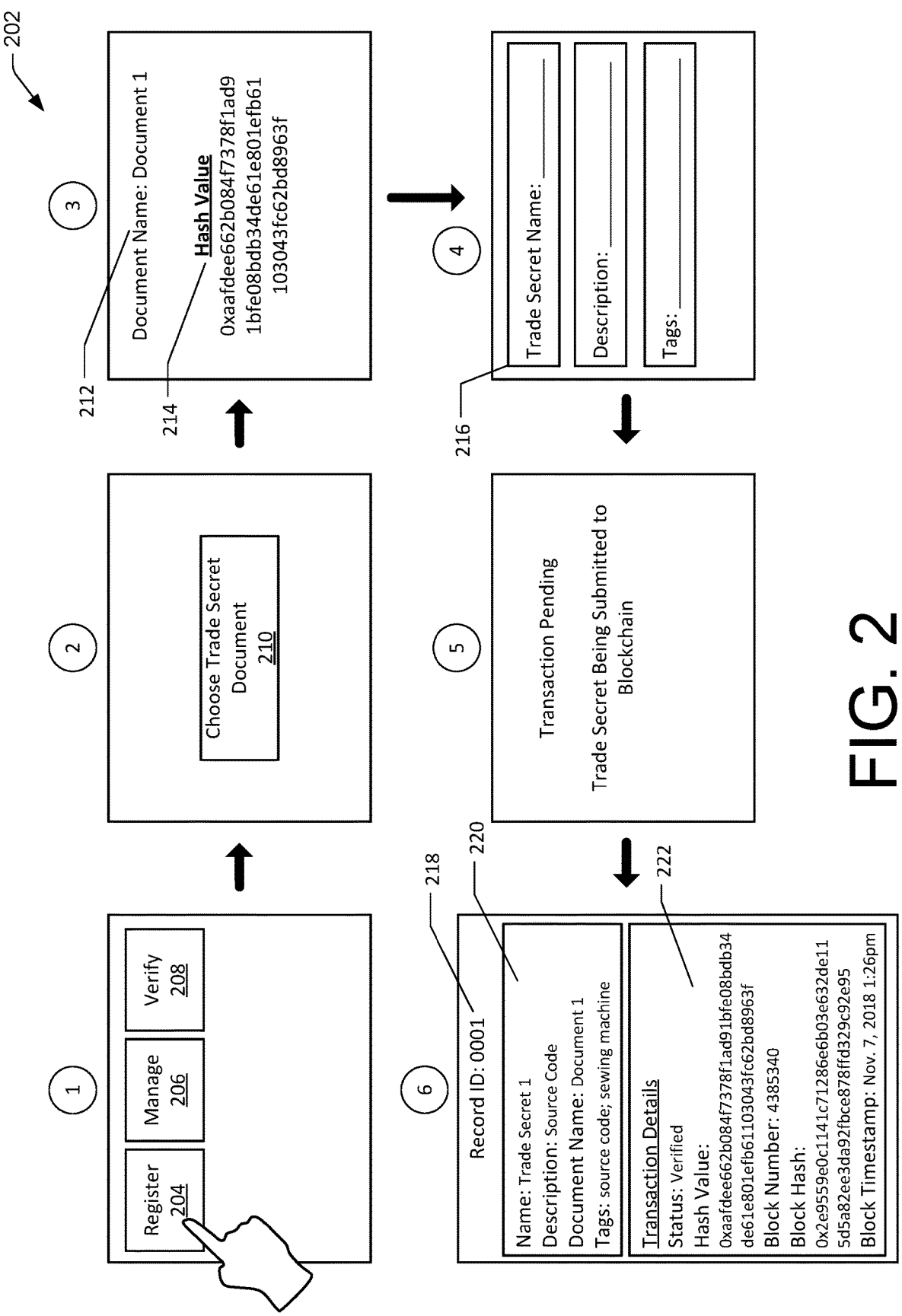
FIG. 2 illustrates an example user interface displaying trade secret registration functionality in accordance with a digital property authentication and management system.

FIG. 2 illustrates an example user interface 202 displaying trade secret registration functionality in accordance with a digital property authentication and management system. The user interface 202 may be displayed on a display of an electronic device, such as the electronic device 102 as described with respect to FIG. 1. The user interface 202 may be the same as or similar to the user interface(s) 126 as described with respect to FIG. 1. FIG. 2 illustrates a progression, from left to right and top to bottom, of information displayed on and/or interactions with the user interface 202.

For example, the user interface 202, at step 1, may include a first selectable portion 204 indicating an option to register a trade secret with a trade secret registry. The user interface 202 may also include a second selectable portion 206 indicating an option to manage registered trade secrets, and/or a third selectable portion 208 indicating an option to verify that a document has been registered in association with the trade secret registry. To illustrate the use and functionality of the user interface 202, a user may provide input indicating selection of the first selectable portion 204.

Selection of the first selectable portion 204 may cause the user interface 202 to display, at step 2, a fourth selectable portion 210 indicating an option to identify a document representing a trade secret to be registered with the trade secret registry. Identification of the document may include input such as a naming indicator for the document and/or selection of a document from a database of an electronic device displaying the user interface 202, for example. The document may be identified and the electronic device may cause a document obfuscation value to be generated corresponding to the document. For example, a obfuscation component may receive data corresponding to the document, such as from one or more databases and/or other storage locations associated with the electronic device and/or remote storage accessible by the electronic device. The obfuscation component may then generate a document obfuscation value corresponding to the document. In general, the obfuscation component may receive, as input, text data, image data, formatting data, and/or other data corresponding to the document, and may generate, as output, a document obfuscation value that corresponds to the input. In examples, the electronic device may include multiple obfuscation components that each employ a different hashing algorithm. In these examples, each obfuscation component may output a different document obfuscation value for the same document.

At step 3, the user interface 202 may include a naming indicator 212 for the document. The user interface 202 may also include the document obfuscation value 214 as generated based at least in part on the document. As shown in FIG. 2, the naming indicator 212 for the document is "Document 1," and the document obfuscation value 214 is "0xaafdee662b084f7378f1ad91bfe08bdb34de 61e801efb61103043fc62bd8963f," by way of example.

At step 4, the user interface 202 may include one or more dialog boxes and/or input fields 216 associated with the trade secret. The input fields 216 may include text requesting information from the user regarding the trade secret. As shown in FIG. 2, by way of example, the input fields 216 may request information such as a trade secret name, a description of the trade secret, and/or one or more tags for the trade secret. For example, a document that corresponds to source code to operate a sewing machine may be associated with keywords such as "source code," "sewing," "sewing machine," "version 1.1.20," etc. A user of the electronic device may input text corresponding to these tags and a tag-data generator may utilize such input to generate the tag data. Additionally, or alternatively, the tag-data generator may automatically generate tag data. For example, the tag-data generator may analyze the document to be registered in association with the trade secret registry to identify keywords associated with the document. For example, the tag-data generator may identify one or more fields of the document and/or values associated with those fields. By way of illustration, the tag-data generator may identify a title field, a document-type field, one or more sections of the document, etc. The values, such as the text data, associated with these fields may be utilized to generate tags. Additionally, or alternatively, text data of the document may be analyzed to determine which words are commonly used in the document. These words may be identified as keywords and may be utilized to generate the tag data.

At step 5, the user interface 202 may display text indicating a status of the registration process and/or a description of operations being performed, such as by a remote system associated with the trade secret registry and/or a remote system associated with a blockchain. For example, the text may state that the transaction is pending and may state that the trade secret and/or the document obfuscation value is being submitted to the blockchain. While this text is being displayed, a communications component may generate request data indicating a request to register a trade secret in association with the blockchain. The request data may be sent to the remote system associated with the blockchain along with, for example, the document obfuscation value and/or an identifier of the document and/or the trade secret, and/or other information associated with the document and/or the trade secret. The remote system may receive the request data and the document obfuscation value (or other data) and may register the document obfuscation value (or the other data) in association with a block of the blockchain. The remote system may generate a cryptographic document obfuscation value representing the block in the blockchain and/or the remote system may generate a time value indicating a time and/or day that the document obfuscation value (or the other data) was registered with the blockchain. The remote system may send the cryptographic document obfuscation value, the time value, and/or other information (such as a block number, for example) to the remote system associated with the trade secret registry.

In examples, multiple blockchain systems may be utilized to register the transaction between the trade secret registry system and the electronic device. For example, the document obfuscation value may be sent to multiple blockchain systems, and each blockchain system may return a cryptographic document obfuscation value corresponding to a block in their respective blockchains. As described more fully below, the record indicating registration of the trade secret with the trade secret registry may include the multiple cryptographic document obfuscation values and/or other information associated with registration of blocks in the multiple blockchains.

At step 6, the user interface 202 may display a record indicating that the trade secret has been registered with the trade secret registry. The record may include a record identifier 218, trade-secret details 220, and/or transaction details 222. The record identifier 218 may include numbers and/or letters that identify the record with respect to the trade secret registry. The trade-secret details 220 may, for example, include a naming indicator for the trade secret, a description of the trade secret, a naming indicator for the document representing the trade secret, and/or the tags generated as described elsewhere herein. The transaction details 222 may include a status of the registration with the trade secret registry, the document obfuscation value, a block number associated with the block at which the trade secret is registered with the blockchain, the cryptographic document obfuscation value (also described as the block document obfuscation value), and/or the block timestamp. Other information that may be included in the record and displayed with respect to the user interface 202 may include insurance policy details, valuation details, and/or other information associated with the trade secret, as described more fully elsewhere herein.

The record may be generated by a record generator of the remote system associated with the trade secret registry. The record may be stored along with one or more other records in the trade secret registry. The remote system, in examples, may generate confirmation data indicating that the record has been generated, and the confirmation data may be sent to the electronic device for display via a user interface 202.

Figure 3:
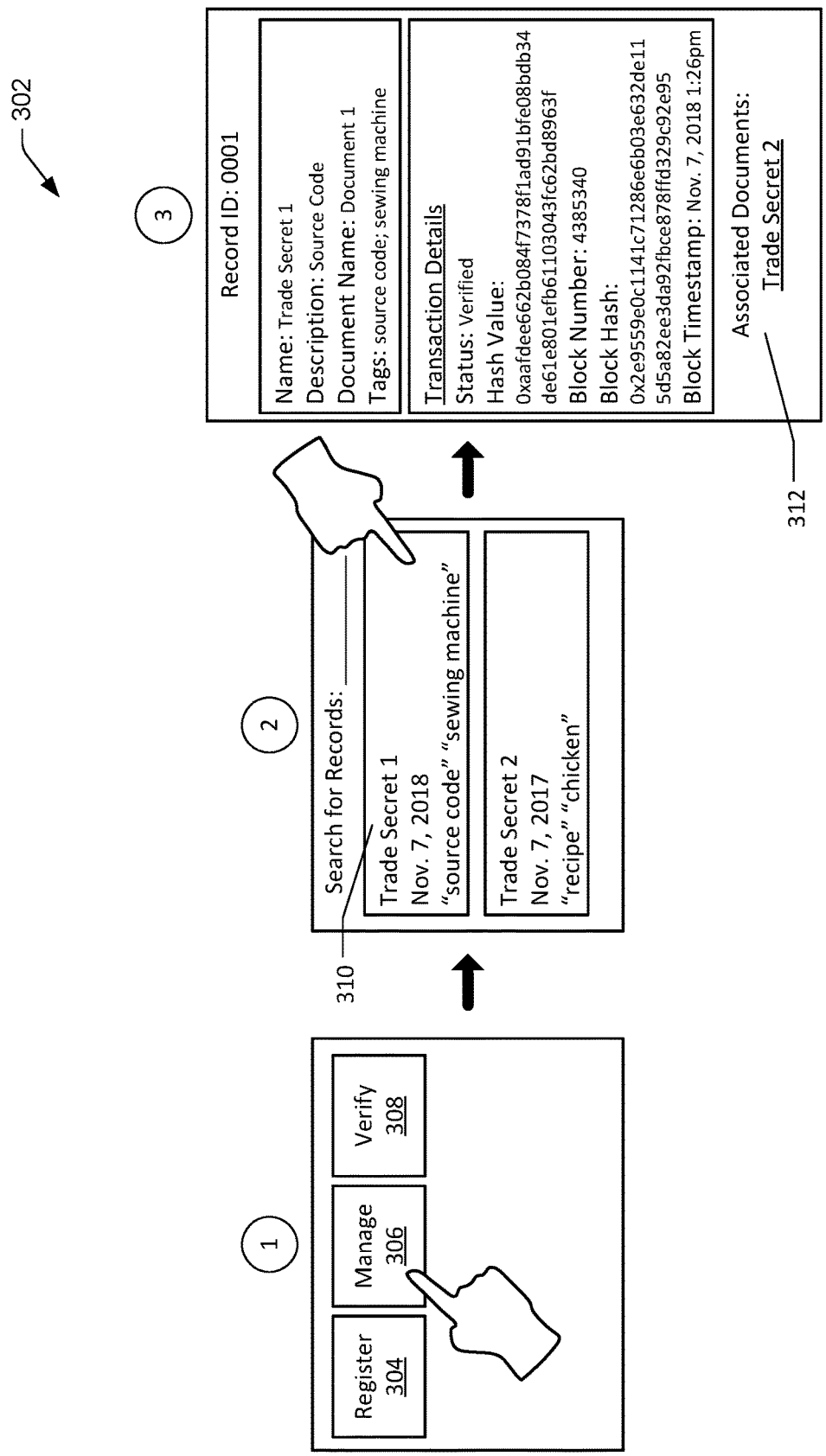
FIG. 3 illustrates an example user interface displaying trade secret maintenance functionality in accordance with a digital property authentication and management system.

FIG. 3 illustrates an example user interface 302 displaying trade secret maintenance functionality in accordance with a digital property authentication and management system. The user interface 302 may be displayed on a display of an electronic device, such as the electronic device 102 as described with respect to FIG. 1. The user interface 302 may be the same as or similar to the user interface(s) 126 as described with respect to FIG. 1. FIG. 3 illustrates a progression, from left to right and top to bottom, of information displayed on and/or interactions with the user interface 302.

For example, the user interface 302, at step 1, may include a first selectable portion 304 indicating an option to register a trade secret with a trade secret registry. The user interface 302 may also include a second selectable portion 306 indicating an option to manage registered trade secrets, and/or a third selectable portion 308 indicating an option to verify that a document has been registered in association with the trade secret registry. To illustrate the use and functionality of the user interface 302, a user may provide input indicating selection of the second selectable portion 306. It should be understood that, in examples, the first, second, and third selectable portions 304, 306, 308 of the user interface 302 may be the same as or similar to (and may function similarity to) the first, second, and third selectable portions 204, 206, 208 of the user interface 202 described with respect to FIG. 2.

Selection of the second selectable portion 306 may cause the user interface 302 to display, at step 2, information associated with trade secrets that have been registered in association with the trade secret registry. In examples, trade-secret indicators 310 may be displayed. The trade-secret indicators 310 may include information describing and/or summarizing a given trade secret. As shown in FIG. 3, by way of example, the information may include a name of a trade secret, a date on which the trade secret was registered in association with the trade secret registry, and/or tags associated with the trade secret. In this way, the trade-secret indicators 310 provide an indication of the trade secrets associated with the trade secret registry without providing, in examples, all of the information of each record of the trade secrets. In examples, the trade-secret indicators 310 may be limited to only those trade secrets associated with a given entity and/or entity identifier. Additionally, or alternatively, the trade-secret indicators 310 may be limited to only those trade secrets to which a user logged in with certain access credentials has authorization to view.

In examples, the trade-secret indicators 310 may be selectable, and, when selected, may cause the record associated with that trade-secret indicator 310 to be displayed at step 3. As shown in FIG. 3, a user may provide input corresponding to selection of "Trade Secret 1." Selection of the trade-secret indicator may cause display, at step 3, of the record associated with "Trade Secret 1." As shown in FIG. 3, the record may include the same or similar information as the record described with respect to FIG. 2, including a record identifier, trade-secret details, and/or transaction details.

In addition to the details displayed as described above, the trade-secret indicators 310 and/or the records may include a link 312 to one or more other records associated with the trade secret registry. For example, a linking component may be configured to associate one record with one or more other records in the trade secret registry. For example, when records are determined to be different versions of the same document and/or when records are associated with the same entity identifier, the linking component may be utilized to generate an association between those records. Generating the association may include storing data indicating that the records are associated. Generating the association may also, or alternatively, include generating a link 312 or other similar functionality that may be displayed along with a record via the user interface 302. For example, the link 312 may correspond to a selectable portion of the user interface 302 that, when selected, may cause the linked record and/or a portion thereof to be displayed.

Figure 4:
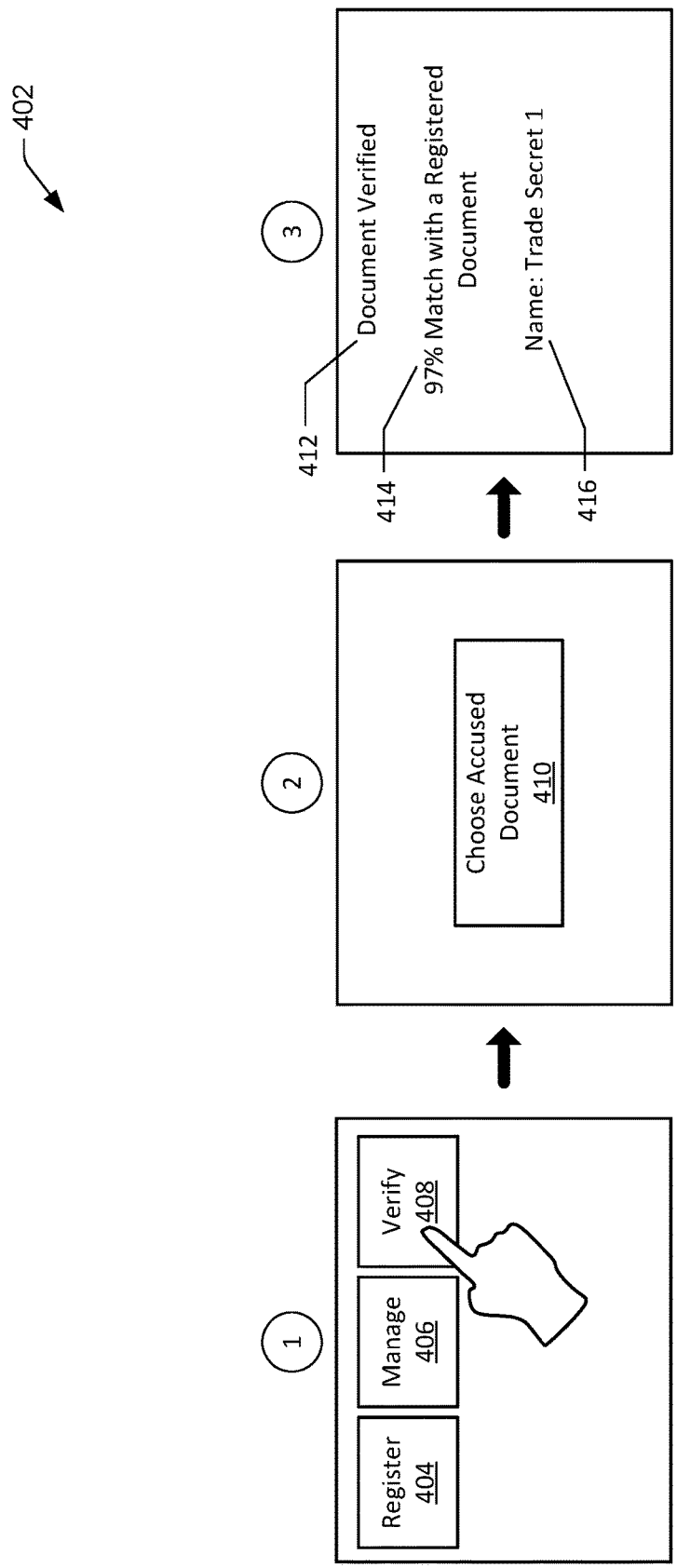
FIG. 4 illustrates an example user interface displaying trade secret verification functionality in accordance with a digital property authentication and management system.

FIG. 4 illustrates an example user interface 402 displaying trade secret verification functionality in accordance with a digital property authentication and management system. The user interface 402 may be displayed on a display of an electronic device, such as the electronic device 102 as described with respect to FIG. 1. The user interface 402 may be the same as or similar to the user interface(s) 126 as described with respect to FIG. 1. FIG. 4 illustrates a progression, from left to right, of information displayed on and/or interactions with the user interface 402.

For example, the user interface 402, at step 1, may include a first selectable portion 404 indicating an option to register a trade secret with a trade secret registry. The user interface 402 may also include a second selectable portion 406 indicating an option to manage registered trade secrets, and/or a third selectable portion 408 indicating an option to verify that a document has been registered in association with the trade secret registry. To illustrate the use and functionality of the user interface 402, a user may provide input indicating selection of the third selectable portion 306.

Selection of the third selectable portion 306 may cause the user interface 302 to display, at step 2, a fourth selectable portion 410 indicating an option to identify a document accused, for example, of being misappropriated. In these examples, the document may be obtained from a third party that may be accused of misappropriation or otherwise obtaining the trade secret without permission. Identification of the accused document may include input such as a naming indicator for the document and/or selection of a document from a database of an electronic device displaying the user interface 402, for example. The document may be identified and the electronic device may cause a document obfuscation value to be generated corresponding to the document. For example, a obfuscation component may receive data corresponding to the document, such as from one or more databases and/or other storage locations associated with the electronic device and/or remote storage accessible by the electronic device. The obfuscation component may then generate a document obfuscation value corresponding to the document. In general, the obfuscation component may receive, as input, text data, image data, video data, formatting data, and/or any other data corresponding to the document and/or file representing the trade secret, and may generate, as output, a document obfuscation value that corresponds to the input. In examples, the electronic device may include multiple obfuscation components that each employ a different hashing algorithm. In these examples, each obfuscation component may output a different document obfuscation value for the same document.

At step 3, the user interface 402 may display a verification status 412, a similarity indicator 414, and/or an identifier 416 of the registered trade secret that was determined to match and/or be similar to the accused document. For example, a verification component may be configured to verify that a particular document has been registered with the trade secret registry. For example, once registered, the verification component may be utilized to determine if and/or verify that another document, such as a document accused to have been misappropriated, matches or is similar to the registered document. The verification component may be utilized to analyze the document obfuscation value for the accused document with respect to other document obfuscation values of registered documents. If the verification component determines that at least one of the registered document obfuscation values matches the document obfuscation value for the accused document, the verification component may determine that the accused document is the same or similar to the registered document. In other examples, the verification component may determine a degree of similarity between the accused document and one or more registered documents.

Determining the degree of similarity may be performed as described above with respect to the comparison component 144 of FIG. 1. In these examples, the accused document may be determined to be similar to a registered document when the degree of similarity meets or exceeds a threshold degree of similarity. In still other examples, the verification component may be configured to determine which portions of an accused document match or are similar to at least one registered document. An indication of the matching or similar portions may be displayed, such as via the user interface(s) 402. Additionally, in instances where multiple versions of a document have been registered, the verification component may be configured to determine which of the multiple versions is most similar to the accused document, and may provide an indication of the version that is most similar.

As shown by way of example in FIG. 4, the verification status 412 is "document verified," indicating that the accused document matches or is similar to at least one registered trade secret. The similarity indicator 414 is "97% match with a registered document," indicating that the accused document is 97% similar to at least one of the registered documents. It should be understood that the particular wording of the verification status 412 and/or the similarity indicator 414 is provided by way of example, and not as a limitation. Other forms of verification status and/or similarity indicators may be provided. Additionally, while similarity is expressed in FIG. 4 as a percentage, other forms of describing similarity are included in this disclosure. Additionally, the identifier 416 of the registered trade secret is "Name: Trade Secret 1." This may provide an indication to the user of the registered trade secret that is similar to the accused document.

In examples, the user interface 402 may display dialog boxes and/or input fields including text associated with submitting a claim for insurance coverage in association with an insurance policy for the trade secret. In these examples, given that an allegation of trade secret misappropriation, or other legal claim, may exist in light of the similarity between the accused document and the registered trade secret, one or more wizards may be initiated to assist in filing a claim for insurance coverage. Input data may be received representing responses to the dialog boxes, and based at least in part on receiving the input data, the input data may be formatted and/or sent to a remote system associated with an insurer indicating that a claim is to be filed and/or notifying the insurer of the potential misappropriation and/or other legal action.

Figure 5:
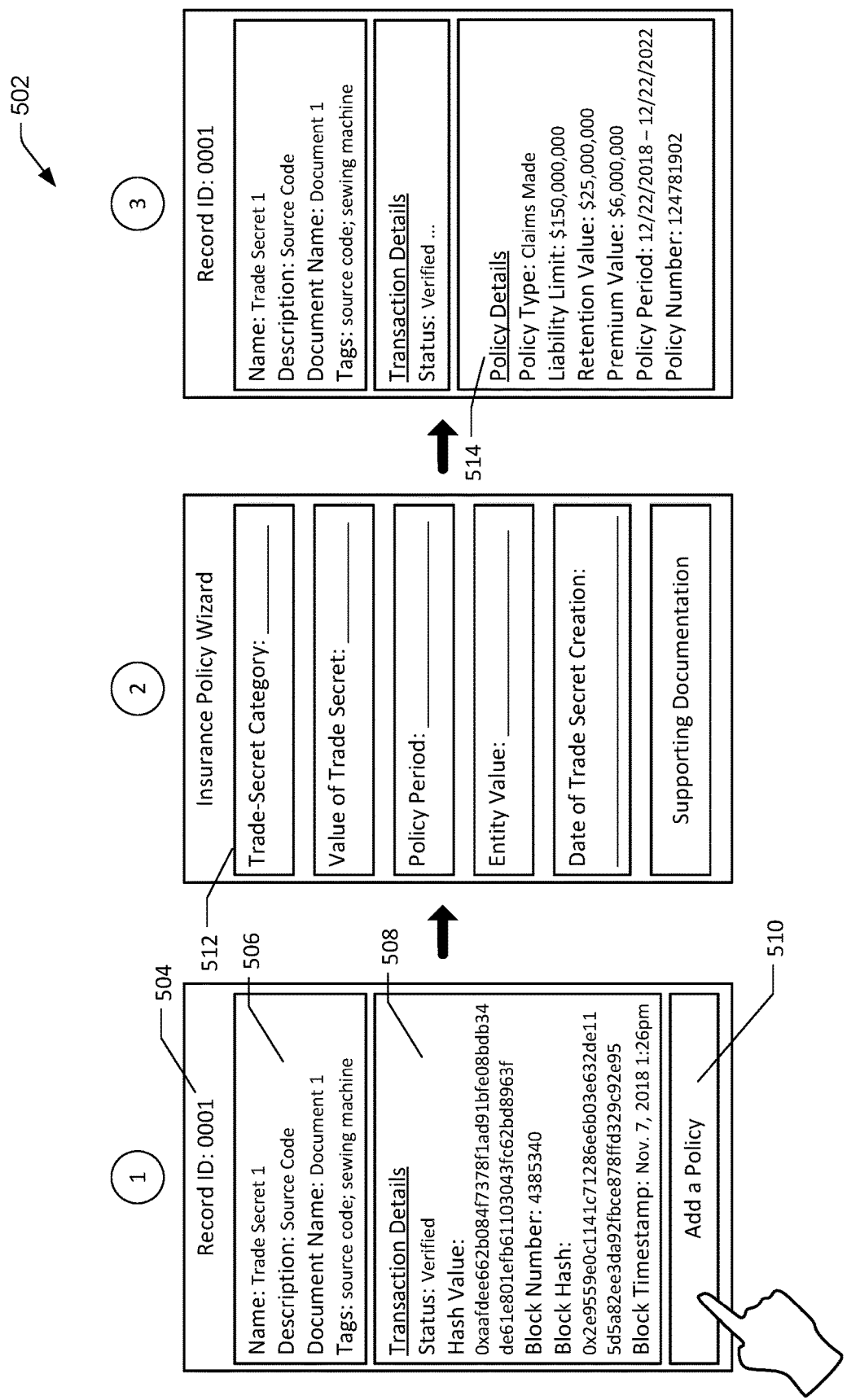
FIG. 5 illustrates an example user interface displaying insurance-policy functionality in accordance with a digital property authentication and management system.

FIG. 5 illustrates an example user interface 502 displaying insurance policy functionality in accordance with a digital property authentication and management system. The user interface 502 may be displayed on a display of an electronic device, such as the electronic device 102 as described with respect to FIG. 1. The user interface 502 may be the same as or similar to the user interface(s) 126 as described with respect to FIG. 1. FIG. 5 illustrates a progression, from left to right, of information displayed on and/or interactions with the user interface 502.

At step 1, the user interface 502 may display a record indicating a trade secret that has been registered with the trade secret registry. The record may include a record identifier 504, trade-secret details 506, and/or transaction details 508. The record identifier 504 may include numbers and/or letters that identify the record with respect to the trade secret registry. The trade-secret details 506 may, for example, include a naming indicator for the trade secret, a description of the trade secret, a naming indicator for the document representing the trade secret, and/or the tags generated as described elsewhere herein. The transaction details 508 may include a status of the registration with the trade secret registry, the document obfuscation value, a block number associated with the block at which the trade secret is registered with the blockchain, the cryptographic document obfuscation value (also described as the block document obfuscation value), and/or the block timestamp. Additionally, the user interface 502 may include a selectable portion 510 indicating an option to apply for and/or acquire an insurance policy associated with the trade secret.

At step 2, based at least in part on selection of the selectable portion 510, the user interface 502 may display a sequence of dialog boxes and/or input fields 512 requesting information associated with applying for an insurance policy. For example, a policy component may be configured to assist in the provision of one or more insurance policies for a given trade secret. The information requested via the input fields 512 may include, for example, a trade-secret type or category, a value of the trade secret (either determined from above or identified by the user), a policy period, an entity value, a date of creation of the trade secret, and/or a portion enabling uploading of supporting and/or requested documentation. In examples where supporting documentation is provided, the supporting documentation may be registered with the blockchain in the same or a similar manner as described above with respect to the supporting document for trade secret valuation.

The policy component, and/or another component of the electronic device and/or the trade secret registry system, may be configured to receive input data corresponding to the user input and may send the input data to the remote system associated with the insurer. The remote system may process the input data and, in examples, issue a policy insuring the trade secret from, for example, misappropriation. In these examples, confirmation data indicating that the policy has been issued and information associated with the policy may be received from the remote system. This information, described as policy details 514, may be incorporated into the record associated with the trade secret and may be displayed, at step 3, via the user interface 502, in examples. Some nonlimiting examples of policy details 514 may include a policy type, a limit of liability, a retention value, a policy premium, a policy form, a policy number, a policy period, a sub-limit of liability, and/or a valuation of the trade secret.

Additionally, or alternatively, the policy details 514 may include a payout value associated with an amount of money to be paid to the entity associated with the trade secret upon the occurrence of an event. In these examples, the policy component may receive compliance data indicating that the entity has not complied with a condition of the insurance policy and may cause display of updated insurance-policy information including an updated payout value. In these examples, the updated payout value may be less than the original payout value. As the condition is met, the payout value may be updated to reflect compliance with the condition of the insurance policy.

In examples, one or more smart contracts may be utilized in association with the policy component. For example, the insurance policy may be associated with a given trade secret using a smart contract associated with the blockchain. A smart contract, as described herein, may be a computer protocol to digitally facilitate, verify, and/or enforce the negotiation and/or performance of a contract. Transactions involving smart contracts may be trackable and irreversible. The smart contracts may utilize, for example, *Byzantine* fault tolerant algorithms that may allow digital security through decentralization of the contract. The smart contracts may be initiated, hosted, and/or implemented, at least in part, by the remote system associated with the blockchain. In these examples, the smart contract may indicate a condition for validating an insurance policy, and validation data may be received that indicates the condition has been met. In these examples, the validation data may be sent to the distributed-ledger system 106, which may cause the smart contract to validate the insurance policy.

Figure 6:
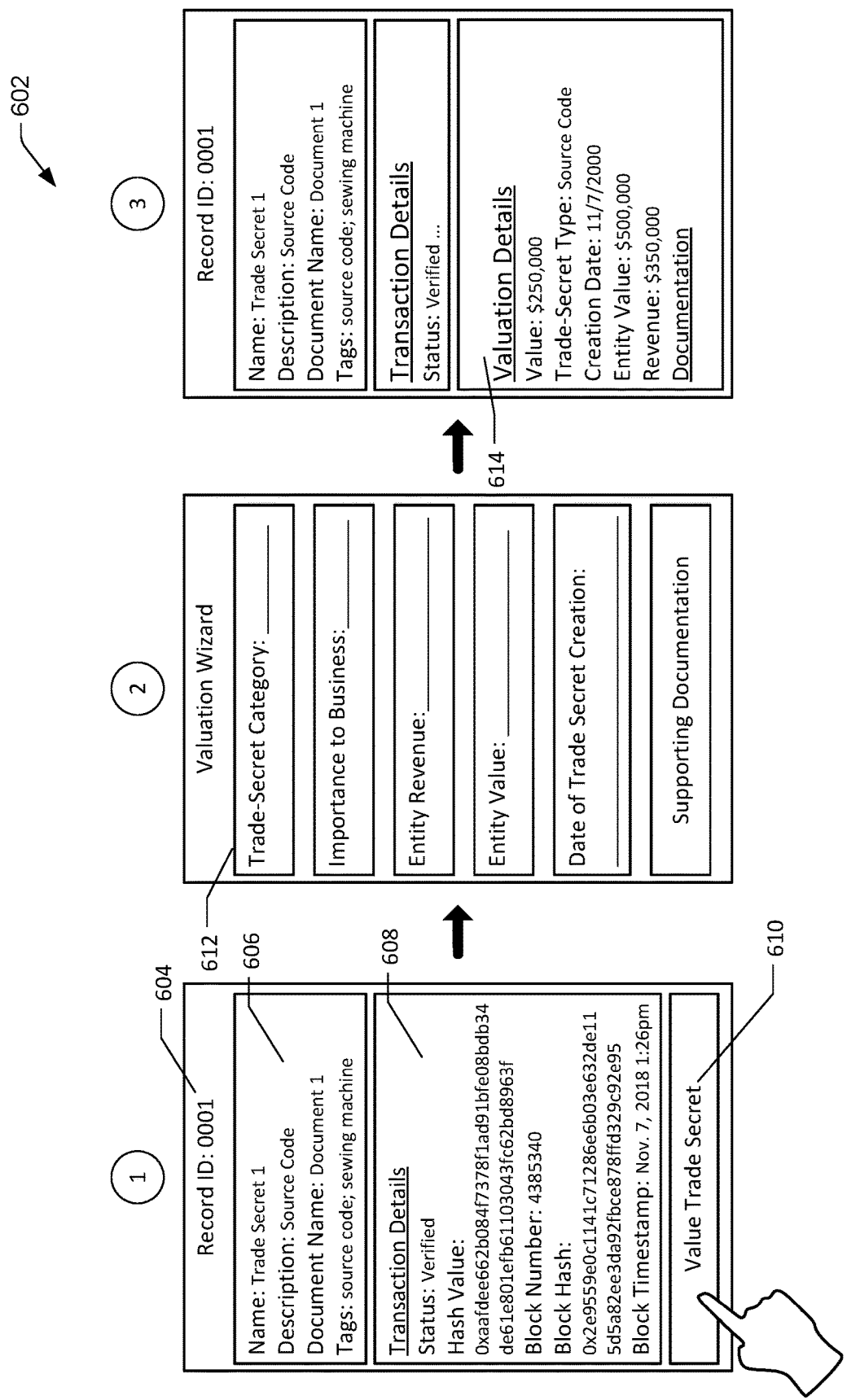
FIG. 6 illustrates an example user interface displaying valuation functionality in accordance with a digital property authentication and management system.

FIG. 6 illustrates an example user interface 602 displaying valuation functionality in accordance with a digital property authentication and management system. The user interface 602 may be displayed on a display of an electronic device, such as the electronic device 102 as described with respect to FIG. 1. The user interface 602 may be the same as or similar to the user interface(s) 126 as described with respect to FIG. 1. FIG. 6 illustrates a progression, from left to right, of information displayed on and/or interactions with the user interface 602.

At step 1, the user interface 602 may display a record indicating a trade secret that has been registered with the trade secret registry. The record may include a record identifier 604, trade-secret details 606, and/or transaction details 608. The record identifier 604 may include numbers and/or letters that identify the record with respect to the trade secret registry. The trade-secret details 606 may, for example, include a naming indicator for the trade secret, a description of the trade secret, a naming indicator for the document representing the trade secret, and/or the tags generated as described elsewhere herein. The transaction details 608 may include a status of the registration with the trade secret registry, the document obfuscation value, a block number associated with the block at which the trade secret is registered with the blockchain, the cryptographic document obfuscation value (also described as the block document obfuscation value), and/or the block timestamp. Additionally, the user interface 602 may include a selectable portion 610 indicating an option to determine a value for the trade secret.

At step 2, based at least in part on selection of the selectable portion 610, the user interface 602 may display a sequence of dialog boxes and/or input fields 612 requesting information associated with determining a value of the trade secret. For example, a valuation component may be configured to identify and/or determine a value to associate with a given trade secret. The information requested by the input fields 612 may include, for example, the type of trade secret, an importance of the trade secret to the entity, entity revenue, entity value, date of trade secret creation, etc.

Additionally, in examples, the input fields 612 may include a request for supporting documents that include information that may be relevant to valuation of the trade secret. In these examples, the user may identify the supporting documents. A document obfuscation value may be generated for a given supporting document and/or the supporting document and/or the document obfuscation value may be registered in association with the blockchain. The record for the trade secret may include information associated with the supporting document, such as the corresponding document obfuscation value and/or the cryptographic document obfuscation value corresponding to the block in the blockchain where the supporting document is registered.

In other examples, tag data generated as described herein may be utilized to determine some or all of the data described herein as being utilized to determine a value of a trade secret. For example, the tag data may be utilized to determine a trade-secret type. Trade secrets having the same or a similar type may be analyzed to determine a value for a trade secret in question. The remote system 104 may utilize some or all of this information to generate a value associated with the trade secret.

By way of example, a trade secret may be identified and/or determined to be source code and may be indicated to be extremely valuable to the entity associated with the source code. The input data received from the electronic device may indicate that the value of the entity is $5,000,000 USD and the yearly revenue for the entity is $350,000 USD. Additionally, the entity may have uploaded documents confirming some or all of this information. Based at least in part on this information, the valuation component may determine the value of the trade secret. In examples, comparison may be made between other registered trade secrets, such as other source code identified as important and with company statistics that are similar to those identified for the entity. In examples, the valuation component may set one or more guardrails and/or limits on a value of the trade secret. For example, if an entity has a total value of $5,000,000 USD, a limit may be set that the value of the trade secret cannot exceed $5,000,000 USD. Additionally, or alternatively, data indicating that the trade secret has been registered with the trade secret registry, and/or an amount of time since the trade secret was registered, may be utilized to influence the valuation of the trade secret.

Confirmation data indicating that the value has been determined and information associated with the valuation may be received from the remote system. This information, described as valuation details 614, may be incorporated into the record associated with the trade secret and may be displayed, at step 3, via the user interface 602, in examples. Some nonlimiting examples of valuation details 614 may include the value, a trade-secret type, a trade-secret creation date, an entity value, an entity revenue value, and/or one or more selectable links that, when selected, may cause display of supporting documentation, if any, provided for valuation purposes.

Figure 7:
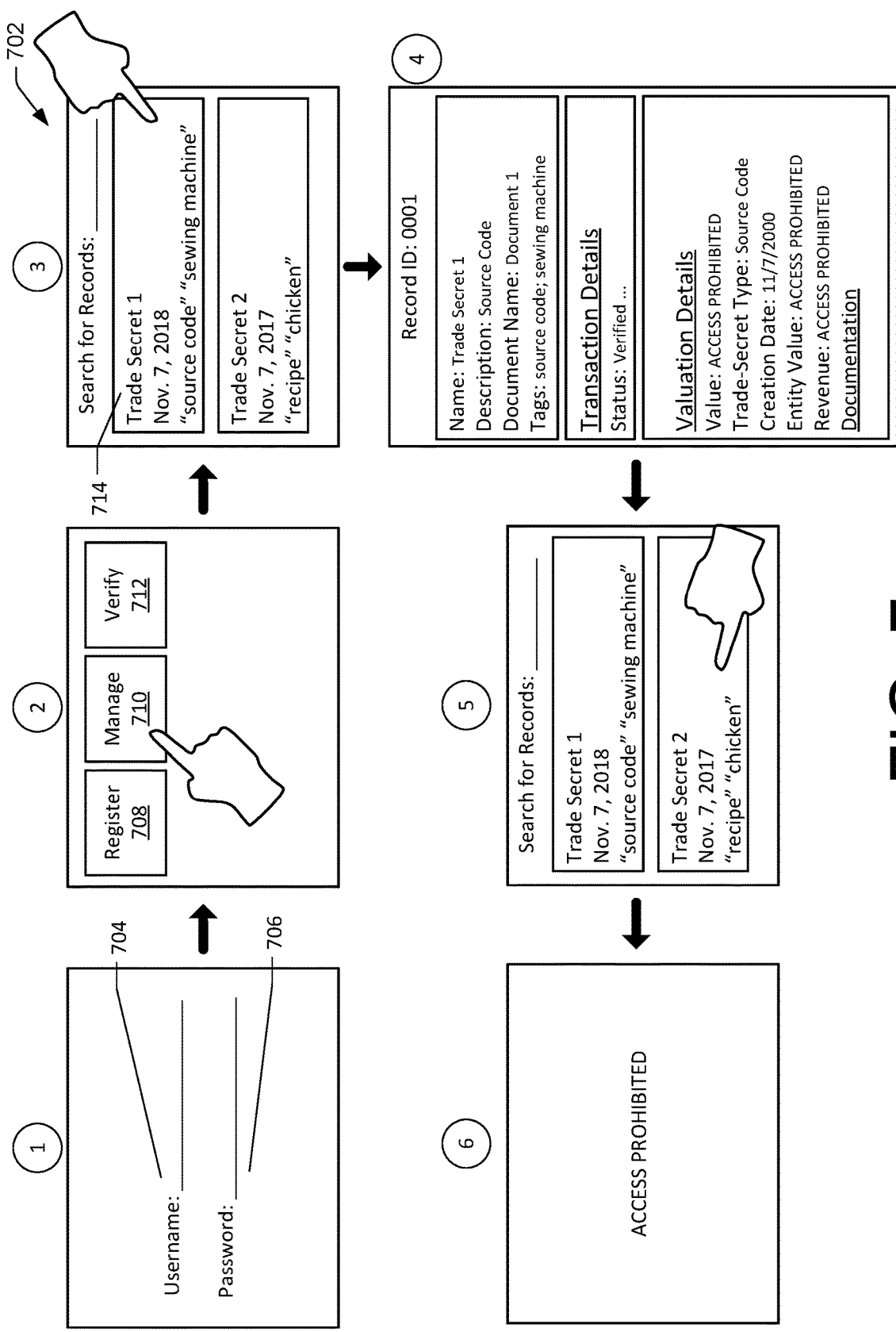
FIG. 7 illustrates an example user interface displaying access-control functionality in accordance with a digital property authentication and management system.

FIG. 7 illustrates an example user interface 702 displaying access control functionality in accordance with a digital property authentication and management system. The user interface 702 may be displayed on a display of an electronic device, such as the electronic device 102 as described with respect to FIG. 1. The user interface 702 may be the same as or similar to the user interface(s) 126 as described with respect to FIG. 1. FIG. 7 illustrates a progression, from left to right and top to bottom, of information displayed on and/or interactions with the user interface 702.

At step 1, the user interface 702 may include an authentication screen requesting user input to authenticate access to records associated with the trade secret registry. For example, a username 704 and a password 706 may be requested. A user may provide input and corresponding input data may be analyzed by the electronic device displaying the user interface 702 and/or a remote system associated with the trade secret registry.

Upon authentication of the user input, at step 2, the user interface 702 may include a first selectable portion 708 indicating an option to register a trade secret with a trade secret registry. The user interface 702 may also include a second selectable portion 710 indicating an option to manage registered trade secrets, and/or a third selectable portion 712 indicating an option to verify that a document has been registered in association with the trade secret registry. To illustrate the use and functionality of the user interface 702, a user may provide input indicating selection of the second selectable portion 710. It should be understood that, in examples, the first, second, and third selectable portions 708, 710, 712 of the user interface 702 may be the same as or similar to (and may function similarity to) the first, second, and third selectable portions 204, 206, 208 of the user interface 202 described with respect to FIG. 2.

Selection of the second selectable portion 710 may cause the user interface 702 to display, at step 3, information associated with trade secrets that have been registered in association with the trade secret registry. In examples, trade-secret indicators 714 may be displayed. The trade-secret indicators 714 may include information describing and/or summarizing a given trade secret. As shown in FIG. 7, by way of example, the information may include a name of a trade secret, a date on which the trade secret was registered in association with the trade secret registry, and/or tags associated with the trade secret. In this way, the trade-secret indicators 714 provide an indication of the trade secrets associated with the trade secret registry without providing, in examples, all of the information of each record of the trade secrets. In examples, the trade-secret indicators 714 may be limited to only those trade secrets associated with a given entity and/or entity identifier. Additionally, or alternatively, the trade-secret indicators 714 may be limited to only those trade secrets to which a user logged in with certain access credentials has authorization to view.

In examples, the trade-secret indicators 714 may be selectable, and, when selected, may cause the record associated with that trade-secret indicator 714 to be displayed at step 4. As shown in FIG. 7, a user may provide input corresponding to selection of "Trade Secret 1." Selection of the trade-secret indicator may cause display, at step 4, of the record associated with "Trade Secret 1." As shown in FIG. 7, the record may include the same or similar information as the record described with respect to FIG. 2, including a record identifier, trade-secret details, and/or transaction details.

As shown in step 4, based at least in part on access-control data associated with the authentication information provided by the user to access the system, one or more access controls may be implemented to restrict access to a record and/or to a portion of a record. For example, as shown in FIG. 7, the access-control data associated with the user viewing the record indicates that the user has authorization to view the record identifier, trade-secret details, and transaction details, but does not have access to certain valuation details. For example, the access-control data indicates that access is authorized for the trade-secret type and the creation date, but access is prohibited for the value, the entity value, and/or the revenue value. As such, an entity associated with the system may set access authorizations and determine, for given individuals, what information will be available. Additionally, or alternatively, the access-control data may indicate that a given individual is authorized to utilize certain functionality of the trade secret registry but is prohibited from utilizing other functionality. For example, the individual may be authorized to view certain records and/or information associated with records but may be prohibited from manipulating and/or changing a record, such as adding, removing, and/or changing tags.

At step 5, the user interface may again display the trade-secret indicators 714. In this example, the access-control data may indicate that access to "Trade Secret 1" is authorized while access to "Trade Secret 2" is prohibited. As such, upon selection of the trade-secret indicator 714 corresponding to "Trade Secret 2," at step 6, the user interface 702 may display information indicating that access is prohibited or otherwise denied. Additionally, in instances where records have been linked as described elsewhere herein, and a link has been provided between records, upon selection of the link, the access-control data may be utilized to determine whether to display the linked record.

FIGS. 8-23 illustrate processes for digital property authentication and management. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7, although the processes may be implemented in a wide variety of other environments, architectures and systems.

Figure 8:
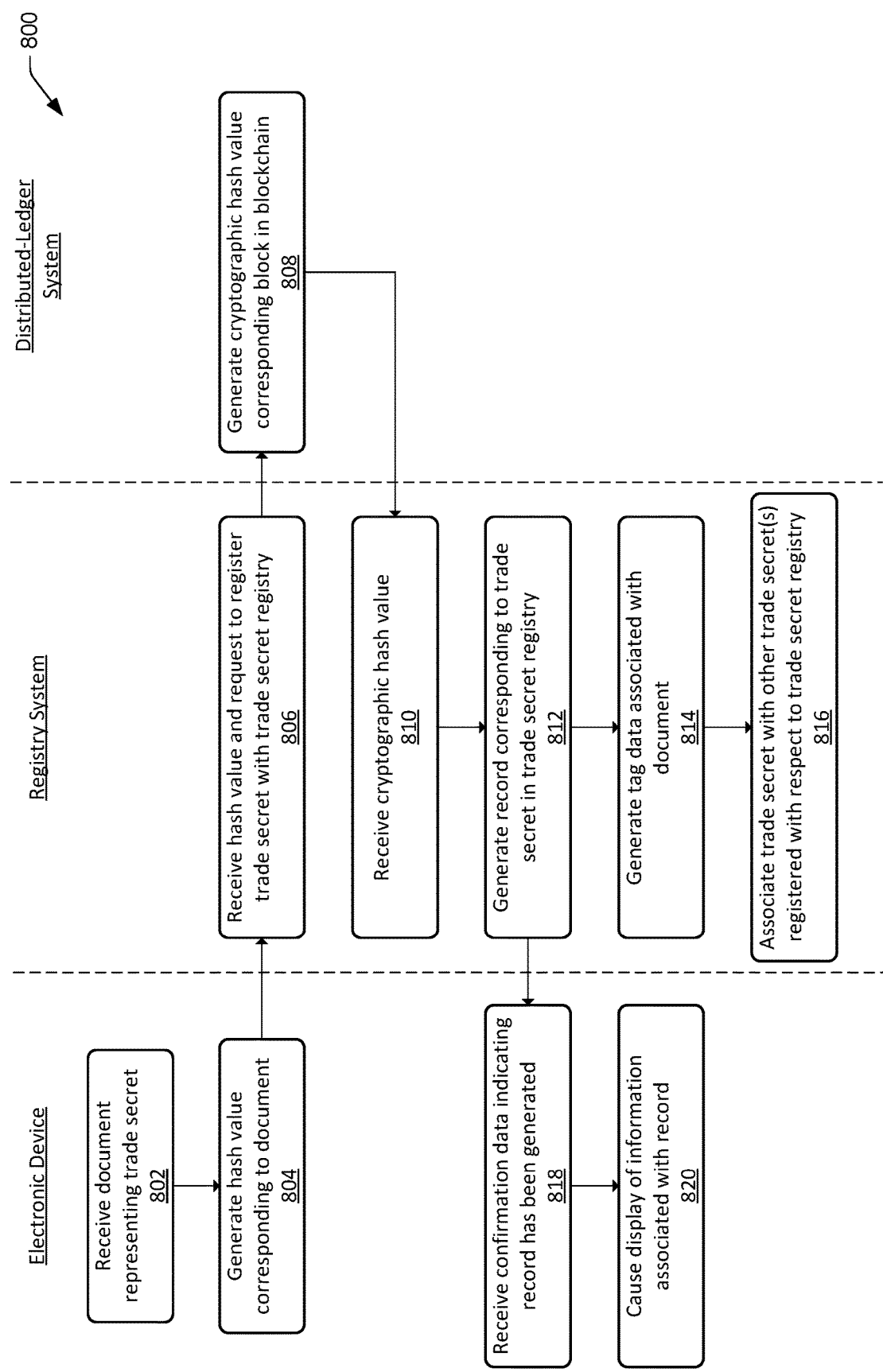
FIG. 8 illustrates a flow diagram of an example process for trade secret registration in accordance with a digital property authentication and management system.

FIG. 8 illustrates a flow diagram of an example process 800 for trade secret registration in accordance with a digital property authentication and management system. The order in which the operations or steps are described is not intended to be construed as a limitation, and any number of the described operations may be combined in any order and/or in parallel to implement process 800. The operations described with respect to the process 800 are described as being performed by the electronic device, and/or the registry system associated with the trade secret registry, and/or a distributed-ledger system associated with a blockchain. However, it should be understood that some or all of these operations may be performed by some or all of components, devices, and/or systems described herein.

At block 802, the process 800 may include the electronic device receiving a document representing a trade secret. By way of example, a user interface may include a selectable portion that, when selected, may enable identification of a document representing a trade secret. For example, the selectable portion and/or another portion of the user interface may include text requesting that a user of the user interface select the selectable portion to identify a document to be registered as a trade secret in association with the trade secret registry. The user may provide input to the electronic device indicating the document to be registered as a trade secret. The input may include selection of a naming indicator for the document.

At block 804, the process 800 may include the electronic device generating a document obfuscation value corresponding to the document. For example, a obfuscation component may receive data corresponding to the document, such as from one or more databases and/or other storage locations associated with the electronic device and/or remote storage accessible by the electronic device. The obfuscation component may then generate a document obfuscation value corresponding to the document. In general, the obfuscation component may receive, as input, text data, image data, formatting data, and/or other data corresponding to the document, and may generate, as output, a document obfuscation value that corresponds to the input. In examples, the electronic device may include multiple obfuscation components that each employ a different hashing algorithm. In these examples, each obfuscation component may output a different document obfuscation value for the same document.

At block 806, the process 800 may include the registry system receiving the document obfuscation value and request data indicating a request to register the trade secret with the trade secret registry. For example, the document obfuscation value may be received from the electronic device, such as via a firewall. Additionally, the electronic device may have generated and sent request data indicating a request to register the trade secret with the trade secret registry.

Based at least in part on receiving the document obfuscation value and/or the request data, a communications component of the registry system may be configured to generate request data indicating a request to register a trade secret in association with a blockchain, such as a blockchain associated with the distributed-ledger system. The request data may be sent to the distributed-ledger system along with, for example, the document obfuscation value and/or an identifier of the document and/or the trade secret, and/or other information associated with the document and/or the trade secret.

At block 808, the process 800 may include the distributed-ledger system generating a cryptographic document obfuscation value corresponding to a block in the blockchain. For example, the distributed-ledger system may receive the request data and the document obfuscation value (or other data) and may register the document obfuscation value (or the other data) in association with a block of the blockchain. The distributed-ledger system may generate a cryptographic document obfuscation value representing the block in the blockchain and/or the distributed-ledger system may generate a time value indicating a time and/or day that the document obfuscation value (or the other data) was registered with the blockchain. The distributed-ledger system may send the cryptographic document obfuscation value, the time value, and/or other information (such as a block number, for example) to the registry system and/or the electronic device. At block 810, the process 800 may include the registry system receiving the cryptographic document obfuscation value from the distributed-ledger system.

At block 812, the process 800 may include the registry system generating a record corresponding to the trade secret in the trade secret registry. For example, a record generator of the registry system may then generate a record in the trade secret registry. For example, the record may include an identifier of the record, a naming indicator for the trade secret, a description of the trade secret, a naming indicator of the document, one or more tags, a status identifier for the record, the document obfuscation value, the cryptographic document obfuscation value, the block number, the time value (also described as the block timestamp), insurance policy details, valuation details, and/or other information associated with the trade secret. The record may be stored along with one or more other records in the trade secret registry.

At block 814, the process 800 may include the registry system may generate tag data associated with the document. For example, a tag-data generator may be configured to generate tag data associated with the document. In examples, one or more input fields may be caused to be displayed via a user interface of the electronic device. The input fields may include a request to "tag" or otherwise provide keywords for the document. For example, a document that corresponds to source code to operate a sewing machine may be associated with keywords such as "source code," "sewing," "sewing machine," "version 1.1.20," etc. A user of the electronic device may input text corresponding to these tags and the tag-data generator may utilize such input to generate the tag data. Additionally, or alternatively, the tag-data generator may automatically generate tag data. For example, the tag-data generator may analyze the document to be registered in association with the trade secret registry to identify keywords associated with the document. For example, the tag-data generator may identify one or more fields of the document and/or values associated with those fields. By way of illustration, the tag-data generator may identify a title field, a document-type field, one or more sections of the document, etc. The values, such as the text data, associated with these fields may be utilized to generate tags. Additionally, or alternatively, text data of the document may be analyzed to determine which words are commonly used in the document. These words may be identified as keywords and may be utilized to generate the tag data.

At block 816, the process 800 may include the registry system associating the trade secret with one or more other trade secrets registered with respect to the trade secret registry. For example, a linking component may be configured to associate one record with one or more other records in the trade secret registry. When records are determined to be different versions of the same document and/or when records are associated with the same entity identifier, the linking component may be utilized to generate an association between those records. Generating the association may include storing data indicating that the records are associated. Generating the association may also, or alternatively, include generating a link or other similar functionality that may be displayed along with a record via the user interface. For example, the link may correspond to a selectable portion of the user interface that, when selected, may cause the linked record and/or a portion thereof to be displayed.

At block 818, the process 800 may include the electronic device receiving confirmation data indicating the record has been generated. The registry system, in examples, may generate confirmation data indicating that the record has been generated, and the confirmation data may be sent to the electronic device.

At block 820, the process 800 may include the electronic device causing display of information associated with the record. Display of information associated with the record may include information such as that described herein, for example, with respect to FIGS. 1-7.

Figure 9:
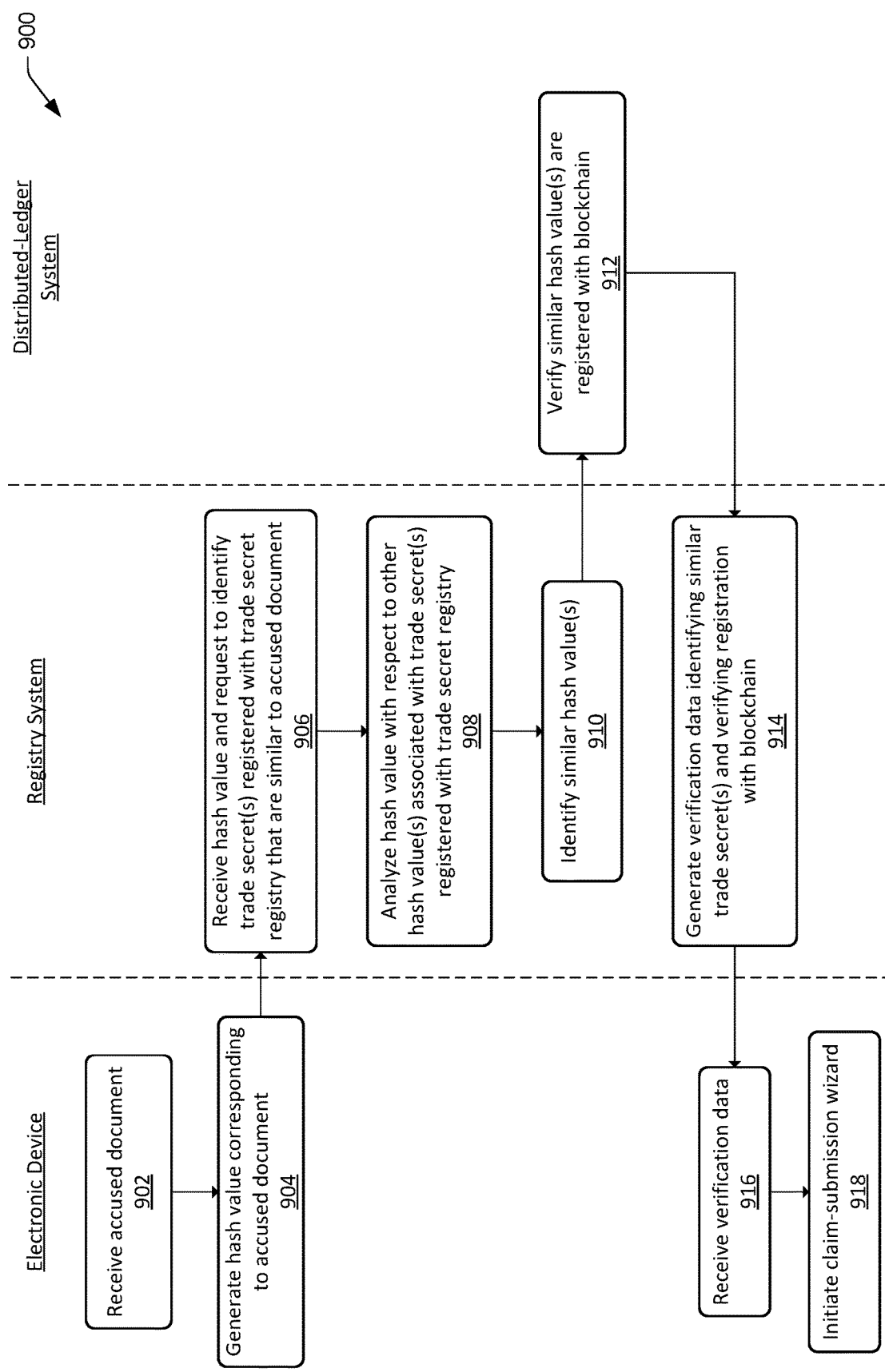
FIG. 9 illustrates a flow diagram of an example process for trade secret verification in accordance with a digital property authentication and management system.

FIG. 9 illustrates a flow diagram of an example process 900 for trade secret verification in accordance with a digital property authentication and management system. The order in which the operations or steps are described is not intended to be construed as a limitation, and any number of the described operations may be combined in any order and/or in parallel to implement process 900. The operations described with respect to the process 900 are described as being performed by the electronic device, and/or the registry system associated with the trade secret registry, and/or a distributed-ledger system associated with a blockchain. However, it should be understood that some or all of these operations may be performed by some or all of components, devices, and/or systems described herein.

At block 902, the process 900 may include the electronic device receiving an accused document and/or an identifier of the accused document. For example, a selectable portion of a user interface may be displayed on the electronic device indicating an option to identify a document accused, for example, of being misappropriated. In these examples, the document may be obtained from a third party that may be accused of misappropriation or otherwise obtaining the trade secret without permission. Identification of the accused document may include input such as a naming indicator for the document and/or selection of a document from a database of an electronic device displaying the user interface, for example.

At block 904, the process 900 may include the electronic device generating a document obfuscation value corresponding to the accused document. For example, the document may be identified and the electronic device may cause a document obfuscation value to be generated corresponding to the document. For example, a obfuscation component may receive data corresponding to the document, such as from one or more databases and/or other storage locations associated with the electronic device and/or remote storage accessible by the electronic device. The obfuscation component may then generate a document obfuscation value corresponding to the document. In general, the obfuscation component may receive, as input, text data, image data, formatting data, and/or other data corresponding to the document, and may generate, as output, a document obfuscation value that corresponds to the input. In examples, the electronic device may include multiple obfuscation components that each employ a different hashing algorithm. In these examples, each obfuscation component may output a different document obfuscation value for the same document.

At block 906, the process 900 may include the registry system receiving the document obfuscation value and request data indicating a request to identify one or more trade secrets registered with the trade secret registry that are similar to the accused document. For example, the document obfuscation value may be received from the electronic device, such as via a firewall. Additionally, the electronic device may have generated and sent request data indicating a request to identify one or more trade secrets registered with the trade secret registry that are similar to the accused document.

At block 908, the process 900 may include the registry system analyzing the document obfuscation value with respect to other document obfuscation values associated with the one or more other trade secrets registered with the trade secret registry. For example, a verification component may be configured to verify that a particular document has been registered with the trade secret registry. For example, once registered, the verification component may be utilized to determine if and/or verify that another document, such as a document accused to have been misappropriated, matches or is similar to the registered document. The verification component may be utilized to analyze the document obfuscation value for the accused document with respect to other document obfuscation values of registered documents.

At block 910, the process 900 may include the registry system identifying similar document obfuscation values. For example, if the verification component determines that at least one of the registered document obfuscation values matches the document obfuscation value for the accused document, the verification component may determine that the accused document is the same or similar to the registered document. In other examples, the verification component may determine a degree of similarity between the accused document and one or more registered documents.

Determining the degree of similarity may be performed as described above with respect to the comparison component 144 of FIG. 1. In these examples, the accused document may be determined to be similar to a registered document when the degree of similarity meets or exceeds a threshold degree of similarity. In still other examples, the verification component may be configured to determine which portions of an accused document match or are similar to at least one registered document. An indication of the matching or similar portions may be displayed, such as via the user interface(s). Additionally, in instances where multiple versions of a document have been registered, the verification component may be configured to determine which of the multiple versions is most similar to the accused document, and may provide an indication of the version that is most similar.

At block 912, the process 900 may include the distributed-ledger system verifying the similar document obfuscation value(s) are registered with the blockchain. For example, the accused document obfuscation value may be determined to match a registered document obfuscation value. In these examples, it may be advantageous to verify that the registered document obfuscation value corresponds to a trade secret that has been registered with the blockchain. As such, the accused document obfuscation value may be submitted to the distributed-ledger system, which may search the blockchain for the matching registered document obfuscation value and/or the corresponding cryptographic document obfuscation value representing the block in the blockchain where the trade secret is registered.

At block 914, the process 900 may include the registry system generating verification data identifying the similar trade secret(s) and, in examples, verifying registration with the blockchain. The registry system may receive, from the distributed-ledger system, data indicating that the accused document obfuscation value matches the registered document obfuscation value. In these and other examples, the registry system may generate verification data to be sent to the electronic device.

At block 916, the process 900 may include the electronic device receiving the verification data. For example, a verification status of the verification data may indicate that the accused document matches or is similar to at least one registered trade secret. A similarity indicator may indicate that the accused document is similar to, such a percentage similar to, at least one of the registered documents. Additionally, an identifier of the registered trade secret may be provided. This may provide an indication to the user of the registered trade secret that is similar to the accused document.

At block 918, the process 900 may include the electronic device initiating a claim-submission wizard to initiate the process of filing an insurance claim associated with the trade secret. In examples, a user interface may display dialog boxes and/or input fields including text associated with submitting a claim for insurance coverage in association with an insurance policy for the trade secret. In these examples, given that an allegation of trade secret misappropriation, or other legal claim, may exist in light of the similarity between the accused document and the registered trade secret, one or more wizards may be initiated to assist in filing a claim for insurance coverage. Input data may be received representing responses to the dialog boxes, and based at least in part on receiving the input data, the input data may be formatted and/or sent to a remote system associated with an insurer indicating that a claim is to be filed and/or notifying the insurer of the potential misappropriation and/or other legal action.

Figure 10:
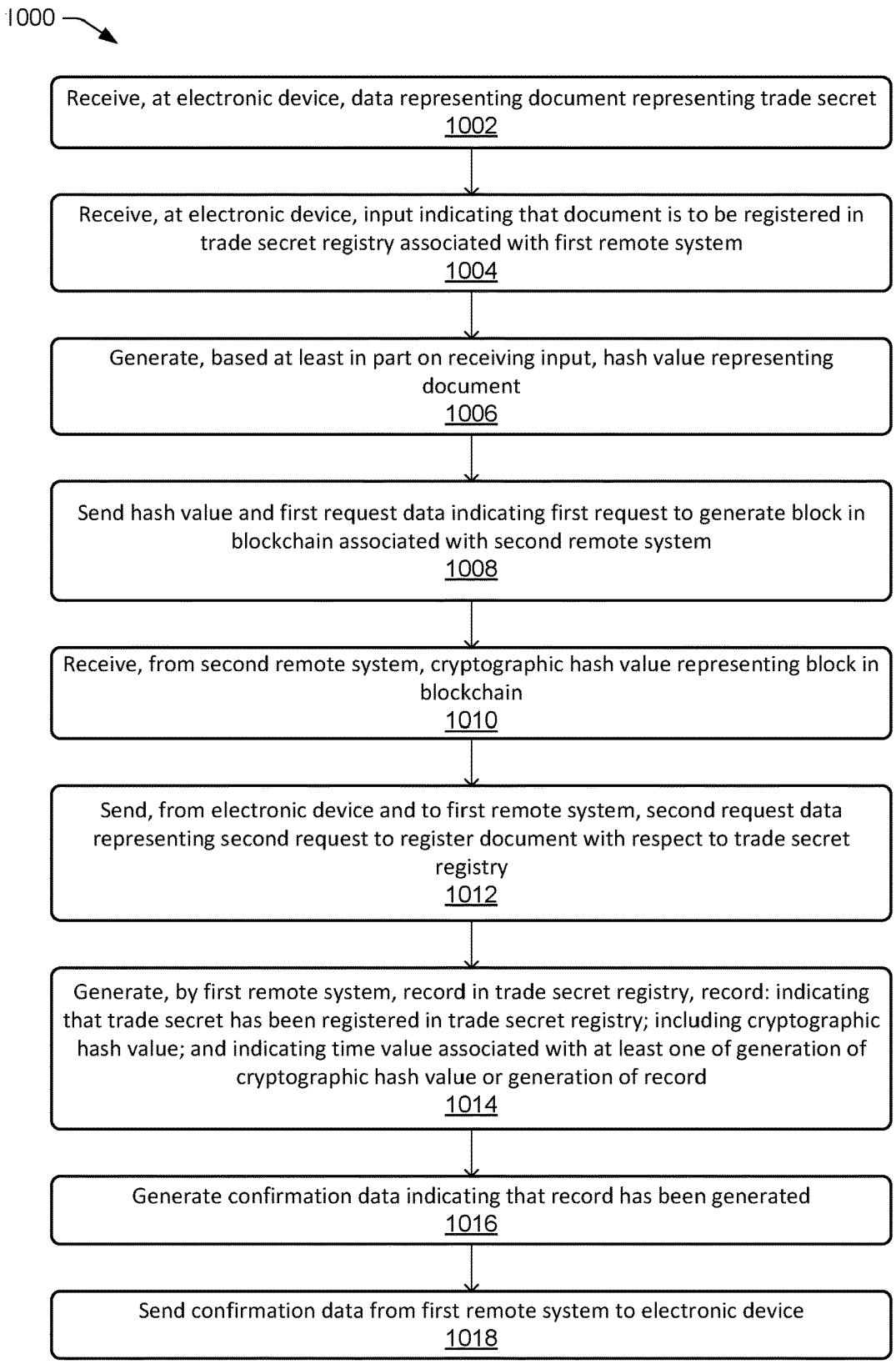
FIG. 10 illustrates a flow diagram of an example process for digital property authentication.

FIG. 10 illustrates a flow diagram of an example process for digital property authentication. The order in which the operations or steps are described is not intended to be construed as a limitation, and any number of the described operations may be combined in any order and/or in parallel to implement process 1000.

At block 1002, the process 1000 may include receiving, at an electronic device, data representing a document representing a trade secret. By way of example, a user interface may include a selectable portion that, when selected, may enable identification of a document representing a trade secret. For example, the selectable portion and/or another portion of the user interface may include text requesting that a user of the user interface select the selectable portion to identify a document to be registered as a trade secret in association with the trade secret registry. The user may provide input to the electronic device indicating the document to be registered as a trade secret. The input may include selection of a naming indicator for the document.

At block 1004, the process 1000 may include receiving, at the electronic device, input indicating that the document is to be registered in a trade secret registry associated with a registry system, which may also be described herein as a first remote system. The input may be received, for example, via a user interface with one or more selectable portions. At least one of the selectable portions may be selected by the user to indicate that the document is to be registered with the trade secret registry.

At block 1006, the process 1000 may include generating, based at least in part on receiving the input, a document obfuscation value representing the document. For example, a obfuscation component may receive data corresponding to the document, such as from one or more databases and/or other storage locations associated with the electronic device and/or remote storage accessible by the electronic device. The obfuscation component may then generate a document obfuscation value corresponding to the document. In general, the obfuscation component may receive, as input, text data, image data, formatting data, and/or other data corresponding to the document, and may generate, as output, a document obfuscation value that corresponds to the input. In examples, the electronic device may include multiple obfuscation components that each employ a different hashing algorithm. In these examples, each obfuscation component may output a different document obfuscation value for the same document.

At block 1008, the process 1000 may include sending the document obfuscation value and first request data indicating a first request to generate a block in a blockchain associated with a distributed-ledger system, which may also be described herein as a second remote system. For example, a communications component of the electronic device may format and/or send the document obfuscation value to the registry system, and may generate the request data for sending to the registry system and/or the distributed-ledger system.

At block 1010, the process 1000 may include receiving, from the second remote system, a cryptographic document obfuscation value representing the block in the blockchain. For example, based at least in part on receiving the document obfuscation value and/or the request data, a communications component of the registry system and/or the electronic device may be configured to generate request data indicating a request to register a trade secret in association with a blockchain, such as a blockchain associated with the distributed-ledger system. The request data may be sent to the distributed-ledger system along with, for example, the document obfuscation value and/or an identifier of the document and/or the trade secret, and/or other information associated with the document and/or the trade secret.

The distributed-ledger system may receive the request data and the document obfuscation value (or other data) and may register the document obfuscation value (or the other data) in association with a block of the blockchain. The distributed-ledger system may generate a cryptographic document obfuscation value representing the block in the blockchain and/or the distributed-ledger system may generate a time value indicating a time and/or day that the document obfuscation value (or the other data) was registered with the blockchain. The distributed-ledger system may send the cryptographic document obfuscation value, the time value, and/or other information (such as a block number, for example) to the registry system and/or the electronic device. The registry system and/or the electronic device may receive the cryptographic document obfuscation value from the distributed-ledger system.

At block 1012, the process 1000 may include sending, from the electronic device and to the first remote system, second request data representing a second request to register the document with respect to the trade secret registry. This request data may be sent prior to or after receiving the cryptographic document obfuscation value.

At block 1014, the process 1000 may include generating, by the first remote system, a record in the trade secret registry, the record: indicating that the trade secret has been registered in the trade secret registry; including the cryptographic document obfuscation value; and indicating a time value associated with at least one of generation of the cryptographic document obfuscation value or generation of the record. For example, a record generator of the registry system may then generate a record in the trade secret registry. For example, the record may include an identifier of the record, a naming indicator for the trade secret, a description of the trade secret, a naming indicator of the document, one or more tags, a status identifier for the record, the document obfuscation value, the cryptographic document obfuscation value, the block number, the time value (also described as the block timestamp), insurance policy details, valuation details, and/or other information associated with the trade secret. The record may be stored along with one or more other records in the trade secret registry.

At block 1016, the process 1000 may include generating confirmation data indicating that the record has been generated. The registry system, in examples, may generate confirmation data indicating that the record has been generated.

At block 1018, the process 1000 may include sending the confirmation data from the first remote system to the electronic device. Receipt of the confirmation data may cause display of information, via the user interface, indicating that the trade secret has been registered.

Additionally, or alternatively, the process 1000 may include identifying a first portion and a second portion of the document and generating a second document obfuscation value representing the first portion of the document and a third document obfuscation value representing the second portion of the document. In these examples, generating the first document obfuscation value may be based at least in part on the second document obfuscation value and the third document obfuscation value. For example, the first document obfuscation value may be generated by generating a document obfuscation value of the second and third document obfuscation values. Alternatively, the first document obfuscation value may be generated by combining the second and third document obfuscation values.

Additionally, or alternatively, the process 1000 may include sending, to an insurer system, the document obfuscation value and third request data indicating a third request to generate a second block in a second blockchain associated with the insurer system. The process 1000 may also include receiving, from the insurer system, a second cryptographic document obfuscation value representing the second block in the second blockchain. In examples where the second cryptographic document obfuscation value is received at the electronic device, the electronic device may send the second cryptographic document obfuscation value to the registry system. In these and other examples, the record may associate the second cryptographic document obfuscation value with the trade secret and may indicate a second time value associated with generation of the second cryptographic document obfuscation value.

Additionally, or alternatively, the process 1000 may include generating tag data indicating properties associated with the document. The properties may include at least one of a title, a trade-secret type, and/or an identifier of at least one of a person or an entity associated with the document. The process 1000 may also include storing the tag data in a database associated with the registry system. The tag data may be associated with the document obfuscation value and/or the trade secret. The process 1000 may also include receiving, at the registry system, input data requesting a search of trade secrets associated with the trade secret registry. In these examples, the input data may include a search term. The process 1000 may also include causing, based at least in part on receiving the input data, the tag data to be searched for the search term.

Figure 11:
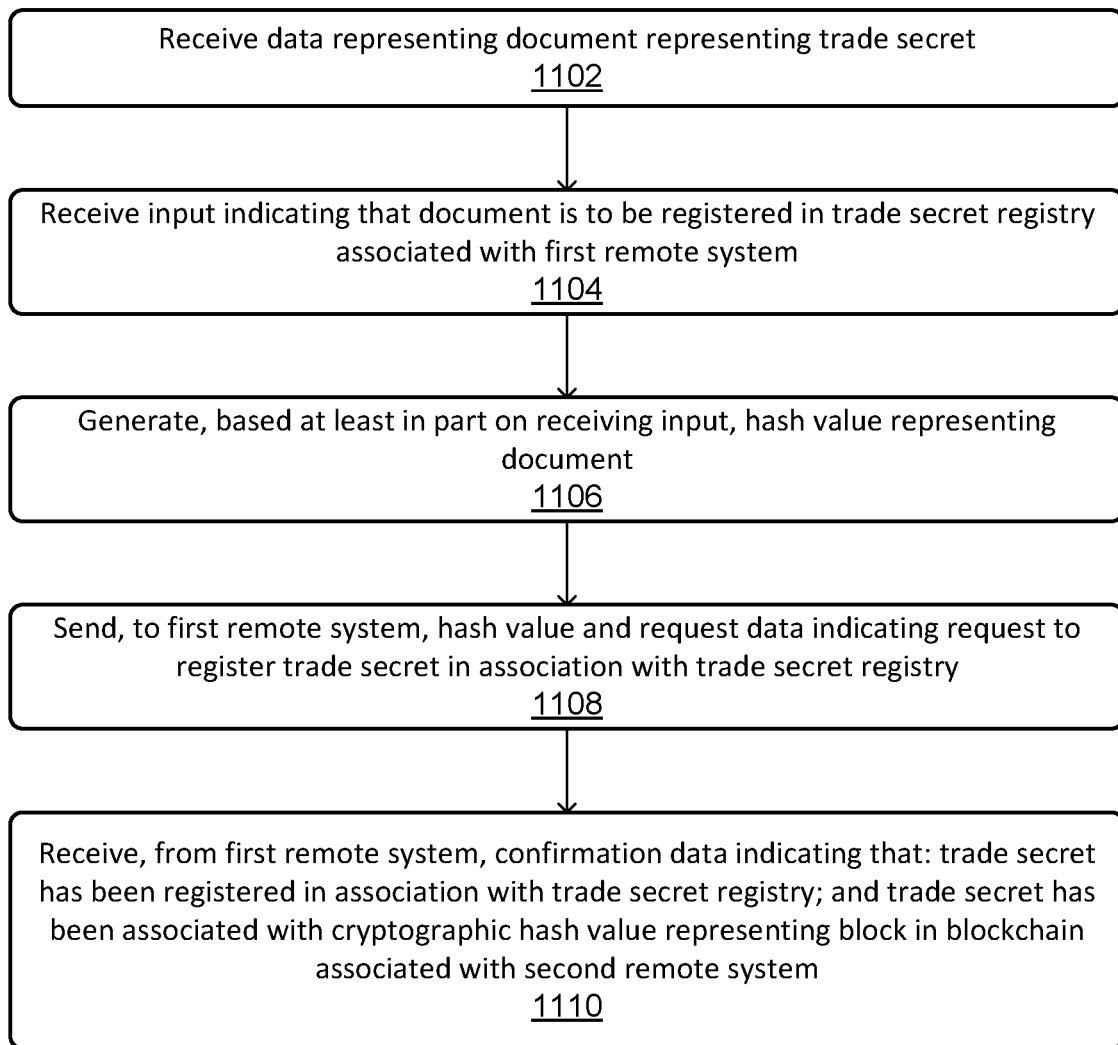
FIG. 11 illustrates a flow diagram of another example process for digital property authentication.

FIG. 11 illustrates a flow diagram of another example process for digital property authentication. The order in which the operations or steps are described is not intended to be construed as a limitation, and any number of the described operations may be combined in any order and/or in parallel to implement process 1100.

At block 1102, the process 1100 may include receiving data representing a document representing a trade secret. By way of example, a user interface may include a selectable portion that, when selected, may enable identification of a document representing a trade secret. For example, the selectable portion and/or another portion of the user interface may include text requesting that a user of the user interface select the selectable portion to identify a document to be registered as a trade secret in association with the trade secret registry. The user may provide input to the electronic device indicating the document to be registered as a trade secret. The input may include selection of a naming indicator for the document.

At block 1104, the process 1100 may include receiving input indicating that the document is to be registered in a trade secret registry associated with a registry system. The input may be received, for example, via a user interface with one or more selectable portions. At least one of the selectable portions may be selected by the user to indicate that the document is to be registered with the trade secret registry.

At block 1106, the process 1100 may include generating, based at least in part on receiving the input, a document obfuscation value representing the document. For example, a obfuscation component may receive data corresponding to the document, such as from one or more databases and/or other storage locations associated with the electronic device and/or remote storage accessible by the electronic device. The obfuscation component may then generate a document obfuscation value corresponding to the document. In general, the obfuscation component may receive, as input, text data, image data, formatting data, and/or other data corresponding to the document, and may generate, as output, a document obfuscation value that corresponds to the input. In examples, the electronic device may include multiple obfuscation components that each employ a different hashing algorithm. In these examples, each obfuscation component may output a different document obfuscation value for the same document.

At block 1108, the process 1100 may include sending, to the registry system, the document obfuscation value and request data indicating a request to register the trade secret in association with the trade secret registry. For example, a communication component of the electronic device may format and/or send the document obfuscation value to the registry system. Additionally, the communication component may generate the request data for sending to the registry system.

At block 1110, the process 1100 may include receiving, from the registry system, confirmation data indicating that: the trade secret has been registered in association with the trade secret registry; and the trade secret has been associated with a cryptographic document obfuscation value representing a block in a blockchain associated with a distributed-ledger system. For example, based at least in part on receiving the document obfuscation value and/or the request data, a communications component of the registry system and/or the electronic device may be configured to generate request data indicating a request to register a trade secret in association with a blockchain, such as a blockchain associated with the distributed-ledger system. The request data may be sent to the distributed-ledger system along with, for example, the document obfuscation value and/or an identifier of the document and/or the trade secret, and/or other information associated with the document and/or the trade secret.

The distributed-ledger system may receive the request data and the document obfuscation value (or other data) and may register the document obfuscation value (or the other data) in association with a block of the blockchain. The distributed-ledger system may generate a cryptographic document obfuscation value representing the block in the blockchain and/or the distributed-ledger system may generate a time value indicating a time and/or day that the document obfuscation value (or the other data) was registered with the blockchain. The distributed-ledger system may send the cryptographic document obfuscation value, the time value, and/or other information (such as a block number, for example) to the registry system and/or the electronic device. The registry system and/or the electronic device may receive the cryptographic document obfuscation value from the distributed-ledger system.

The registry system may then generate the record in the trade secret registry. For example, a record generator of the registry system may then generate a record in the trade secret registry. For example, the record may include an identifier of the record, a naming indicator for the trade secret, a description of the trade secret, a naming indicator of the document, one or more tags, a status identifier for the record, the document obfuscation value, the cryptographic document obfuscation value, the block number, the time value (also described as the block timestamp), insurance policy details, valuation details, and/or other information associated with the trade secret. The record may be stored along with one or more other records in the trade secret registry.

Additionally, or alternatively, the process 1100 may include identifying a first portion and a second portion of the document and generating a second document obfuscation value representing the first portion of the document and a third document obfuscation value representing the second portion of the document. In these examples, generating the first document obfuscation value may be based at least in part on the second document obfuscation value and the third document obfuscation value. For example, the first document obfuscation value may be generated by generating a document obfuscation value of the second and third document obfuscation values. Alternatively, the first document obfuscation value may be generated by combining the second and third document obfuscation values.

Additionally, or alternatively, the process 1100 may include receiving the confirmation data indicating that the trade secret has been associated with a second cryptographic document obfuscation value representing a second block in a second blockchain associated with an insurer system.

Additionally, or alternatively, the process 1100 may include generating, based at least in part on receiving the input, a second document obfuscation value representing the document. In these examples, the second document obfuscation value may be generated utilizing a second hash-value generator that differs from the first hash-value generator. The process 1100 may also include sending the second document obfuscation value to the registry system. In these examples, the confirmation data may indicate that the trade secret has been associated with a second cryptographic document obfuscation value associated with the second document obfuscation value, and that the second cryptographic document obfuscation value represents a second block in a second blockchain associated with a third system.

Additionally, or alternatively, the process 1100 may include receiving second input indicating at least one of a title associated with the document, a trade-secret type associated with the document, and/or identifying information of at least one of a person or an entity associated with the document. The process 1100 may also include generating tag data based at least in part on the second input and sending the tag data to the registry system. The process 1100 may also include receiving third input requesting a search of the trade secret registry, where the third input includes a search term, and sending an indication of the third input to the registry system. The process 1100 may also include receiving response data indicating a result of the search of at least the tag data as performed by the registry system.

Additionally, or alternatively, the process 1100 may include identifying fields of the document, where individual ones of the fields may be associated with a field type. The process 1100 may also include identifying a field value associated with the individual ones of the fields and generating tag data associated with the document based at least in part on the field type and/or the field value for the individual ones of the fields.

Additionally, or alternatively, the process 1100 may include storing security rules associated with a firewall. In these examples, sending the document obfuscation value and the request data may be based at least in part on the security rules allowing the transmission of the document obfuscation value and the request data to the registry system. Also, in these examples, receiving the confirmation data may be based at least in part on the security rules allowing the receipt of the confirmation data from the registry system.

Figure 12:
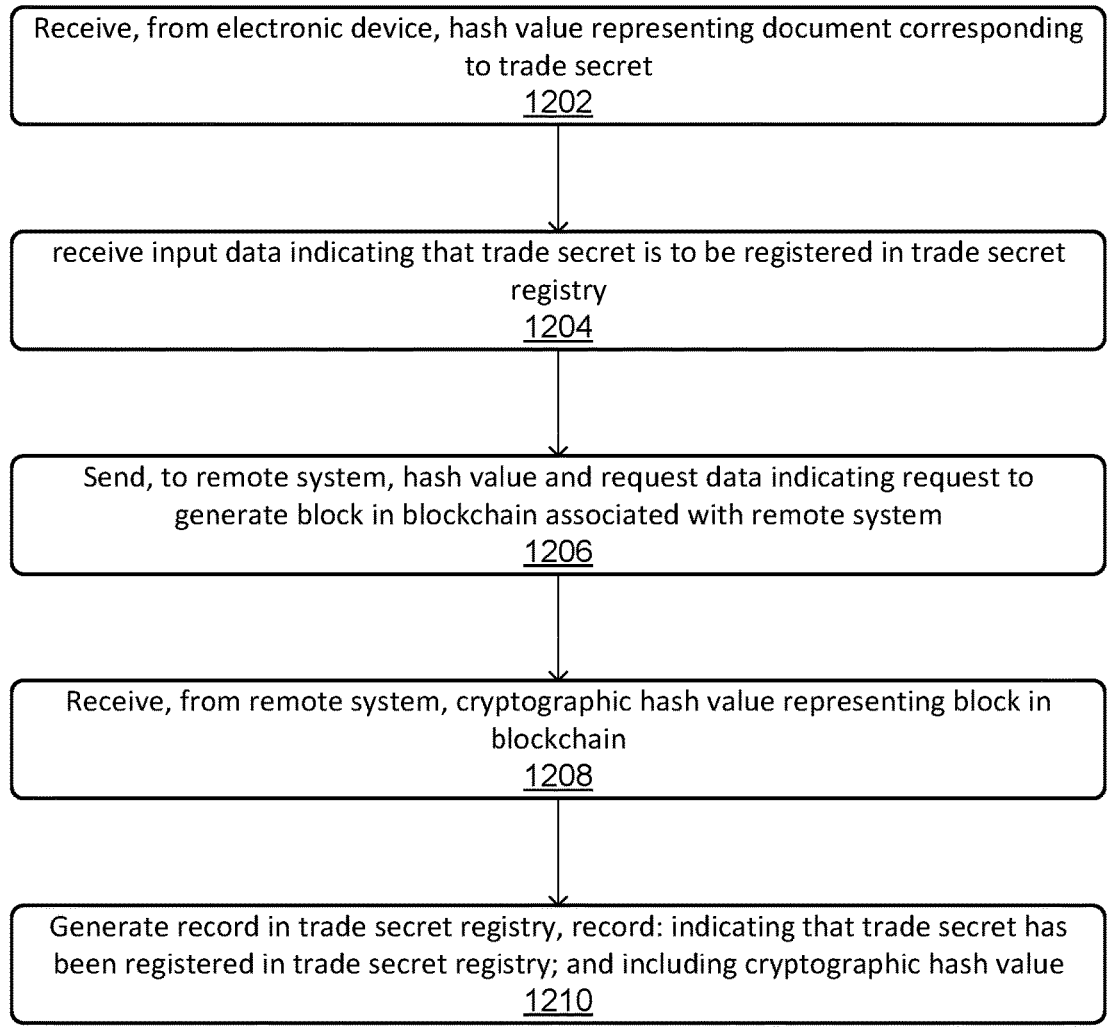
FIG. 12 illustrates a flow diagram of another example process for digital property authentication.

FIG. 12 illustrates a flow diagram of another example process for digital property authentication. The order in which the operations or steps are described is not intended to be construed as a limitation, and any number of the described operations may be combined in any order and/or in parallel to implement process 1200.

At block 1202, the process 1200 may include receiving, from an electronic device, a document obfuscation value representing a document corresponding to a trade secret. For example, a obfuscation component of the electronic device may receive data corresponding to the document, such as from one or more databases and/or other storage locations associated with the electronic device and/or remote storage accessible by the electronic device. The obfuscation component may then generate a document obfuscation value corresponding to the document. In general, the obfuscation component may receive, as input, text data, image data, formatting data, and/or other data corresponding to the document, and may generate, as output, a document obfuscation value that corresponds to the input. In examples, the electronic device may include multiple obfuscation components that each employ a different hashing algorithm. In these examples, each obfuscation component may output a different document obfuscation value for the same document.

At block 1204, the process 1200 may include receiving input data indicating that the trade secret is to be registered in a trade secret registry. For example, a communication component of the electronic device may format and/or send the input data to the system.

At block 1206, the process 1200 may include sending, to a remote system, the document obfuscation value and request data indicating a request to generate a block in a blockchain associated with the remote system. For example, a communications component of the electronic device may format and/or send the document obfuscation value to the system, and may generate the request data for sending to the system and/or the remote system.

At block 1208, the process 1200 may include receiving, from the remote system, a cryptographic document obfuscation value representing the block in the blockchain. For example, based at least in part on receiving the document obfuscation value and/or the request data, a communications component of the system and/or the electronic device may be configured to generate request data indicating a request to register a trade secret in association with a blockchain, such as a blockchain associated with the remote system. The request data may be sent to the remote system along with, for example, the document obfuscation value and/or an identifier of the document and/or the trade secret, and/or other information associated with the document and/or the trade secret.

The remote system may receive the request data and the document obfuscation value (or other data) and may register the document obfuscation value (or the other data) in association with a block of the blockchain. The remote system may generate a cryptographic document obfuscation value representing the block in the blockchain and/or the remote system may generate a time value indicating a time and/or day that the document obfuscation value (or the other data) was registered with the blockchain. The remote system may send the cryptographic document obfuscation value, the time value, and/or other information (such as a block number, for example) to the system and/or the electronic device. The system and/or the electronic device may receive the cryptographic document obfuscation value from the remote system.

At block 1210, the process 1200 may include generating a record in the trade secret registry, the record: indicating that the trade secret has been registered in the trade secret registry; and including the cryptographic document obfuscation value. For example, a record generator of the system may then generate a record in the trade secret registry. For example, the record may include an identifier of the record, a naming indicator for the trade secret, a description of the trade secret, a naming indicator of the document, one or more tags, a status identifier for the record, the document obfuscation value, the cryptographic document obfuscation value, the block number, the time value (also described as the block timestamp), insurance policy details, valuation details, and/or other information associated with the trade secret. The record may be stored along with one or more other records in the trade secret registry.

Additionally, or alternatively, the process 1200 may include receiving, from the electronic device, a second document obfuscation value representing the document and second, to a distributed-ledger system, the second document obfuscation value and second request data indicating a second request to generate a second block in a second blockchain associated with the distributed-ledger system. The process 1200 may also include receiving, from the distributed-ledger system, a second cryptographic document obfuscation value representing the second block in the second blockchain. In these examples, the record may associate the second cryptographic document obfuscation value with the trade secret.

Additionally, or alternatively, the process 1200 may include receiving an identifier corresponding to at least one of the electronic device and/or an entity associated with the electronic device. The process 1200 may also include associating the identifier with the first record and determining that a second record associated with the trade secret registry is associated with the identifier. The process 1200 may also include associating the first record with the second record based at least in part on determining that the first record and the second record are associated with the identifier.

Additionally, or alternatively, the process 1200 may include sending, to a distributed-ledger system, the document obfuscation value and second request data indicating a second request to generate a second block in a second blockchain associated with the distributed-ledger system. The process 1200 may also include receiving, from the distributed-ledger system, a second cryptographic document obfuscation value representing the second block in the second blockchain. In these examples, the record may associate the second cryptographic document obfuscation value with the trade secret.

Additionally, or alternatively, the process 1200 may include receiving second input data indicating at least one of a title associated with the document, a trade-secret type associated with the document, or an identifier of at least one of a person or an entity associated with the document. The process 1200 may also include generating tag data based at least in part on the second input data. The process 1200 may also include receiving third input data requesting a search of trade secrets associated with the trade secret registry, where the third input data may include a search term. The process 1200 may also include causing, based at least in part on receiving the third input data, the tag data to be searched for the search term.

Additionally, or alternatively, the process 1200 may include identifying fields of the document, where individual ones of the fields may be associated with a field type. The process 1200 may also include identifying a field value associated with the individual ones of the fields and generating tag data associated with the document based at least in part on the field type and/or the field value for the individual ones of the fields.

Figure 13:
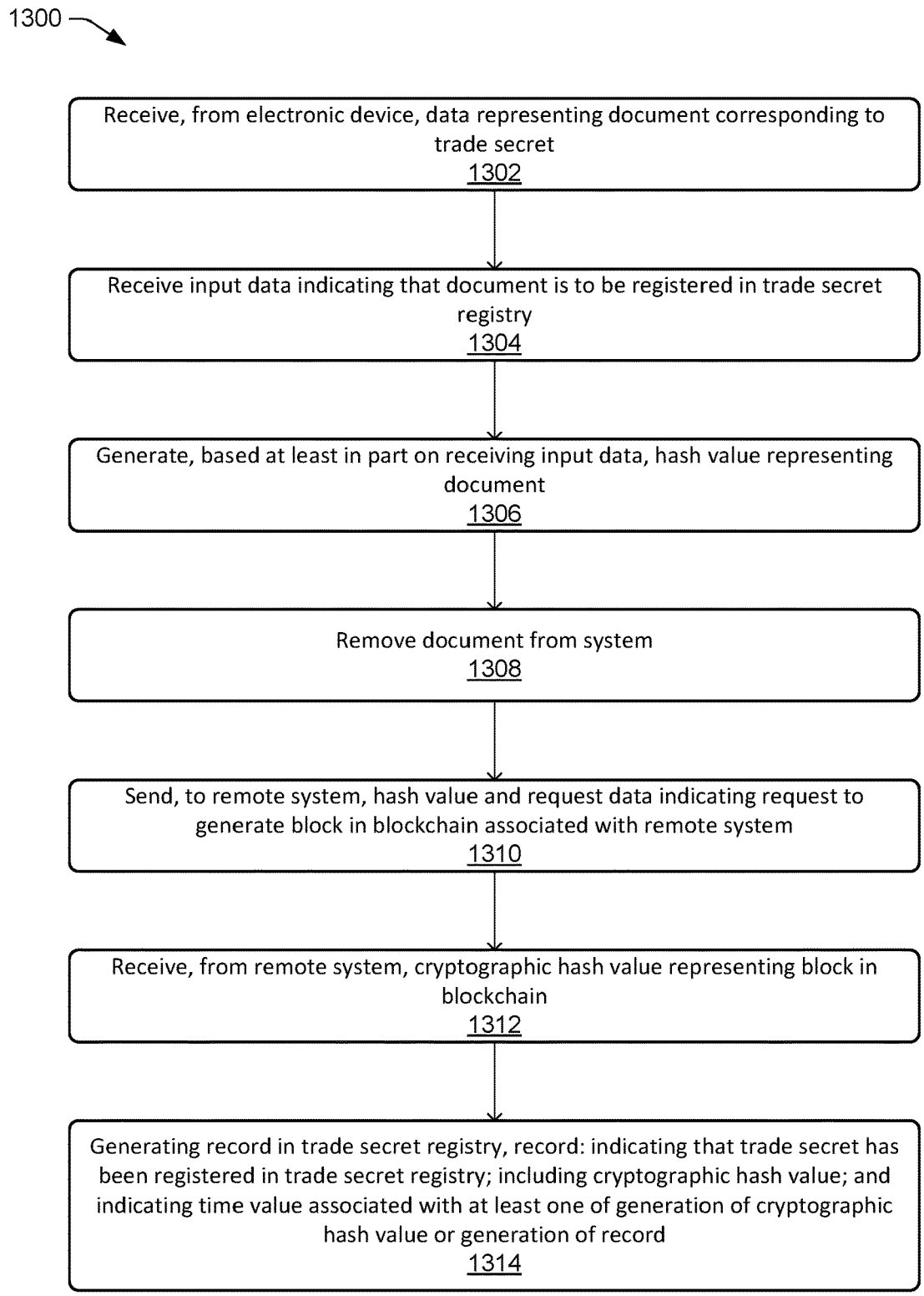
FIG. 13 illustrates a flow diagram of another example process for digital property authentication.

FIG. 13 illustrates a flow diagram of another example process for digital property authentication. The order in which the operations or steps are described is not intended to be construed as a limitation, and any number of the described operations may be combined in any order and/or in parallel to implement process 1300.

At block 1302, the process 1300 may include receiving, from an electronic device, data representing a document corresponding to a trade secret. By way of example, a user interface may include a selectable portion that, when selected, may enable identification of a document representing a trade secret. For example, the selectable portion and/or another portion of the user interface may include text requesting that a user of the user interface select the selectable portion to identify a document to be registered as a trade secret in association with the trade secret registry. The user may provide input to the electronic device indicating the document to be registered as a trade secret. The input may include selection of a naming indicator for the document.

At block 1304, the process 1300 may include receiving input data indicating that the document is to be registered in a trade secret registry. The input may be received, for example, via a user interface with one or more selectable portions. At least one of the selectable portions may be selected by the user to indicate that the document is to be registered with the trade secret registry.

At block 1306, the process 1300 may include generating, based at least in part on receiving the input data, a document obfuscation value representing the document. For example, a obfuscation component of the electronic device and/or the system associated with the trade secret registry may receive data corresponding to the document, such as from one or more databases and/or other storage locations associated with the electronic device and/or the system, and/or remote storage accessible by the electronic device and/or the system. The obfuscation component may then generate a document obfuscation value corresponding to the document. In general, the obfuscation component may receive, as input, text data, image data, formatting data, and/or other data corresponding to the document, and may generate, as output, a document obfuscation value that corresponds to the input. In examples, the electronic device may include multiple obfuscation components that each employ a different hashing algorithm. In these examples, each obfuscation component may output a different document obfuscation value for the same document.

At block 1308, the process 1300 may include removing the document from the system. For example, once the document obfuscation value is generated, for security reasons among others, the document may be removed from the system such that it is not stored or otherwise available to anyone accessing the system, other than the electronic device from which the document was received.

At block 1310, the process 1300 may include sending, to a remote system, the document obfuscation value and request data indicating a request to generate a block in a blockchain associated with the remote system. For example, a communication component of the system may format and/or send the document obfuscation value and the request data to the remote system.

At block 1312, the process 1300 may include receiving, from the remote system, a cryptographic document obfuscation value representing the block in the blockchain. For example, based at least in part on receiving the document obfuscation value and/or the request data, a communications component of the system and/or the electronic device may be configured to generate request data indicating a request to register a trade secret in association with a blockchain, such as a blockchain associated with the remote system. The request data may be sent to the remote system along with, for example, the document obfuscation value and/or an identifier of the document and/or the trade secret, and/or other information associated with the document and/or the trade secret.

The remote system may receive the request data and the document obfuscation value (or other data) and may register the document obfuscation value (or the other data) in association with a block of the blockchain. The remote system may generate a cryptographic document obfuscation value representing the block in the blockchain and/or the remote system may generate a time value indicating a time and/or day that the document obfuscation value (or the other data) was registered with the blockchain. The remote system may send the cryptographic document obfuscation value, the time value, and/or other information (such as a block number, for example) to the system and/or the electronic device. The system and/or the electronic device may receive the cryptographic document obfuscation value from the remote system.

At block 1314, the process 1300 may include generating a record in the trade secret registry, the record: indicating that the trade secret has been registered in the trade secret registry; including the cryptographic document obfuscation value; and indicating a time value associated with at least one of generation of the cryptographic document obfuscation value or generation of the record. For example, a record generator of the system may then generate a record in the trade secret registry. For example, the record may include an identifier of the record, a naming indicator for the trade secret, a description of the trade secret, a naming indicator of the document, one or more tags, a status identifier for the record, the document obfuscation value, the cryptographic document obfuscation value, the block number, the time value (also described as the block timestamp), insurance policy details, valuation details, and/or other information associated with the trade secret. The record may be stored along with one or more other records in the trade secret registry.

Additionally, or alternatively, the process 1300 may include generating, based at least in part on receiving the input data, a second document obfuscation value representing the document, the second document obfuscation value generated utilizing a second hash-value generator that differs from the first hash-value generator. The process 1300 may also include sending, to a distributed-ledger system, the second document obfuscation value and second request data indicating a second request to generate a second block in a second blockchain associated with the distributed-ledger system. The process 1300 may also include receiving, from the distributed-ledger system, a second cryptographic document obfuscation value representing the second block in the second blockchain. In these examples, the record may associate the second cryptographic document obfuscation value with the trade secret.

Additionally, or alternatively, the process 1300 may include receiving an identifier corresponding to at least one of the electronic device and/or an entity associated with the electronic device. The process 1300 may also include associating the identifier with the first record and determining that a second record associated with the trade secret registry is associated with the identifier. The process 1300 may also include associating the first record with the second record based at least in part on determining that the first record and the second record are associated with the identifier.

Additionally, or alternatively, the process 1300 may include identifying a first portion and a second portion of the document and generating a second document obfuscation value representing the first portion of the document and a third document obfuscation value representing the second portion of the document. In these examples, generating the first document obfuscation value may be based at least in part on the second document obfuscation value and the third document obfuscation value. For example, the first document obfuscation value may be generated by generating a document obfuscation value of the second and third document obfuscation values. Alternatively, the first document obfuscation value may be generated by combining the second and third document obfuscation values.

Additionally, or alternatively, the process 1300 may include sending, to a distributed-ledger system, the document obfuscation value and second request data indicating a second request to generate a second block in a second blockchain associated with the distributed-ledger system. The process 1300 may also include receiving, from the distributed-ledger system, a second cryptographic document obfuscation value representing the second block in the second blockchain. In these examples, the record may associate the second cryptographic document obfuscation value with the trade secret.

Additionally, or alternatively, the process 1300 may include receiving second input data indicating at least one of a title associated with the document, a trade-secret type associated with the document, or an identifier of at least one of a person or an entity associated with the document. The process 1300 may also include generating tag data based at least in part on the second input data. The process 1300 may also include receiving third input data requesting a search of trade secrets associated with the trade secret registry, where the third input data may include a search term. The process 1300 may also include causing, based at least in part on receiving the third input data, the tag data to be searched for the search term.

Additionally, or alternatively, the process 1300 may include identifying fields of the document, where individual ones of the fields may be associated with a field type. The process 1300 may also include identifying a field value associated with the individual ones of the fields and generating tag data associated with the document based at least in part on the field type and/or the field value for the individual ones of the fields.

Additionally, or alternatively, the process 1300 may include storing security rules associated with a firewall. In these examples, receiving the data representing the document may be based at least in part on the security rules allowing the receipt of the data from the electronic device. Additionally, sending the document obfuscation value and the request data may be based at least in part on the security rules allowing the transmission of the document obfuscation value and the request data to the remote system. Additionally, sending the confirmation data may be based at least in part on the security rules allowing the transmission of the confirmation data to the electronic device.

Figure 14:
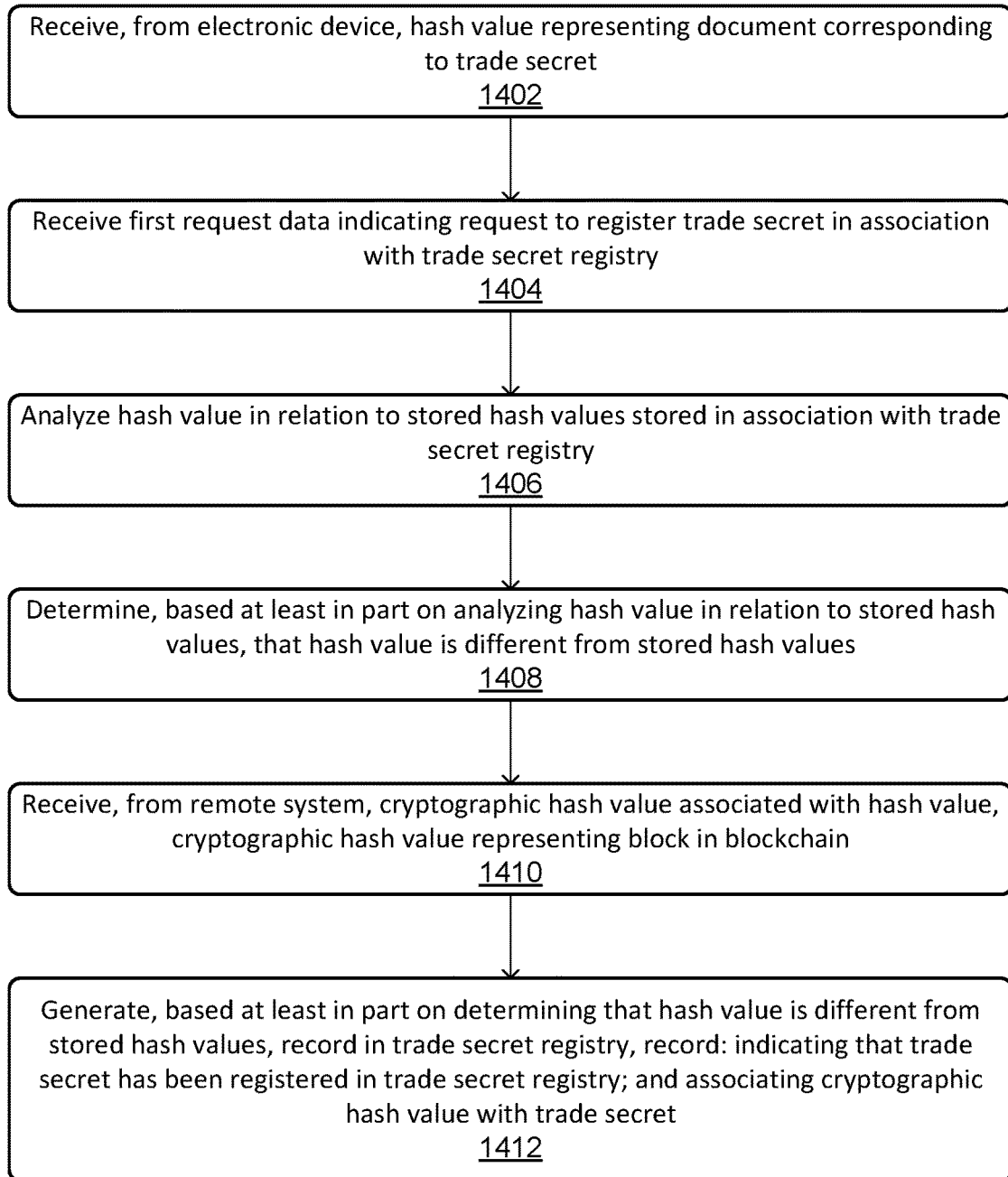
FIG. 14 illustrates a flow diagram of an example process for identifying distinctions between documents associated with a digital property authentication and management system.

FIG. 14 illustrates a flow diagram of an example process for identifying distinctions between documents associated with a digital property authentication and management system. The order in which the operations or steps are described is not intended to be construed as a limitation, and any number of the described operations may be combined in any order and/or in parallel to implement process 1400.

At block 1402, the process 1400 may include receiving, from an electronic device, a document obfuscation value representing a document corresponding to a trade secret. For example, a obfuscation component of the electronic device may receive data corresponding to the document, such as from one or more databases and/or other storage locations associated with the electronic device and/or remote storage accessible by the electronic device. The obfuscation component may then generate a document obfuscation value corresponding to the document. In general, the obfuscation component may receive, as input, text data, image data, formatting data, and/or other data corresponding to the document, and may generate, as output, a document obfuscation value that corresponds to the input. In examples, the electronic device may include multiple obfuscation components that each employ a different hashing algorithm. In these examples, each obfuscation component may output a different document obfuscation value for the same document.

At block 1404, the process 1400 may include receiving first request data indicating a request to register the trade secret in association with a trade secret registry. For example, a communication component of the electronic device may format and/or send the input data to the system.

At block 1406, the process 1400 may include analyzing the document obfuscation value in relation to stored document obfuscation values stored in association with the trade secret registry. For example, a comparison component may be configured to analyze the document obfuscation values and determine degrees of similarity and/or degrees or differences between the document obfuscation values and/or the documents corresponding to the document obfuscation values. For example, as described above, the obfuscation component(s) may generate document obfuscation values corresponding to documents representing trade secrets. Similar documents may have similar document obfuscation values. As such, the comparison component may analyze the document obfuscation values to determine a degree of similarity between them. A threshold degree of similarity may be identified and/or determined and the degree of similarity between document obfuscation values may be compared to the threshold degree of similarity. Document obfuscation values with a degree of similarity that meets or exceeds the threshold degree of similarity may be determined to be similar, while hash-value pairs that fall below the threshold degree of similarity may be determined to be dissimilar. Additionally, document obfuscation values may be segmented and the segments may be compared to determine portions of the document obfuscation values that are similar and portions that are not. The number of similar versus dissimilar document obfuscation values may be utilized to determine an overall degree of similarity between document obfuscation values.

In other examples, a feature vector may be associated with some or all of the document obfuscation values. The feature vector may correspond to characteristics of the document obfuscation value and/or the document. For example, the presence or absence of text data and/or image data from the document may impact the feature vector. In other examples, the text data and/or image data itself may impact the feature vector. Other factors such as document length, the entity associated with the document, creation date, modification date, and/or other metadata may impact the feature vector. By way of example, a feature may be described as an individual measurable property or characteristic of a document. A given feature may be numeric and/or may be considered a string and/or a graphic. A set of such features may be described as a feature vector. As such, similar feature vectors indicate similar characteristics and/or properties of the documents they represent. A similarity and/or popularity score may be determined for a given pair of feature vectors, with more favorable scores indicating a high degree of similarity between documents.

In other examples, Levenshtein distances may be utilized to determine a degree of similarity between trade secrets. A Levenshtein distance may be determined between two document obfuscation values and/or documents. A shorter Levenshtein distance may indicate more similarity than a longer Levenshtein distance. As used herein, a Levenshtein distance, also known as an edit distance, may be described as a string metric for measuring the difference between two sequences. For example, the Levenshtein distance between two words may be considered the minimum number of single-character edits to change one word into the other. As such, the Levenshtein distance between two very similar words would be shorter than a Levenshtein distance between two very different words. In these examples, a Levenshtein distance may be determined between two documents and/or two document obfuscation values representing those documents, with shorter Levenshtein distances indicating more similarity between documents.

The comparison component may be configured to determine if a to-be-registered trade secret is unique with respect to other trade secrets registered in association with the trade secret registry. For example, the document obfuscation values and/or documents may be analyzed as described herein to determine whether a given document obfuscation value is different from one or more stored document obfuscation values associated with registered trade secrets. If the document obfuscation value is different, then the to-be-registered trade secret may be identified as or determined to be unique with respect to other trade secrets associated with the trade secret registry. In examples, determining that the document obfuscation value is different from the stored document obfuscation values may include determining a degree of similarity between the document obfuscation values and determining that the degree of similarity does not exceed a threshold degree of similarity.

At block 1408, the process 1400 may include determining, based at least in part on analyzing the document obfuscation value in relation to the stored document obfuscation values, that the document obfuscation value is different from the stored document obfuscation values. For example, determining that the document obfuscation value is different from the stored document obfuscation values may be based at least in part on the results from the comparison component as described with respect to block 1406.

At block 1410, the process 1400 may include receiving, from the remote system, a cryptographic document obfuscation value associated with the document obfuscation value, the cryptographic document obfuscation value representing a block in the blockchain. For example, based at least in part on receiving the document obfuscation value and/or the request data, a communications component of the system and/or the electronic device may be configured to generate request data indicating a request to register a trade secret in association with a blockchain, such as a blockchain associated with the remote system. The request data may be sent to the remote system along with, for example, the document obfuscation value and/or an identifier of the document and/or the trade secret, and/or other information associated with the document and/or the trade secret.

At block 1412, the process 1400 may include generating, based at least in part on determining that the document obfuscation value is different from the stored document obfuscation values, a record in the trade secret registry, the record: indicating that the trade secret has been registered in the trade secret registry; and associating the cryptographic document obfuscation value with the trade secret. For example, a record generator of the system may then generate a record in the trade secret registry. For example, the record may include an identifier of the record, a naming indicator for the trade secret, a description of the trade secret, a naming indicator of the document, one or more tags, a status identifier for the record, the document obfuscation value, the cryptographic document obfuscation value, the block number, the time value (also described as the block timestamp), insurance policy details, valuation details, and/or other information associated with the trade secret. The record may be stored along with one or more other records in the trade secret registry.

Additionally, or alternatively, the process 1400 may include associating the trade secret with at least one trade secret associated with the at least one of the stored document obfuscation values based at least in part on determining that a degree of similarity between the document obfuscation value and a stored document obfuscation value is greater than a threshold degree of similarity and/or determining that an entity identifier associated with the document obfuscation value is associated with the store document obfuscation value.

Additionally, or alternatively, the process 1400 may include generating confirmation data indicating that the record has been associated with the trade secret registry and/or the document has been determined to be unique with respect to other documents registered in association with the trade secret registry. The process 1400 may also include sending the confirmation data to the electronic device, such as for display via a user interface.

FIG. 15 illustrates a flow diagram of an example process associated with a user interface in accordance with a digital property authentication and management system. The order in which the operations or steps are described is not intended to be construed as a limitation, and any number of the described operations may be combined in any order and/or in parallel to implement process 1500.

At block 1502, the process 1500 may include causing display of a user interface including a first selectable portion indicating an option to register a trade secret in a trade secret registry associated with a remote system. For example, the user interface may be cause to be displayed on a screen of an electronic device. The first selectable portion may be displayed via the user interface in a manner such that a user may provide input to select the selectable portion. In examples, the first selectable portion may include text such as "register," which may provide an indication of the functionality associated with selection of the first selectable portion.

At block 1504, the process 1500 may include receiving, via the user interface, first input indicating selection of the first selectable portion. The input may be received via touch input on the screen of the electronic device and/or by tactile and/or audible input using, for example, an instrument such as a mouse or keyboard.

At block 1506, the process 1500 may include causing, based at least in part on receiving the first input, display of a second selectable portion requesting identification of a document to be registered as the trade secret. Causing display of the second selectable portion may be the same or similar to causing display of the first selectable portion, as described with respect to block 1502.

At block 1508, the process 1500 may include receiving, utilizing the second selectable portion of the user interface, second input identifying the document. Identification of the document may include input such as a naming indicator for the document and/or selection of a document from a database of an electronic device displaying the user interface, for example. The document may be identified and the electronic device may cause a document obfuscation value to be generated corresponding to the document. For example, a obfuscation component may receive data corresponding to the document, such as from one or more databases and/or other storage locations associated with the electronic device and/or remote storage accessible by the electronic device. The obfuscation component may then generate a document obfuscation value corresponding to the document. In general, the obfuscation component may receive, as input, text data, image data, formatting data, and/or other data corresponding to the document, and may generate, as output, a document obfuscation value that corresponds to the input. In examples, the electronic device may include multiple obfuscation components that each employ a different hashing algorithm. In these examples, each obfuscation component may output a different document obfuscation value for the same document.

At block 1510, the process 1500 may include causing, based at least in part on the second input, display of a record associated with the trade secret registry, the record indicating: that a document obfuscation value generated based at least in part on the document has been registered in association with the trade secret registry; that a cryptographic document obfuscation value associated with a block of a blockchain has been registered in association with the trade secret registry; and a time value associated with at least one of generation of the cryptographic document obfuscation value or generation of the record. The record may include a record identifier, trade-secret details, and/or transaction details. The record identifier may include numbers and/or letters that identify the record with respect to the trade secret registry. The trade-secret details may, for example, include a naming indicator for the trade secret, a description of the trade secret, a naming indicator for the document representing the trade secret, and/or the tags generated as described elsewhere herein. The transaction details may include a status of the registration with the trade secret registry, the document obfuscation value, a block number associated with the block at which the trade secret is registered with the blockchain, the cryptographic document obfuscation value (also described as the block document obfuscation value), and/or the block timestamp. Other information that may be included in the record and displayed with respect to the user interface may include insurance policy details, valuation details, and/or other information associated with the trade secret, as described more fully elsewhere herein.

The record may be generated by a record generator of the remote system associated with the trade secret registry. The record may be stored along with one or more other records in the trade secret registry. The remote system, in examples, may generate confirmation data indicating that the record has been generated, and the confirmation data may be sent to the electronic device for display via a user interface.

Additionally, or alternatively, the process 1500 may include causing display of a third selectable portion indicating a second option to acquire an insurance policy associated with the trade secret and receiving, via the user interface, third input indicating selection of the third selectable portion. The process 1500 may also include causing, based at least in part on receiving the third input, display of one or more requests for information associated with at least one of the insurance policy or the trade secret. Also, one or more input fields configured to receive textual input in response to the one or more requests for information may be caused to be displayed. The process 1500 may also include receiving, via the user interface, the textual input to individual ones of the one or more input fields and receiving, from a distributed-ledger system associated with an insurer, an indication that the insurance policy has been issued. The process 1500 may also include causing display, via the user interface, of insurance-policy information associated with the insurance policy.

Additionally, or alternatively, the process 1500 may include causing display, via the user interface, of input fields associated with the document. In these examples, the input fields may include at least one of a document-name field, a document-description field, and/or a tag field. The process 1500 may also include causing display, via the user interface, of a third selectable portion indicating a second option to auto-populate at least one of the input fields. The process 1500 may also include receiving, via the user interface, third input indicating selection of the third selectable portion and causing, based at least in part on the third input, display of text in the at least one of the input fields.

Additionally, or alternatively, the process 1500 may include causing display, via the user interface, of a third selectable option indicating a second option to associate an information document with the trade secret. In these examples, the informational document may indicate information associated with a value of the trade secret. The process 1500 may also include receiving, utilizing the third selectable portion of the user interface, third input identifying the information document. The process 1500 may also include causing display, via the user interface, of the value determined by the remote system based at least in part on the information document. In these examples, the record may indicate a second cryptographic document obfuscation value associated with a second block of the blockchain where the information document has been registered.

Figure 16:
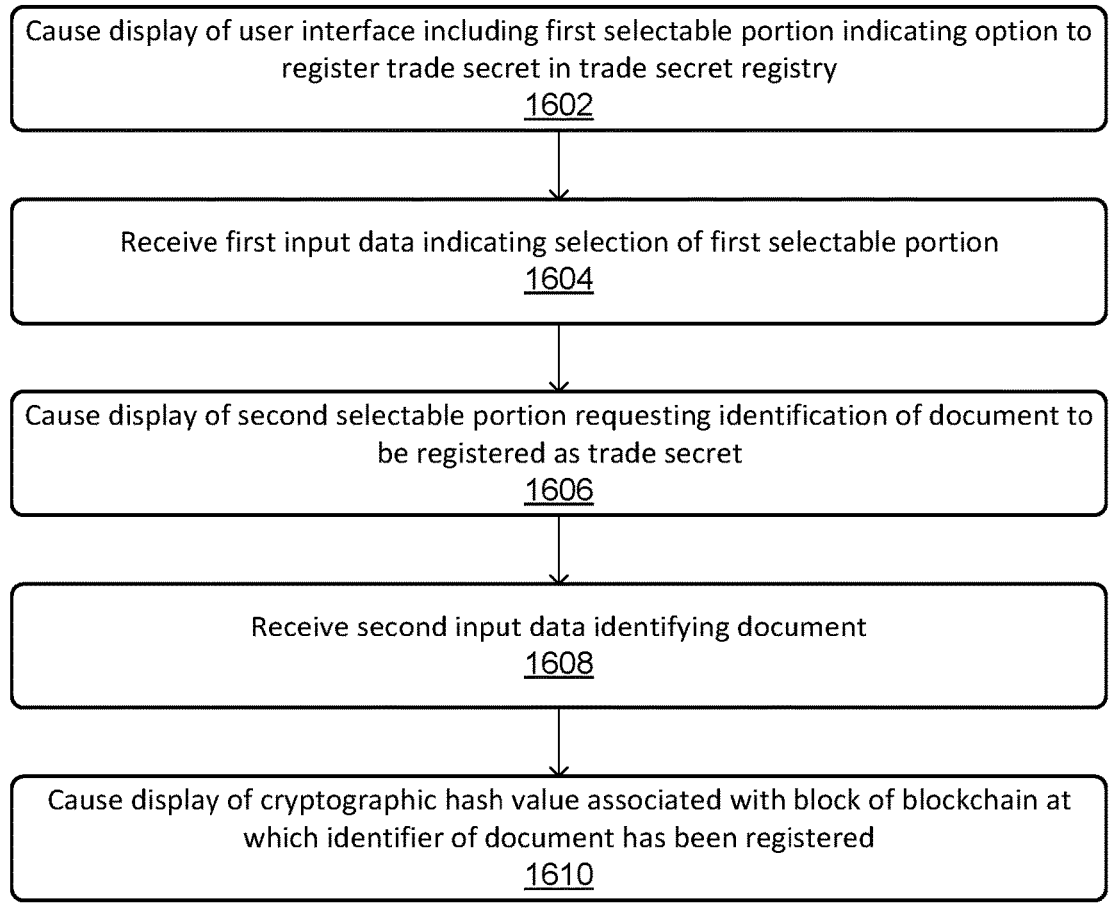
FIG. 16 illustrates a flow diagram of another example process associated with a user interface in accordance with a digital property authentication and management system.

FIG. 16 illustrates a flow diagram of another example process associated with a user interface in accordance with a digital property authentication and management system. The order in which the operations or steps are described is not intended to be construed as a limitation, and any number of the described operations may be combined in any order and/or in parallel to implement process 1600.

At block 1602, the process 1600 may include causing display of a user interface including a first selectable portion indicating an option to register a trade secret in a trade secret registry. For example, the user interface may be cause to be displayed on a screen of an electronic device. The first selectable portion may be displayed via the user interface in a manner such that a user may provide input to select the selectable portion. In examples, the first selectable portion may include text such as "register," which may provide an indication of the functionality associated with selection of the first selectable portion.

At block 1604, the process 1600 may include receiving first input data indicating selection of the first selectable portion. The input may be received via touch input on the screen of the electronic device and/or by tactile and/or audible input using, for example, an instrument such as a mouse or keyboard.

At block 1606, the process 1600 may include causing display of a second selectable portion requesting identification of a document to be registered as the trade secret. Causing display of the second selectable portion may be the same or similar to causing display of the first selectable portion, as described with respect to block 1602.

At block 1608, the process 1600 may include receiving second input data identifying the document. Identification of the document may include input such as a naming indicator for the document and/or selection of a document from a database of an electronic device displaying the user interface, for example. The document may be identified and the electronic device may cause a document obfuscation value to be generated corresponding to the document. For example, a obfuscation component may receive data corresponding to the document, such as from one or more databases and/or other storage locations associated with the electronic device and/or remote storage accessible by the electronic device. The obfuscation component may then generate a document obfuscation value corresponding to the document. In general, the obfuscation component may receive, as input, text data, image data, formatting data, and/or other data corresponding to the document, and may generate, as output, a document obfuscation value that corresponds to the input. In examples, the electronic device may include multiple obfuscation components that each employ a different hashing algorithm. In these examples, each obfuscation component may output a different document obfuscation value for the same document.

At block 1610, the process 1600 may include causing display of a cryptographic document obfuscation value associated with a block of a blockchain at which an identifier of the document has been registered. The cryptographic document obfuscation value may be a portion of a record, which may also include a record identifier, trade-secret details, and/or transaction details. The record identifier may include numbers and/or letters that identify the record with respect to the trade secret registry. The trade-secret details may, for example, include a naming indicator for the trade secret, a description of the trade secret, a naming indicator for the document representing the trade secret, and/or the tags generated as described elsewhere herein. The transaction details may include a status of the registration with the trade secret registry, the document obfuscation value, a block number associated with the block at which the trade secret is registered with the blockchain, the cryptographic document obfuscation value (also described as the block document obfuscation value), and/or the block timestamp.

Other information that may be included in the record and displayed with respect to the user interface may include insurance policy details, valuation details, and/or other information associated with the trade secret, as described more fully elsewhere herein.

Additionally, or alternatively, the process 1600 may include causing display of a third selectable portion indicating a second option to acquire an insurance policy associated with the trade secret and receiving, via the user interface, third input indicating selection of the third selectable portion. The process 1600 may also include causing, based at least in part on receiving the third input, display of one or more requests for information associated with at least one of the insurance policy or the trade secret. Also, one or more input fields configured to receive textual input in response to the one or more requests for information may be caused to be displayed. The process 1600 may also include receiving, via the user interface, the textual input to individual ones of the one or more input fields and receiving, from a distributed-ledger system associated with an insurer, an indication that the insurance policy has been issued. The process 1600 may also include causing display, via the user interface, of insurance-policy information associated with the insurance policy.

Additionally, or alternatively, the process 1600 may include causing display, via the user interface, of input fields associated with the document. In these examples, the input fields may include at least one of a document-name field, a document-description field, and/or a tag field. The process 1600 may also include causing display, via the user interface, of a third selectable portion indicating a second option to auto-populate at least one of the input fields. The process 1600 may also include receiving, via the user interface, third input indicating selection of the third selectable portion and causing, based at least in part on the third input, display of text in the at least one of the input fields.

Additionally, or alternatively, the process 1600 may include receiving input data representing user input to manipulate text from the input fields. The process 1600 may also include causing display, with respect to the input field, of manipulated text based at least in part on the fourth input data. The process 1600 may also include causing display, via the user interface, of a fourth selectable portion requesting confirmation of the manipulated text as displayed in the input field. The process 1600 may also include receiving, via the user interface, input data indicating selection of the selectable portion and causing, based at least in part on the input data, the manipulated text to be associated with the identifier of the document.

Additionally, or alternatively, the process 1600 may include causing display, via the user interface, of a third selectable option indicating a second option to associate an information document with the trade secret. In these examples, the informational document may indicate information associated with a value of the trade secret. The process 1600 may also include receiving, utilizing the third selectable portion of the user interface, third input identifying the information document. The process 1600 may also include causing display, via the user interface, of the value determined by the remote system based at least in part on the information document. In these examples, the record may indicate a second cryptographic document obfuscation value associated with a second block of the blockchain where the information document has been registered.

Additionally, or alternatively, the process 1600 may include determining a characteristic of the document based at least in part on a document obfuscation value corresponding to the document and determining, based at least in part on the characteristic, a trade-secret type associated with the document. The process 1600 may also include causing display, via the user interface, of text indicating the trade-secret type.

Additionally, or alternatively, the process 1600 may include causing display, via the user interface, of a trade-secret repository screen including the first identifier of the first document associated with an entity identifier, a second identifier of a second document associated with the entity identifier, and/or a search field configured to receive input to search records in the trade secret registry associated with the entity identifier. The process 1600 may also include receiving third input data indicating text as entered into the search field and causing display, via the user interface, of one or more of the records based at least in part on the text as entered into the search field.

Additionally, or alternatively, the process 1600 may include causing display, via the user interface, of a third selectable portion indicating a second option to verify that a second document corresponds to the first document. The process 1600 may also include receiving third input data indicating selection of the third selection portion and causing display of a fourth selectable portion requesting identification of the second document. The process 1600 may also include receiving fourth input data identifying the second document and causing display, via the user interface, of an indication that a first document obfuscation value associated with the first document has at least a threshold degree of similarity with a second document obfuscation value associated with the second document.

Additionally, or alternatively, the process 1600 may include determining that a first document obfuscation value associated with a first document has at least a threshold degree of similarity with a second document obfuscation value associated with the second document, and associating the first document with the second document based at least in part on determining that the first document obfuscation value has at least a threshold degree of similarity with the second document obfuscation value. The process 1600 may also include causing display, via the user interface, of an indication that the first document has been associated with the second document.

Additionally, or alternatively, the process 1600 may include determining that a first document obfuscation value associated with the document has less than a threshold degree of similarity with document obfuscation values registered in association with the trade secret registry and determining, based at least in part on the first document obfuscation value having less than the threshold degree of similarity with the document obfuscation values, that the document is unique with respect to the trade secret registry. The process 1600 may also include causing display, via the user interface, of an indication that the document is unique with respect to the trade secret registry.

Additionally, or alternatively, the process 1600 may include causing display, via the user interface, of insurance-policy information associated with an insurance policy issued for the trade secret. In these examples, the insurance-policy information may include a payout value associated with an amount of money to be paid to an entity associated with the trade secret upon the occurrence of an event. The process 1600 may also include receiving compliance data indicating that the entity has not complied with a condition of the insurance policy and causing display, via the user interface, of updated insurance-policy information including an updated payout value, the updated payout value being less than the payout value.

Additionally, or alternatively, the process 1600 may include causing display, via the user interface, of a second selectable portion indicating an option to verify that a second document is similar to the first document. The process 1600 may also include receiving second input data indicating selection of the second selectable portion and causing display of a third selectable portion requesting identification of the second document. The process 1600 may also include receiving third input data identifying the second document and causing display, via the user interface, of an indication that a first document obfuscation value associated with the first document has at least a threshold degree of similarity with a second document obfuscation value associated with the second document.

Figure 17:
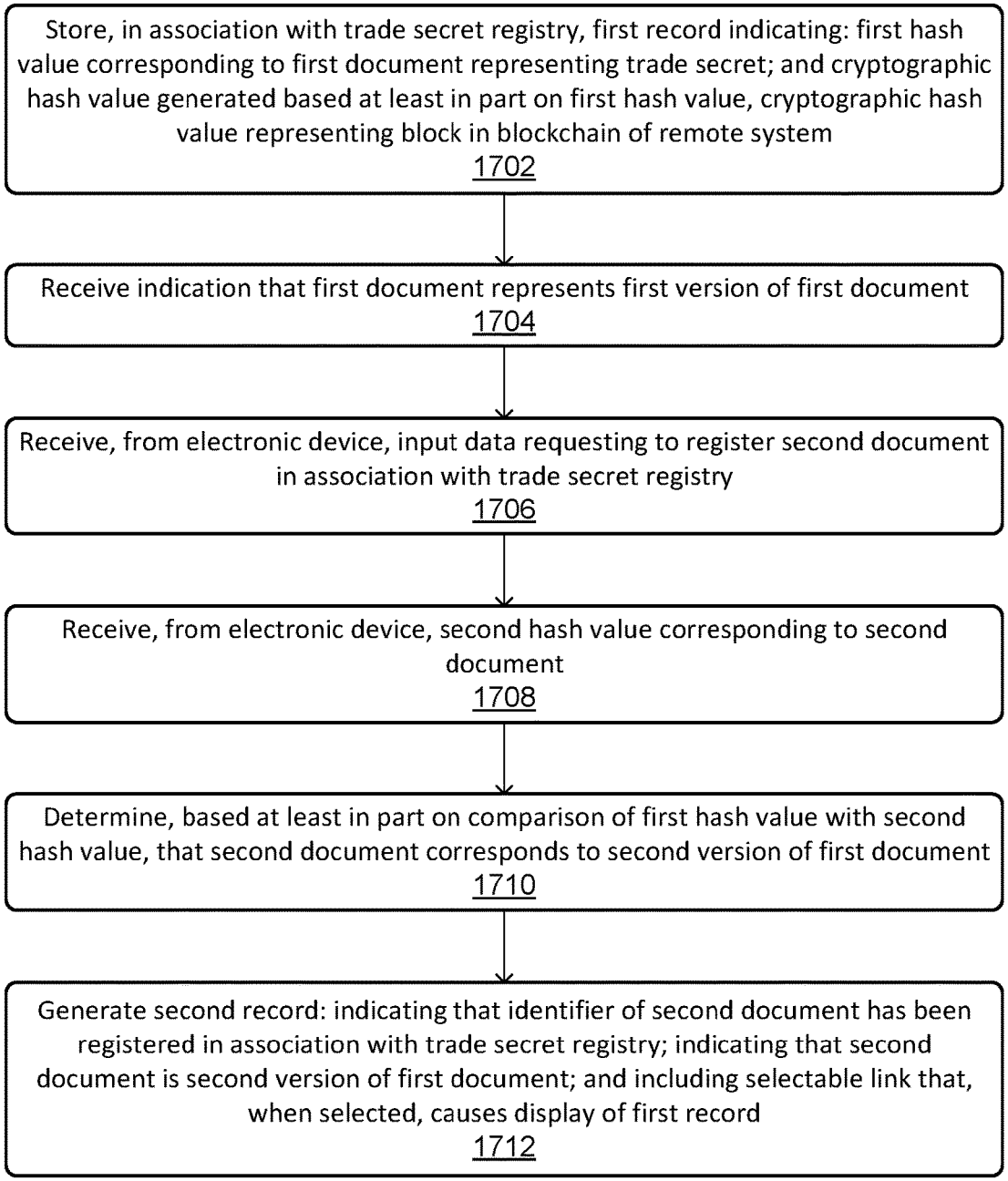
FIG. 17 illustrates a flow diagram of an example process for digital property management including document versioning.

FIG. 17 illustrates a flow diagram of an example process for digital property management including document versioning. The order in which the operations or steps are described is not intended to be construed as a limitation, and any number of the described operations may be combined in any order and/or in parallel to implement process 1700.

At block 1702, the process 1700 may include storing, in association with a trade secret registry, a first record indicating: a first document obfuscation value corresponding to a first document representing a trade secret; and a cryptographic document obfuscation value generated based at least in part on the first document obfuscation value, the cryptographic document obfuscation value representing a block in a blockchain of a remote system. For example, a system associated with the trade secret registry may store records corresponding to trade secrets registered with the trade secret registry. Those records may include information such as document obfuscation values generated based at least in part on documents representing the trade secrets. The document obfuscation values may be generated by an electronic device of a user and/or by the system associated with the trade secret registry. Additionally, the electronic device and/or the system may request that the trade secret and/or the document obfuscation value be registered in association with a blockchain of a remote system. The remote system may register such trade secrets and may generate cryptographic document obfuscation values representing blocks of the blockchain.

At block 1704, the process 1700 may include receiving an indication that the first document represents a first version of the first document. For example, the indication may be received from the electronic device. In other examples, the system may determine that the first document represents the first version.

At block 1706, the process 1700 may include receiving, from an electronic device, input data requesting to register a second document in association with the trade secret registry. For example, a communication component of the electronic device may send data indicating a request to register the second document in association with the trade secret registry.

At block 1708, the process 1700 may include receiving, from the electronic device, a second document obfuscation value corresponding to the second document. For example, the communication component may also send the document obfuscation value generated based at least in part on the second document. A obfuscation component may receive data corresponding to the document, such as from one or more databases and/or other storage locations associated with the electronic device and/or remote storage accessible by the electronic device. The obfuscation component may then generate a document obfuscation value corresponding to the document. In general, the obfuscation component may receive, as input, text data, image data, formatting data, and/or other data corresponding to the document, and may generate, as output, a document obfuscation value that corresponds to the input. In examples, the electronic device may include multiple obfuscation components that each employ a different hashing algorithm. In these examples, each obfuscation component may output a different document obfuscation value for the same document.

At block 1710, the process 1700 may include determining, based at least in part on a comparison of the first document obfuscation value with the second document obfuscation value, that the second document corresponds to a second version of the first document. For example, a versioning component may be configured to determine that two or more documents and/or trade secrets are versions of the same document and/or trade secret. For example, the results from a comparison component, as described more fully above with respect to FIG. 1, may be utilized to determine that two documents are similar in one or more respects but not the same. The versioning component may further receive, identify, determine, and/or generate information indicating that the two documents are associated with the same and/or a related entity identifier. The versioning component may further receive, identify, determine, and/or generate information indicating that the two documents are associated with the same or a similar trade-secret type. Utilizing some or all of this information, the versioning component may determine that the two documents are versions of the same document. An indication of this versioning may be stored with respect to the record(s) associated with the documents and/or a visual indication may be displayed via a user interface.

At block 1712, the process 1700 may include generating a second record: indicating that an identifier of the second document has been registered in association with the trade secret registry; indicating that the second document is the second version of the first document; and including a selectable link that, when selected, causes display of the first record. The record may include a record identifier, trade-secret details, and/or transaction details. The record identifier may include numbers and/or letters that identify the record with respect to the trade secret registry. The trade-secret details may, for example, include a naming indicator for the trade secret, a description of the trade secret, a naming indicator for the document representing the trade secret, and/or the tags generated as described elsewhere herein. The transaction details may include a status of the registration with the trade secret registry, the document obfuscation value, a block number associated with the block at which the trade secret is registered with the blockchain, the cryptographic document obfuscation value (also described as the block document obfuscation value), and/or the block timestamp. Other information that may be included in the record and displayed with respect to the user interface may include insurance policy details, valuation details, and/or other information associated with the trade secret, as described more fully elsewhere herein.

Additionally, or alternatively, the process 1700 may include storing first access-control data indicating a first identifier of a first person permitted to access the first record. The process 1700 may also include storing second access-control data indicating a second identifier of a second person permitted to access the second record. In these examples, the second access-control data may indicate that access to the first record is unpermitted by the second person. The process 1700 may also include receiving second input data requesting access to the second record, where the second input data indicates that the second person is requesting access to the second record. The process 1700 may also include causing display, based at least in part on the second input data, of the second record including the selectable link. The process 1700 may also include receiving third input data corresponding to selection of the selectable link and refraining from causing display of the first record based at least in part on the second access-control data indicating that access to the first record is unpermitted.

Additionally, or alternatively, the process 1700 may include associating, using a smart contract associated with the blockchain, the trade secret with an insurance policy, where the smart contract indicates a condition for validating the insurance policy. The process 1700 may also include receiving, from the electronic device, validation data indicating that the condition has been met and sending the validation data to the remote system associated with the insurer, where the validation data causes the smart contract to validate the insurance policy. The process 1700 may also include receiving, from the remote system, confirmation data indicating that the insurance policy has been validated utilizing the smart contract.

Additionally, or alternatively, the process 1700 may include receiving, from the electronic device, valuation data indicated to be relevant to a value of the trade secret. The process 1700 may also include receiving, from the electronic device, a third document obfuscation value corresponding to the valuation data and receiving, from at least one of the electronic device or the remote system, a second cryptographic document obfuscation value generated based at least in part on the third document obfuscation value. In these examples, the second cryptographic document obfuscation value may represent a second block in the blockchain. Additionally, the first record may include the third document obfuscation value and the second cryptographic document obfuscation value.

Additionally, or alternatively, the process 1700 may include associating a first feature vector with the first document based at least in part on first text data associated with the first document. The process 1700 may also include associating a second feature vector with the second document based at least in part on second text data associated with the second document. The process 1700 may also include determining that a distance between the first feature vector and the second feature vector is less than a threshold distance. In these examples, determining that the second document corresponds to the second version of the first document may be based at least in part on the distance being less than the threshold distance. In other examples, the process 1700 may include determining a number of other feature vectors within a threshold distance from the first feature vector and determining a popularity score to associate with the first document based at least in part on the number of the other feature vectors.

Additionally, or alternatively, the process 1700 may include receiving an indication of a trade-secret type associated with the trade secret and identifying a frequency at which versions of trade secrets associated with the trade-secret type are registered with the trade secret registry. The process 1700 may also include generating a version-registration alert based at least in part on the frequency and sending, to the electronic device, alert data representing the version-registration alert.

Additionally, or alternatively, the process 1700 may include determining a frequency at which versions of trade secrets are registered with the trade secret registry utilizing at least one of the electronic device or an entity identifier corresponding to an entity associated with the electronic device. The process 1700 may also include generating a version-registration alert based at least in part on the frequency and sending, to the electronic device, alert data representing the version-registration alert.

Figure 18:
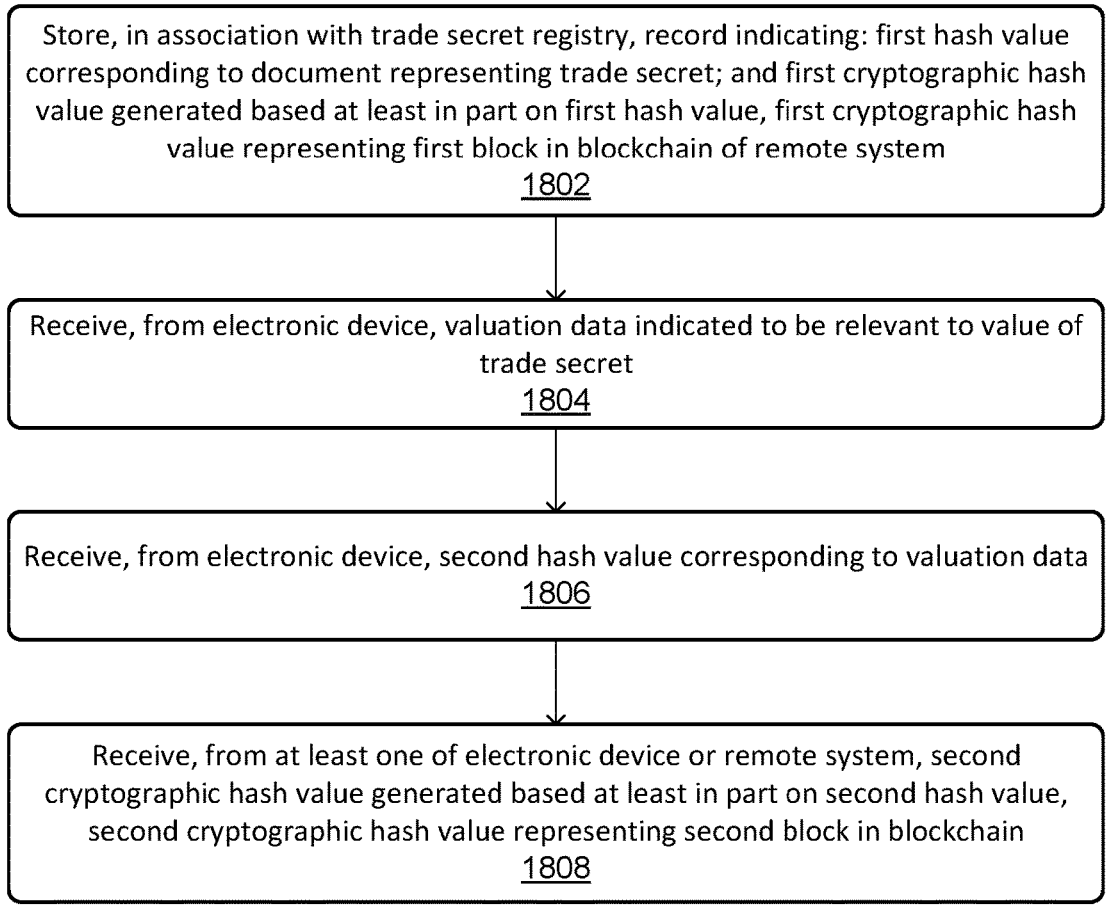
FIG. 18 illustrates a flow diagram of an example process for digital property management including trade-secret valuation.

FIG. 18 illustrates a flow diagram of an example process for digital property management including trade secret valuation. The order in which the operations or steps are described is not intended to be construed as a limitation, and any number of the described operations may be combined in any order and/or in parallel to implement process 1800.

At block 1802, the process 1800 may include storing, in association with a trade secret registry, a record indicating: a first document obfuscation value corresponding to a document representing a trade secret; and a first cryptographic document obfuscation value generated based at least in part on the first document obfuscation value, the first cryptographic document obfuscation value representing a first block in a blockchain of a remote system. For example, a system associated with the trade secret registry may store records corresponding to trade secrets registered with the trade secret registry. Those records may include information such as document obfuscation values generated based at least in part on documents representing the trade secrets. The document obfuscation values may be generated by an electronic device of a user and/or by the system associated with the trade secret registry. Additionally, the electronic device and/or the system may request that the trade secret and/or the document obfuscation value be registered in association with a blockchain of a remote system. The remote system may register such trade secrets and may generate cryptographic document obfuscation values representing blocks of the blockchain.

At block 1804, the process 1800 may include receiving, from an electronic device, valuation data indicated to be relevant to a value of the trade secret. For example, a user interface of the electronic device may include a selectable portion indicating an option to determine a value for the trade secret. Based at least in part on selection of the selectable portion, the user interface may display a sequence of dialog boxes and/or input fields requesting information associated with determining a value of the trade secret. For example, a valuation component may be configured to identify and/or determine a value to associate with a given trade secret. The information requested by the input fields may include, for example, the type of trade secret, an importance of the trade secret to the entity, entity revenue, entity value, date of trade secret creation, etc.

Additionally, in examples, the input fields may include a request for supporting documents that include information that may be relevant to valuation of the trade secret. In these examples, the user may identify the supporting documents. A document obfuscation value may be generated for a given supporting document and/or the supporting document and/or the document obfuscation value may be registered in association with the blockchain. The record for the trade secret may include information associated with the supporting document, such as the corresponding document obfuscation value and/or the cryptographic document obfuscation value corresponding to the block in the blockchain where the supporting document is registered.

In other examples, tag data generated as described herein may be utilized to determine some or all of the data described herein as being utilized to determine a value of a trade secret. For example, the tag data may be utilized to determine a trade-secret type. Trade secrets having the same or a similar type may be analyzed to determine a value for a trade secret in question.

At block 1806, the process 1800 may include receiving, from the electronic device, a second document obfuscation value corresponding to the valuation data. The document obfuscation value may be generated based at least in part on the valuation data and may be generated utilizing a obfuscation component as described elsewhere herein.

At block 1808, the process 1800 may include receiving, from at least one of the electronic device or the remote system, a second cryptographic document obfuscation value generated based at least in part on the second document obfuscation value, the second cryptographic document obfuscation value representing a second block in the blockchain. In these examples, the record may include the second document obfuscation value and the second cryptographic document obfuscation value. By so doing, the valuation data may be registered with the blockchain, which may lend support to the determination of the valuation at a given time.

Additionally, or alternatively, the process 1800 may include receiving an indication that the first document represents a first version of the first document and receiving, from the electronic device, input data requesting to register a second document in association with the trade secret registry. The process 1800 may also include receiving, from the electronic device, a third document obfuscation value corresponding to the second document and determining, based at least in part on a comparison of the first document obfuscation value with the third document obfuscation value, that the second document corresponds to a second version of the first document. The process 1800 may also include generating a second record indicating that an identifier of the second document has been registered in association with the trade secret registry and indicating that the second document corresponds to the second version of the first document.

Additionally, or alternatively, the process 1800 may include storing first access-control data indicating a first identifier of a first person permitted to access a first portion of the record. The process 1800 may also include storing second access-control data indicating a second identifier of a second person permitted to access a second portion of the record. In these examples, the second access-control data may indicate that access to the first portion is unpermitted by the second person. The process 1800 may also include receiving second input data requesting access to the second portion, where the second input data indicates that the second person is requesting access to the second record. The process 1800 may also include causing display, based at least in part on the second input data, of the second portion. The process 1800 may also include receiving third input data requesting access to the first portion of the record by the second person and refraining from causing display of the first portion based at least in part on the second access-control data indicating that access to the first portion is unpermitted.

Additionally, or alternatively, the process 1800 may include associating, using a smart contract associated with the blockchain, the trade secret with an insurance policy, where the smart contract indicates a condition for validating the insurance policy. The process 1800 may also include receiving, from the electronic device, validation data indicating that the condition has been met and sending the validation data to the remote system associated with the insurer, where the validation data causes the smart contract to validate the insurance policy. The process 1800 may also include receiving, from the remote system, confirmation data indicating that the insurance policy has been validated utilizing the smart contract.

Figure 19:
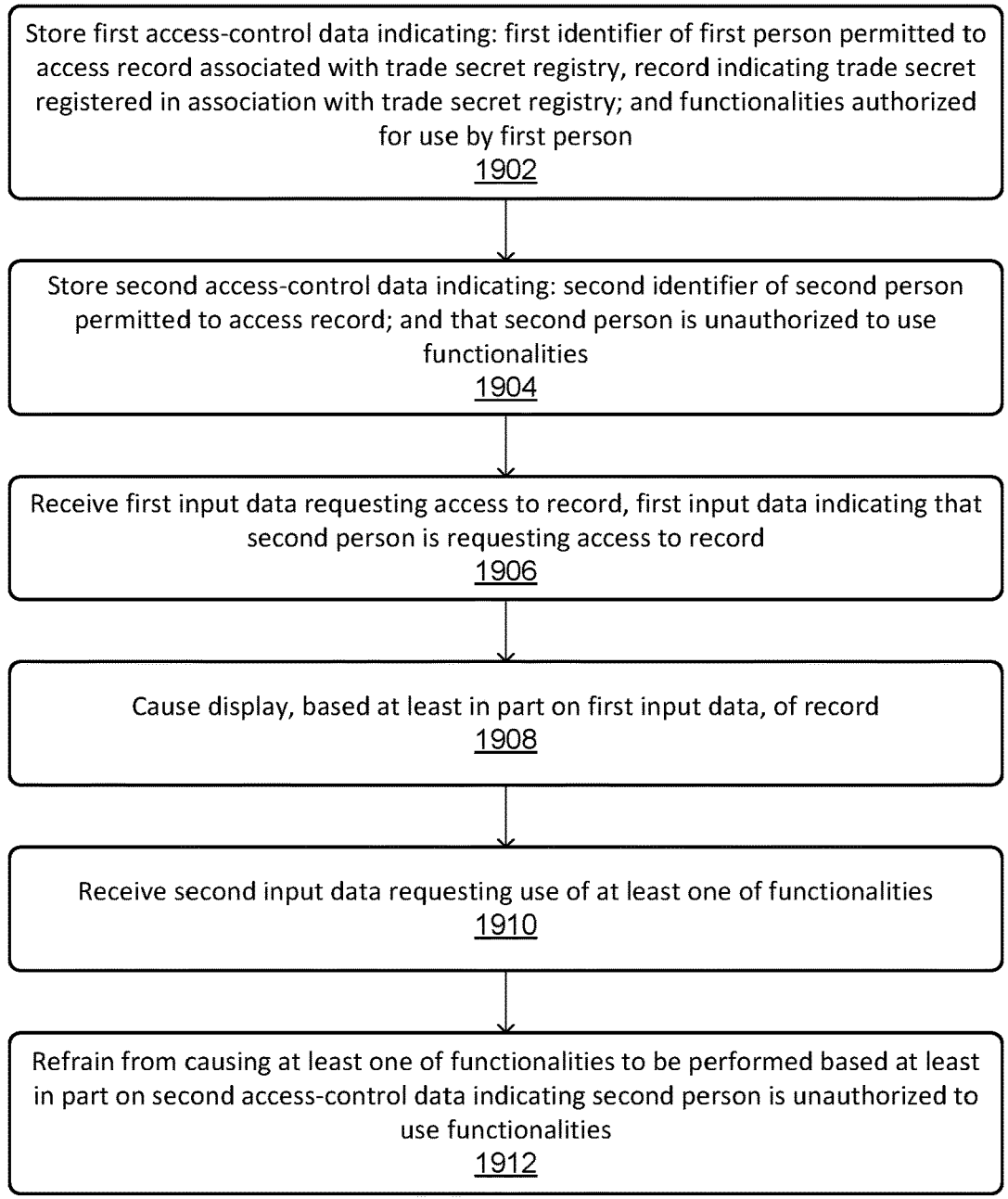
FIG. 19 illustrates a flow diagram of an example process for digital property management including access controls.

FIG. 19 illustrates a flow diagram of an example process for digital property management including access controls. The order in which the operations or steps are described is not intended to be construed as a limitation, and any number of the described operations may be combined in any order and/or in parallel to implement process 1900.

At block 1902, the process 1900 may include storing first access-control data indicating: a first identifier of a first person permitted to access a record associated with a trade secret registry, the record indicating a trade secret registered in association with the trade secret registry; and a functionality of the trade secret registry authorized for use by the first person. For example, the first access-control data may be stored in association with the remote system. The access-control data may indicate who is authorized to view a given record and/or given information associated with a record. In these examples, a user, to access a record, may be required to authenticate the user's identity, such as by inputting a username and/or password, for example. The functionalities may include, for example, the ability to view information, to manipulate information, to change access controls, etc.

At block 1904, the process 1900 may include storing second access-control data indicating: a second identifier of a second person permitted to access the record; and that the second person is unauthorized to use the functionality. The second access-control data may be stored in the same or a similar manner as the first access-control data.

At block 1906, the process 1900 may include receiving first input data requesting access to the record, the first input data indicating that the second person is requesting access to the record. The first input data may be received from an electronic device displaying a user interface that allows a user to enter authentication information to gain access to information associated with the trade secret registry.

At block 1908, the process 1900 may include causing display, based at least in part on the first input data, of the record. For example, given that the second access-control data indicates that the second person is authorized to view the record, display of the record may be permitted.

At block 1910, the process 1900 may include receiving second input data requesting use of the functionality. For example, the second person may provide input to the user interface of the electronic device to manipulate information associated with the record, such as one or more tags associated with the record.

At block 1912, the process 1900 may include refraining from causing the functionality to be performed based at least in part on the second access-control data indicating the second person is unauthorized to use the functionality. For example, given that the second access-control data indicates that the second person is unauthorized to utilize the functionalities, upon receiving input data requesting use of the functionality, the system may determine that such a request cannot be performed based at least in part on the second access-control data.

Additionally, or alternatively, the process 1900 may include receiving an indication that the first trade secret represents a first version of the first trade secret and receiving, from the electronic device, input data requesting to register a second trade secret in association with the trade secret registry. The process 1900 may also include receiving, from the electronic device, a document obfuscation value corresponding to the second trade secret and determining, based at least in part on a comparison of the document obfuscation values, that the second trade secret corresponds to a second version of the first trade secret. The process 1900 may also include generating a second record indicating that an identifier of the second trade secret has been registered in association with the trade secret registry and indicating that the second trade secret corresponds to the second version of the first trade secret.

Additionally, or alternatively, the process 1900 may include receiving, from the electronic device, valuation data indicated to be relevant to a value of the trade secret. The process 1900 may also include receiving, from the electronic device, a document obfuscation value corresponding to the valuation data and receiving, from at least one of the electronic device or the remote system, a cryptographic document obfuscation value generated based at least in part on the document obfuscation value. In these examples, the cryptographic document obfuscation value may represent a block in the blockchain. Additionally, the record may include the document obfuscation value and the cryptographic document obfuscation value.

Additionally, or alternatively, the process 1900 may include associating, using a smart contract associated with the blockchain, the trade secret with an insurance policy, where the smart contract indicates a condition for validating the insurance policy. The process 1900 may also include receiving, from the electronic device, validation data indicating that the condition has been met and sending the validation data to the remote system. The validation data may cause the smart contract to validate the insurance policy. The process 1900 may also include receiving, from the remote system, confirmation data indicating that the insurance policy has been validated utilizing the smart contract.

Additionally, or alternatively, the process 1900 may include generating a log of access to the record by one or more electronic devices. The log may indicate an identifier of individual ones of persons that accessed record and/or a time value at which the individual ones of the persons accessed the record. The process 1900 may also include receiving an indication that the first access-control data associated with the first person has been removed and generating alert data. The alert data may indicate that the first person had access to the record and one or more time values at which the first person accessed the record. The alert data may further request confirmation that the first person has undergone an exit interview associated with the trade secret.

Additionally, or alternatively, the process 1900 may include generating a log of access to the record by one or more electronic devices. The log may indicate an identifier of individual ones of persons that accessed record and/or a time value at which the individual ones of the persons accessed the record. The process 1900 may also include generating, based at least in part on the log, a compliance schedule associated with an insurance policy relating to the trade secret. The compliance schedule may indicate a time period during which compliance with a condition of the insurance policy may be performed by the first person. The process 1900 may also include determining that the condition is unsatisfied prior to the time period expiring and adjusting a payout value associated with the insurance policy based at least in part on determining that the condition is unsatisfied.

Additionally, or alternatively, the process 1900 may include generating an interface to the trade secret registry that is configured to allow access to at least a portion of the trade secret registry via a remote docketing system associated with intellectual property assets. The process 1900 may also include sending access information for the interface to the remote docketing system and receiving, from the remote docketing system, a request to perform a search of the trade secret registry. The request may include text data to be utilized to search the trade secret registry. The process 1900 may also include identifying results of the search and sending results data representing the results to the remote docketing system.

Additionally, or alternatively, the process 1900 may include generating a log of access to the record by one or more electronic devices and determining, based at least in part on the log, that the record has been accessed more than a threshold number of times during a time period. The process 1900 may also include generating, based at least in part on determining that the record has been accessed more than the threshold number of times during the time period, an alert indicating unusual activity with respect to the record. The process 1900 may also include sending alert data representing the alert to an electronic device associated with the record.

Figure 20:
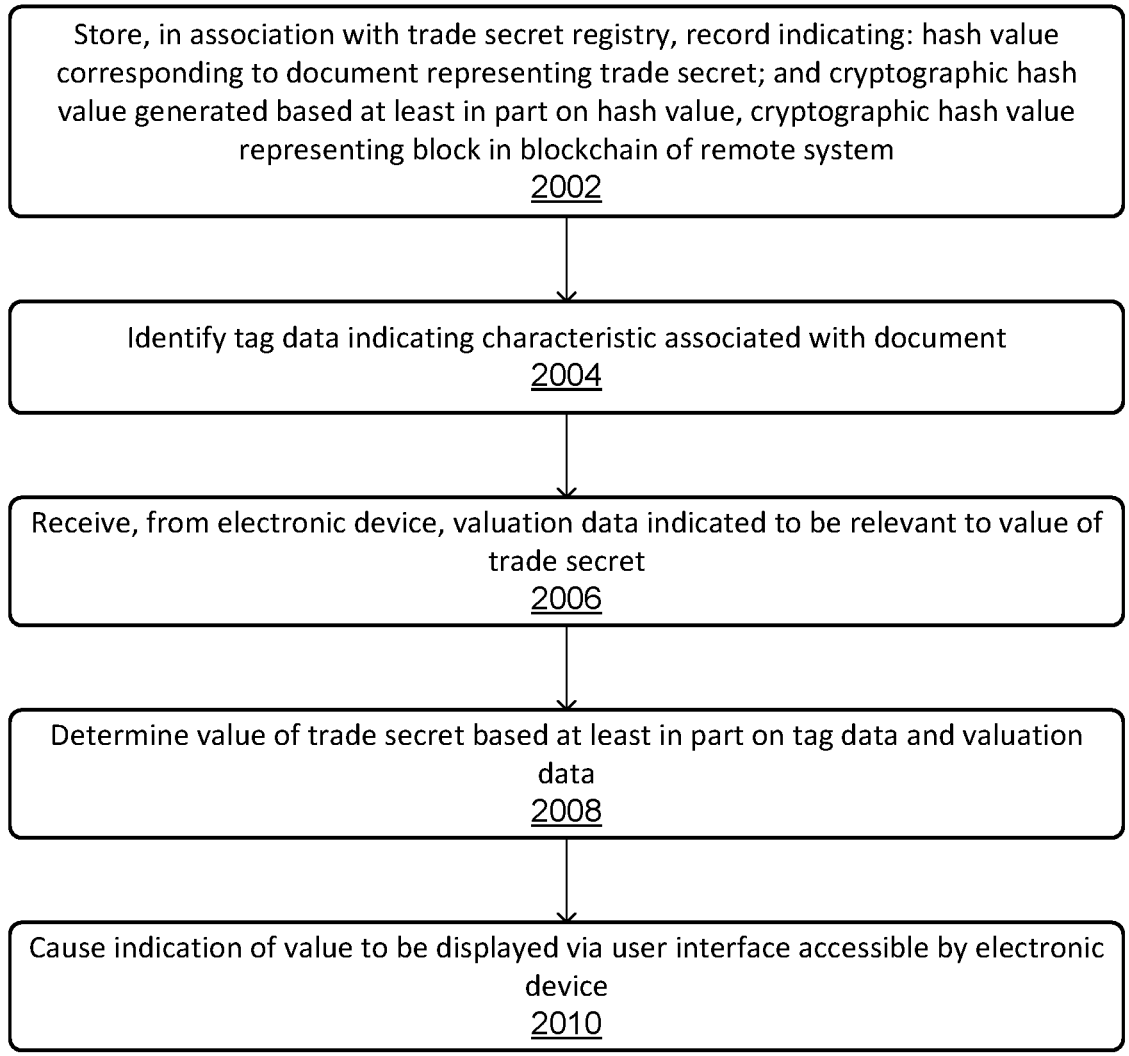
FIG. 20 illustrates a flow diagram of an example process for valuing property in accordance with a digital property authentication and management system.

FIG. 20 illustrates a flow diagram of an example process for valuing property in accordance with a digital property authentication and management system. The order in which the operations or steps are described is not intended to be construed as a limitation, and any number of the described operations may be combined in any order and/or in parallel to implement process 2000.

At block 2002, the process 2000 may include storing, in association with a trade secret registry, a record indicating: a document obfuscation value corresponding to a document representing a trade secret; and a cryptographic document obfuscation value generated based at least in part on the document obfuscation value, the cryptographic document obfuscation value representing a block in a blockchain of a remote system. For example, a system associated with the trade secret registry may store records corresponding to trade secrets registered with the trade secret registry. Those records may include information such as document obfuscation values generated based at least in part on documents representing the trade secrets. The document obfuscation values may be generated by an electronic device of a user and/or by the system associated with the trade secret registry. Additionally, the electronic device and/or the system may request that the trade secret and/or the document obfuscation value be registered in association with a blockchain of a remote system. The remote system may register such trade secrets and may generate cryptographic document obfuscation values representing blocks of the blockchain.

At block 2004, the process 2000 may include identifying tag data indicating a characteristic associated with the document. For example, a tag-data generator may be configured to generate tag data associated with the document. For example, one or more input fields may be caused to be displayed via user interface. The input fields may include a request to "tag" or otherwise provide keywords for the document. For example, a document that corresponds to source code to operate a sewing machine may be associated with keywords such as "source code," "sewing," "sewing machine," "version 1.1.20," etc. A user of the electronic device may input text corresponding to these tags and the tag-data generator may utilize such input to generate the tag data. Additionally, or alternatively, the tag-data generator may automatically generate tag data. For example, the tag-data generator may analyze the document to be registered in association with the trade secret registry to identify keywords associated with the document. For example, the tag-data generator may identify one or more fields of the document and/or values associated with those fields. By way of illustration, the tag-data generator may identify a title field, a document-type field, one or more sections of the document, etc. The values, such as the text data, associated with these fields may be utilized to generate tags. Additionally, or alternatively, text data of the document may be analyzed to determine which words are commonly used in the document. These words may be identified as keywords and may be utilized to generate the tag data.

At block 2006, the process 2000 may include receiving, from an electronic device, valuation data indicated to be relevant to a value of the trade secret. For example, a user interface of the electronic device may include a selectable portion indicating an option to determine a value for the trade secret. Based at least in part on selection of the selectable portion, the user interface may display a sequence of dialog boxes and/or input fields requesting information associated with determining a value of the trade secret. For example, a valuation component may be configured to identify and/or determine a value to associate with a given trade secret. The information requested by the input fields may include, for example, the type of trade secret, an importance of the trade secret to the entity, entity revenue, entity value, date of trade secret creation, etc.

Additionally, in examples, the input fields may include a request for supporting documents that include information that may be relevant to valuation of the trade secret. In these examples, the user may identify the supporting documents. A document obfuscation value may be generated for a given supporting document and/or the supporting document and/or the document obfuscation value may be registered in association with the blockchain. The record for the trade secret may include information associated with the supporting document, such as the corresponding document obfuscation value and/or the cryptographic document obfuscation value corresponding to the block in the blockchain where the supporting document is registered.

In other examples, tag data generated as described herein may be utilized to determine some or all of the data described herein as being utilized to determine a value of a trade secret. For example, the tag data may be utilized to determine a trade-secret type. Trade secrets having the same or a similar type may be analyzed to determine a value for a trade secret in question.

At block 2008, the process 2000 may include determining the value of the trade secret based at least in part on the tag data and the valuation data. For example, a valuation component may utilize some or all of the information described with respect to block 2006 to determine a value of the trade secret.

At block 2010, the process 2000 may include causing an indication of the value to be displayed via a user interface accessible by the electronic device. For example, valuation details may be generated and stored in association with the record corresponding to the trade secret. The valuation details may include the determined value, the trade-secret type, a creation date, an entity value, and/or a revenue value. Additionally, if supporting documents were provided to assist in the valuation determination, a selectable link to those documents may also be displayed in connection with the record.

Additionally, or alternatively, the process 2000 may include receiving, from at least one of the electronic device or another device, entity-value data indicating at least one of an entity value for an entity associated with the document or an earnings and/or revenue value for the entity. In these examples, determining the value of the trade secret may be based at least in part on the entity-value data.

Additionally, or alternatively, the process 2000 may include utilizing a time value associated with registration of the block in the blockchain when determining the value of the trade secret. In these examples, the value may increase as a period of time between the time value and a current time increases (either continuously, periodically, on a scheduled basis, or randomly).

Additionally, or alternatively, the process 2000 may include receiving, from the remote system, a second cryptographic document obfuscation value generated based at least in part on a second document obfuscation value corresponding to financial data associated with the trade secret. The second cryptographic document obfuscation value may represent a second block in the blockchain of the remote system. In these examples, determining the value of the trade secret may be based at least in part on receiving the second cryptographic document obfuscation value.

Figure 21:
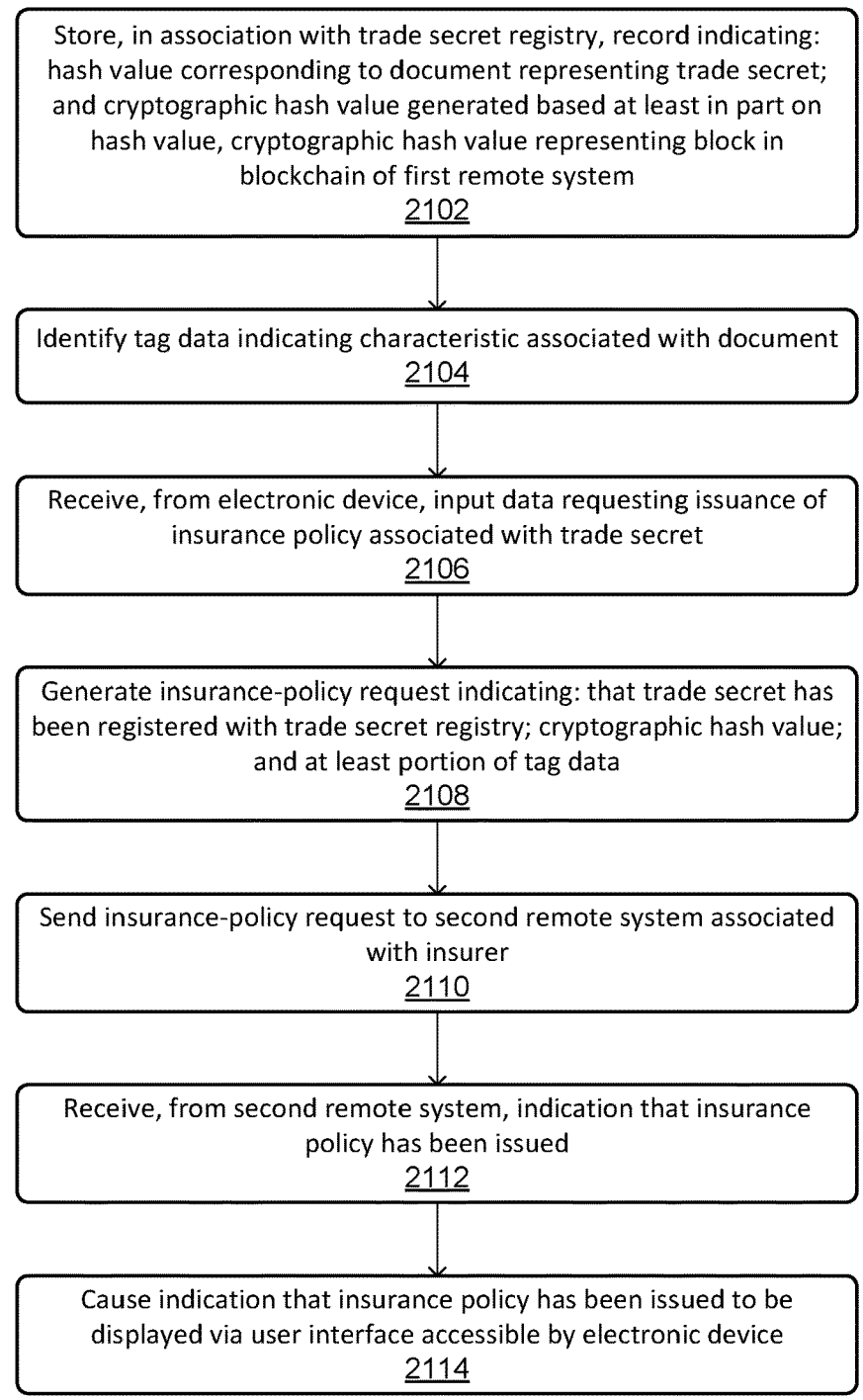
FIG. 21 illustrates a flow diagram of an example process for provision of insurance policies in accordance with a digital property authentication and management system.

FIG. 21 illustrates a flow diagram of an example process for provision of insurance policies in accordance with a digital property authentication and management system. The order in which the operations or steps are described is not intended to be construed as a limitation, and any number of the described operations may be combined in any order and/or in parallel to implement process 2100.

At block 2102, the process 2100 may include storing, in association with a trade secret registry, a record indicating: a document obfuscation value corresponding to a document representing a trade secret; and a cryptographic document obfuscation value generated based at least in part on the document obfuscation value, the cryptographic document obfuscation value representing a block in a blockchain of a registry system. Those records may include information such as document obfuscation values generated based at least in part on documents representing the trade secrets. The document obfuscation values may be generated by an electronic device of a user and/or by the system associated with the trade secret registry. Additionally, the electronic device and/or the system may request that the trade secret and/or the document obfuscation value be registered in association with a blockchain of a remote system. The remote system may register such trade secrets and may generate cryptographic document obfuscation values representing blocks of the blockchain.

At block 2104, the process 2100 may include identifying tag data indicating a characteristic associated with the document. For example, a tag-data generator may be configured to generate tag data associated with the document. For example, one or more input fields may be caused to be displayed via user interface. The input fields may include a request to "tag" or otherwise provide keywords for the document. For example, a document that corresponds to source code to operate a sewing machine may be associated with keywords such as "source code," "sewing," "sewing machine," "version 1.1.20," etc. A user of the electronic device may input text corresponding to these tags and the tag-data generator may utilize such input to generate the tag data. Additionally, or alternatively, the tag-data generator may automatically generate tag data. For example, the tag-data generator may analyze the document to be registered in association with the trade secret registry to identify keywords associated with the document. For example, the tag-data generator may identify one or more fields of the document and/or values associated with those fields. By way of illustration, the tag-data generator may identify a title field, a document-type field, one or more sections of the document, etc. The values, such as the text data, associated with these fields may be utilized to generate tags. Additionally, or alternatively, text data of the document may be analyzed to determine which words are commonly used in the document. These words may be identified as keywords and may be utilized to generate the tag data.

At block 2106, the process 2100 may include receiving, from an electronic device, input data requesting issuance of an insurance policy associated with the trade secret. For example, an electronic device may display a user interface that may include a selectable portion indicating an option to apply for or otherwise acquire an insurance policy. Upon selection of the selectable portion, the input data may be generated indicating that the user has selected the option to apply for the insurance policy.

At block 2108, the process 2100 may include generating an insurance-policy request indicating: that the trade secret has been registered with the trade secret registry; the cryptographic document obfuscation value; and at least a portion of the tag data. For example, a policy component may be configured to assist in the provision of one or more insurance policies for a given trade secret. The user interface may display one or more dialog boxes and/or input fields configured to receive user input regarding provision of an insurance policy. This information may include, for example, a trade-secret type or category, a value of the trade secret (either determined from above or identified by the user), a policy period, an entity value, a date of creation of the trade secret, and/or a portion enabling uploading of supporting and/or requested documentation. In examples where supporting documentation is provided, the supporting documentation may be registered with the blockchain in the same or a similar manner as described above with respect to the supporting document for trade secret valuation.

At block 2110, the process 2100 may include sending the insurance-policy request to a distributed-ledger system associated with an insurer. For example, the policy component, and/or a communications component, may be configured to receive input data corresponding to the user input and may send the input data to the distributed-ledger system, which is associated with an insurer. The distributed-ledger system may process the input data and, in examples, issue a policy insuring the trade secret from, for example, misappropriation.

At block 2112, the process 2100 may include receiving, from the distributed-ledger system, an indication that the insurance policy has been issued. In these examples, confirmation data indicating that the policy has been issued and information associated with the policy may be received from the distributed-ledger system. This information may be incorporated into the record associated with the trade secret and may be displayed via the user interface, in examples. Some nonlimiting examples of information associated with the insurance policy may include a policy type, a limit of liability, a retention value, a policy premium, a policy form, a policy number, a policy period, a sub-limit of liability, and/or a valuation of the trade secret. Additionally, or alternatively, the information may include a payout value associated with an amount of money to be paid to the entity associated with the trade secret upon the occurrence of an event. In these examples, the policy component may receive compliance data indicating that the entity has not complied with a condition of the insurance policy and may cause display of updated insurance-policy information including an updated payout value. In these examples, the updated payout value may be less than the original payout value. As the condition is met, the payout value may be updated to reflect compliance with the condition of the insurance policy.

At block 2114, the process 2100 may include causing the indication that the insurance policy has been issued to be displayed via a user interface accessible by the electronic device. For example, the information associated with the policy may be incorporated into the record associated with the trade secret and may be displayed via the user interface, in examples.

Additionally, or alternatively, the process 2100 may include generating a log of access to the record by one or more electronic devices. The log may indicate an identifier of individual ones of persons that accessed the record and/or a time value at which the individual ones of the persons accessed the record. The process 2100 may also include generating, based at least in part on the log, a compliance schedule associated with the insurance policy. The compliance schedule may indicate a time period during which compliance with a condition of the insurance policy may be performed by at least one of the persons. The process 2100 may also include determining that the condition is unsatisfied prior to the time period expiring and adjusting a payout value associated with the insurance policy based at least in part on determining that the condition is unsatisfied. The process 2100 may also include generating, based at least in part on determining that the condition is unsatisfied, alert data indicating that the condition is unsatisfied and sending the alert data to the one or more electronic devices. In these examples, the alert data may cause a processor of the one or more electronic devices to initiate an application and display an alert corresponding to the alert data.

Additionally, or alternatively, the process 2100 may include receiving, from the remote system, a second cryptographic document obfuscation value generated based at least in part on a second document obfuscation value corresponding to financial data associated with the trade secret. The second cryptographic document obfuscation value may represent a second block in the blockchain of the remote system. In these examples, the insurance-policy request may include the second cryptographic document obfuscation value and/or an indication thereof.

Additionally, or alternatively, the process 2100 may include determining, based at least in part on the record, a value of the trade secret. In these examples, the insurance-policy request includes the value of the trade secret.

Figure 22:
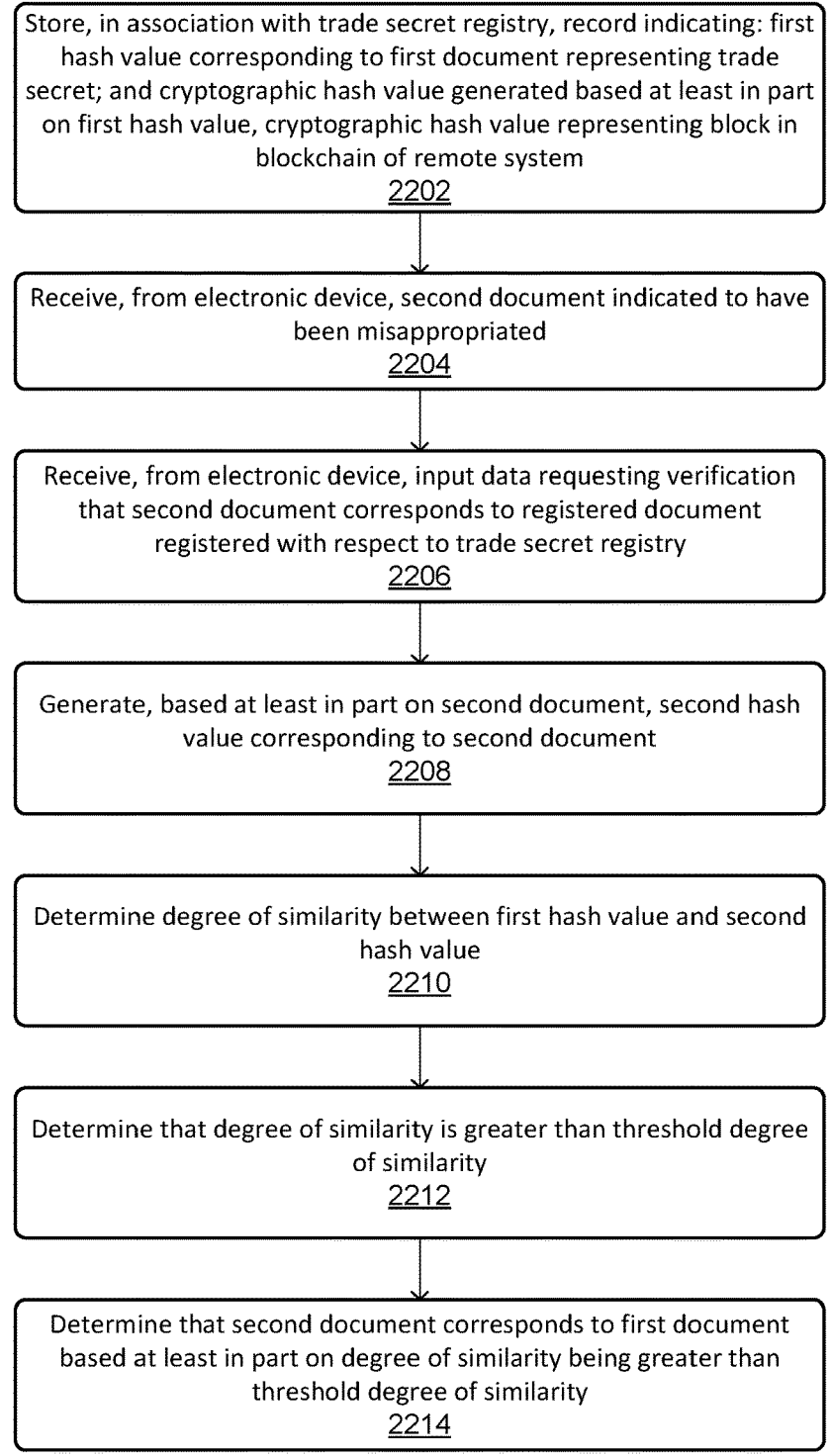
FIG. 22 illustrates a flow diagram of an example process for registration verification in accordance with a digital property authentication and management system.

FIG. 22 illustrates a flow diagram of an example process for property verification in accordance with a digital property authentication and management system. The order in which the operations or steps are described is not intended to be construed as a limitation, and any number of the described operations may be combined in any order and/or in parallel to implement process 2200.

At block 2202, the process 2200 may include storing, in association with a trade secret registry, a record indicating: a first document obfuscation value corresponding to a first document representing a trade secret; and a cryptographic document obfuscation value generated based at least in part on the first document obfuscation value, the cryptographic document obfuscation value representing a block in a blockchain of a remote system. Those records may include information such as document obfuscation values generated based at least in part on documents representing the trade secrets. The document obfuscation values may be generated by an electronic device of a user and/or by the system associated with the trade secret registry. Additionally, the electronic device and/or the system may request that the trade secret and/or the document obfuscation value be registered in association with a blockchain of a remote system. The remote system may register such trade secrets and may generate cryptographic document obfuscation values representing blocks of the blockchain.

At block 2204, the process 2200 may include receiving, from an electronic device, a second document indicated to have been misappropriated. For example, the accused document may be identified, such as via a user interface of the electronic device.

At block 2206, the process 2200 may include receiving, from the electronic device, input data requesting verification that the second document corresponds to a registered document registered with respect to the trade secret registry. The input data may be received from the electronic device displaying the user interface.

At block 2208, the process 2200 may include generating, based at least in part on the second document, a second document obfuscation value corresponding to the second document. For example, a document obfuscation value may be generated for the accused document in the same or a similar manner as described above with respect to the obfuscation component(s). The verification component may be utilized to analyze the document obfuscation value for the accused document with respect to other document obfuscation values of registered documents.

At block 2210, the process 2200 may include determining a degree of similarity between the first document obfuscation value and the second document obfuscation value. For example, a comparison component may be configured to analyze the document obfuscation values and determine degrees of similarity and/or degrees or differences between the document obfuscation values and/or the documents corresponding to the document obfuscation values. In other examples, a feature vector may be associated with some or all of the document obfuscation values. The feature vector may correspond to characteristics of the document obfuscation value and/or the document. For example, the presence or absence of text data and/or image data from the document may impact the feature vector. In other examples, the text data and/or image data itself may impact the feature vector. Other factors such as document length, the entity associated with the document, creation date, modification date, and/or other metadata may impact the feature vector. By way of example, a feature may be described as an individual measurable property or characteristic of a document. A given feature may be numeric and/or may be considered a string and/or a graphic. A set of such features may be described as a feature vector. As such, similar feature vectors indicate similar characteristics and/or properties of the documents they represent.

In other examples, Levenshtein distances may be utilized to determine a degree of similarity between trade secrets. A Levenshtein distance may be determined between two document obfuscation values and/or documents. A shorter Levenshtein distance may indicate more similarity than a longer Levenshtein distance. As used herein, a Levenshtein distance, also known as an edit distance, may be described as a string metric for measuring the difference between two sequences. For example, the Levenshtein distance between two words may be considered the minimum number of single-character edits to change one word into the other. As such, the Levenshtein distance between two very similar words would be shorter than a Levenshtein distance between two very different words. In these examples, a Levenshtein distance may be determined between two documents and/or two document obfuscation values representing those documents, with shorter Levenshtein distances indicating more similarity between documents.

At block 2212, the process 2200 may include determining that the degree of similarity is greater than a threshold degree of similarity. For example, a threshold degree of similarity may be identified and/or determined and the degree of similarity between document obfuscation values may be compared to the threshold degree of similarity. Document obfuscation values with a degree of similarity that meets or exceeds the threshold degree of similarity may be determined to be similar, while hash-value pairs that fall below the threshold degree of similarity may be determined to be dissimilar. Additionally, document obfuscation values may be segmented and the segments may be compared to determine portions of the document obfuscation values that are similar and portions that are not. The number of similar versus dissimilar document obfuscation values may be utilized to determine an overall degree of similarity between document obfuscation values. By way of additional example, the process 2200 may include determining that a Levenshtein distance between first characteristics of the first document and second characteristics of the second document is less than a threshold Levenshtein distance.

At block 2214, the process 2200 may include determining that the second document corresponds to the first document based at least in part on the degree of similarity being greater than the threshold degree of similarity. If the verification component determines that at least one of the registered document obfuscation values matches the document obfuscation value for the accused document, the verification component may determine that the accused document is the same or similar to the registered document. In other examples, the verification component may determine a degree of similarity between the accused document and one or more registered documents. In these examples, the accused document may be determined to be similar to a registered document when the degree of similarity meets or exceeds a threshold degree of similarity. In still other examples, the verification component may be configured to determine which portions of an accused document match or are similar to at least one registered document. An indication of the matching or similar portions may be displayed, such as via the user interface. Additionally, in instances where multiple versions of a document have been registered, the verification component may be configured to determine which of the multiple versions is most similar to the accused document, and may provide an indication of the version that is most similar.

Additionally, or alternatively, the process 2200 may include sending, to a remote system associated with the blockchain, a request to identify a second cryptographic document obfuscation value corresponding to the second document and/or a second hash corresponding to the second document. The process 2200 may also include receiving the second cryptographic document obfuscation value and determining that the first cryptographic document obfuscation value corresponds to the second cryptographic document obfuscation value. In these examples, determining that the second document corresponds to the first document may be based at least in part on the first cryptographic document obfuscation value corresponding to the second cryptographic document obfuscation value.

Figure 23:
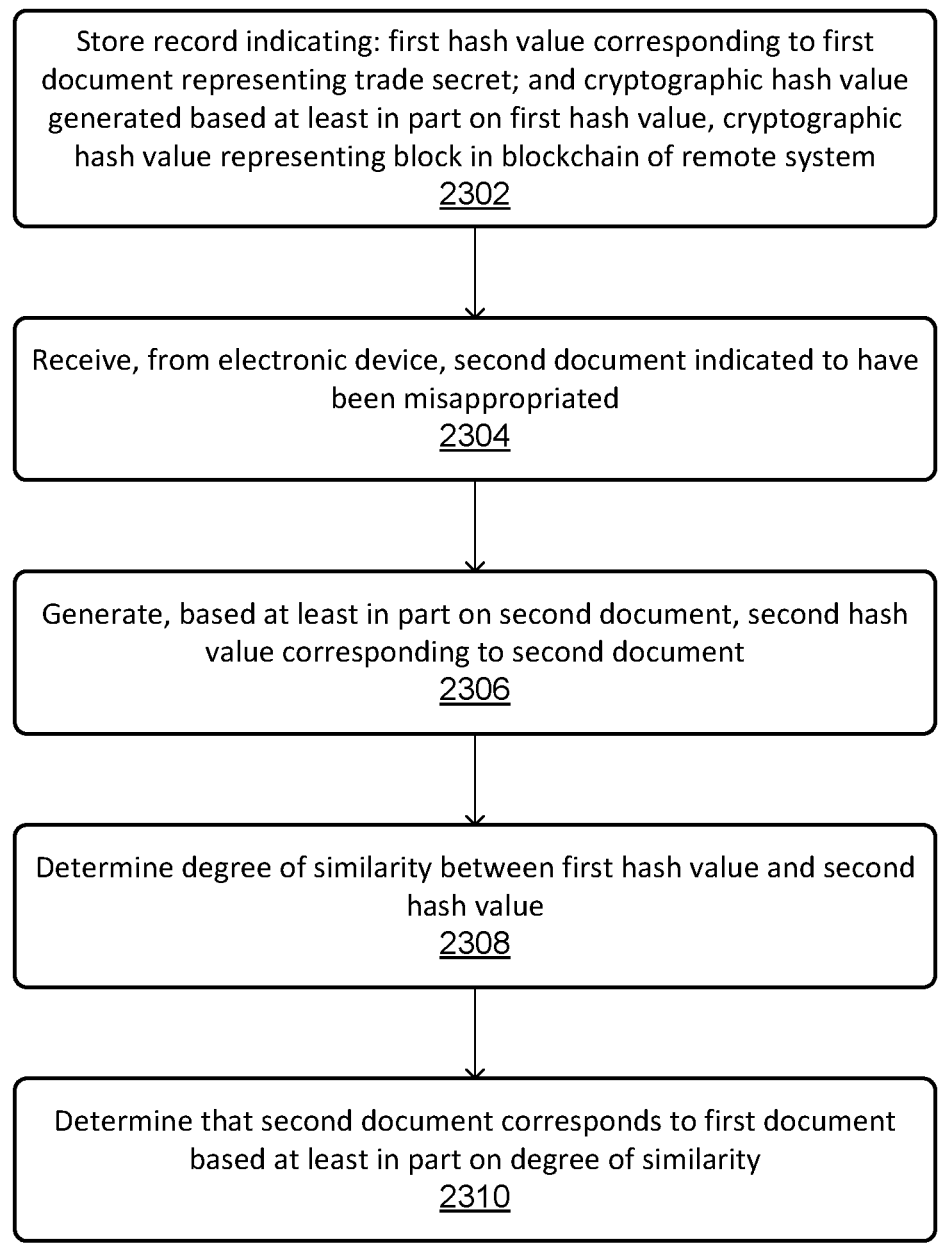
FIG. 23 illustrates a flow diagram of another example process for registration verification in accordance with a digital property authentication and management system.

FIG. 23 illustrates a flow diagram of another example process for property verification in accordance with a digital property authentication and management system. The order in which the operations or steps are described is not intended to be construed as a limitation, and any number of the described operations may be combined in any order and/or in parallel to implement process 2300.

At block 2302, the process 2300 may include storing a record indicating: a first document obfuscation value corresponding to a first document representing a trade secret; and a cryptographic document obfuscation value generated based at least in part on the first document obfuscation value, the cryptographic document obfuscation value representing a block in a blockchain of a remote system. Those records may include information such as document obfuscation values generated based at least in part on documents representing the trade secrets. The document obfuscation values may be generated by an electronic device of a user and/or by the system associated with the trade secret registry. Additionally, the electronic device and/or the system may request that the trade secret and/or the document obfuscation value be registered in association with a blockchain of a remote system. The remote system may register such trade secrets and may generate cryptographic document obfuscation values representing blocks of the blockchain.

At block 2304, the process 2300 may include receiving, from an electronic device, a second document indicated to have been misappropriated. For example, the accused document may be identified, such as via a user interface of the electronic device.

At block 2306, the process 2300 may include generating, based at least in part on the second document, a second document obfuscation value corresponding to the second document. For example, a document obfuscation value may be generated for the accused document in the same or a similar manner as described above with respect to the obfuscation component(s). The verification component may be utilized to analyze the document obfuscation value for the accused document with respect to other document obfuscation values of registered documents.

At block 2308, the process 2300 may include determining a degree of similarity between the first document obfuscation value and the second document obfuscation value. For example, a comparison component may be configured to analyze the document obfuscation values and determine degrees of similarity and/or degrees or differences between the document obfuscation values and/or the documents corresponding to the document obfuscation values. In other examples, a feature vector may be associated with some or all of the document obfuscation values. The feature vector may correspond to characteristics of the document obfuscation value and/or the document. For example, the presence or absence of text data and/or image data from the document may impact the feature vector. In other examples, the text data and/or image data itself may impact the feature vector. Other factors such as document length, the entity associated with the document, creation date, modification date, and/or other metadata may impact the feature vector. By way of example, a feature may be described as an individual measurable property or characteristic of a document. A given feature may be numeric and/or may be considered a string and/or a graphic. A set of such features may be described as a feature vector. As such, similar feature vectors indicate similar characteristics and/or properties of the documents they represent.

In other examples, Levenshtein distances may be utilized to determine a degree of similarity between trade secrets. A Levenshtein distance may be determined between two document obfuscation values and/or documents. A shorter Levenshtein distance may indicate more similarity than a longer Levenshtein distance. As used herein, a Levenshtein distance, also known as an edit distance, may be described as a string metric for measuring the difference between two sequences. For example, the Levenshtein distance between two words may be considered the minimum number of single-character edits to change one word into the other. As such, the Levenshtein distance between two very similar words would be shorter than a Levenshtein distance between two very different words. In these examples, a Levenshtein distance may be determined between two documents and/or two document obfuscation values representing those documents, with shorter Levenshtein distances indicating more similarity between documents.

At block 2310, the process 2300 may include determining that the second document corresponds to the first document based at least in part on the degree of similarity. If the verification component determines that at least one of the registered document obfuscation values matches the document obfuscation value for the accused document, the verification component may determine that the accused document is the same or similar to the registered document. In other examples, the verification component may determine a degree of similarity between the accused document and one or more registered documents. In these examples, the accused document may be determined to be similar to a registered document when the degree of similarity meets or exceeds a threshold degree of similarity. In still other examples, the verification component may be configured to determine which portions of an accused document match or are similar to at least one registered document. An indication of the matching or similar portions may be displayed, such as via the user interface. Additionally, in instances where multiple versions of a document have been registered, the verification component may be configured to determine which of the multiple versions is most similar to the accused document, and may provide an indication of the version that is most similar.

Additionally, or alternatively, the process 2300 may include sending, to a remote system associated with the blockchain, a request to identify a second cryptographic document obfuscation value corresponding to the second document and/or a second hash corresponding to the second document. The process 2300 may also include receiving the second cryptographic document obfuscation value and determining that the first cryptographic document obfuscation value corresponds to the second cryptographic document obfuscation value. In these examples, determining that the second document corresponds to the first document may be based at least in part on the first cryptographic document obfuscation value corresponding to the second cryptographic document obfuscation value.

Additionally, or alternatively, the process 2300 may include storing a second record associated with a second version of the first document, where the second record may be associated with the first record based at least in part on the second record being associated with the second version of the first document. The process 2300 may also include determining a second degree of similarity between a third document obfuscation value corresponding to the second version of the first document and the second document obfuscation value. In these examples, determining that the second document corresponds to the first document may include determining that the second document corresponds to the second version of the first document based at least in part on the second degree of similarity.

Additionally, or alternatively, the process 2300 may include causing a sequence of dialog boxes to be displayed via a user interface of the electronic device. Causing the sequence of dialog boxes to be displayed may be based at least in part on determining that the second document corresponds to the first document. In these examples, the sequence of dialog boxes may include text associated with submitting a claim for insurance coverage in association with an insurance policy for the trade secret. The process 2300 may also include receiving input data including a response to the text and sending, to a distributed-ledger system associated with an insurer, at least one of the input data and/or a notification of the claims. The process 2300 may also include receiving, from the distributed-ledger system, status data indicating that information is requested to process the claim. The process 2300 may also include sending, to the electronic device, an alert indicating that the information is requested, where the alert includes a selectable portion. The process 2300 may also include causing display, via a user interface and based at least in part on receiving an indication that the selectable portion has been selected, of a request for the information.

Additionally, or alternatively, the process 2300 may include determining a first portion of the first document obfuscation value that corresponds to a second portion of the second document obfuscation value and identifying a third portion of the first document that corresponds to the first portion of the first document obfuscation value. The process 2300 may also include causing display, via the user interface and based at least in part on identifying the third portion, of an indication that the third portion of the first document is similar to at least a portion of the second document.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:
1. A system, comprising:
    one or more processors; and
    non-transitory computer-readable media storing computer-executable instructions that, when executed by the one or more processors, cause the one or more processors to perform operations comprising:
        storing, in association with a trade secret registry, a record indicating:
            a first document obfuscation value corresponding to a first document representing a trade secret; and
            a first block value generated based at least in part on the first document obfuscation value, the first block value representing a first block in a blockchain of a distributed-ledger system;
        receiving, from an electronic device, a second document indicated to have been misappropriated;
        receiving, from the electronic device, input data requesting verification that the second document corresponds to a registered document registered with respect to the trade secret registry;

generating, based at least in part on the second document, a second document obfuscation value corresponding to the second document;

determining a degree of similarity between the first document obfuscation value and the second document obfuscation value;

determining that the degree of similarity is greater than a threshold degree of similarity;

sending, to the distributed-ledger system, the second document obfuscation value;

sending, to the distributed-ledger system, a request to identify a second block value corresponding to the second document obfuscation value, the second block value representing a second block in the blockchain;

receiving, from the distributed-ledger system, the second block value;

determining that the first block value corresponds to the second block value; and determining that the second document corresponds to the first document based at least in part on: (1) the degree of similarity being greater than the threshold degree of similarity; and (2) the first block value corresponding to the second block value.

2. The system of claim 1, the operations further comprising:

causing the first document obfuscation value to be segmented into first segments, individual ones of the first segments corresponding to portions of the first document;

causing the second document obfuscation value to be segmented into second segments, individual ones of the second segments corresponding to portions of the second document;

wherein determining the degree of similarity comprises determining the degree of similarity based at least in part on analyzing the first segments with respect to the second segments; and wherein determining that the degree of similarity is greater than the threshold degree of similarity comprises determining that the degree of similarity is greater than the threshold degree of similarity based at least in part on a number of the first segments corresponding to the second segments being greater than a threshold number of segments.

3. The system of claim 1, the operations further comprising:

determining a Levenshtein distance between first characteristics of the first document and second characteristics of the second document;

wherein determining the degree of similarity comprises determining the degree of similarity based at least in part on the Levenshtein distance; and wherein determining that the degree of similarity is greater than the threshold degree of similarity comprises determining that the degree of similarity is greater than the threshold degree of similarity based at least in part on the Levenshtein distance being less than a threshold Levenshtein distance.

4. A method, comprising:
storing a record indicating:
a first document obfuscation value corresponding to a first document representing a trade secret; and
a block value generated based at least in part on the first document obfuscation value, the block value representing a block in a blockchain of a distributed-ledger system;

receiving, from an electronic device, a second document indicated to have been misappropriated;

generating, based at least in part on the second document, a second document obfuscation value corresponding to the second document;

determining a degree of similarity between the first document obfuscation value and the second document obfuscation value;

determining that the second document corresponds to the first document based at least in part on the degree of similarity;

based at least in part on determining that the second document corresponds to the first document, causing a sequence of dialog boxes to be displayed via a user interface of the electronic device, the sequence of dialog boxes including text associated with submitting a claim for insurance coverage in association with an insurance policy for the trade secret;

receiving input data including a response to the text; and sending, to an insurer system associated with an insurer, at least one of the input data or a notification of the claim.

5. The method of claim 4, further comprising:

causing the first document obfuscation value to be segmented into first segments;

causing the second document obfuscation value to be segmented into second segments; and wherein determining the degree of similarity comprises determining the degree of similarity based at least in part on determining a number of the first segments corresponding to the second segments.

6. The method of claim 4, further comprising:

determining a Levenshtein distance between first characteristics of the first document and second characteristics of the second document; and wherein determining the degree of similarity comprises determining the degree of similarity based at least in part on the Levenshtein distance.

7. The method of claim 4, wherein the block value comprises a first block value, and the method further comprises:

receiving, from the distributed-ledger system, a second block value corresponding to the second document obfuscation value;

determining that the first block value corresponds to the second block value; and wherein determining that the second document corresponds to the first document comprises determining that the second document corresponds to the first document based at least in part on the first block value corresponding to the second block value.

8. The method of claim 4, wherein the record comprises a first record, the first record is associated with a first version of the first document, the degree of similarity comprises a first degree of similarity, and the method further comprises:

storing a second record associated with a second version of the first document, the second record associated with the first record based at least in part on the second record being associated with the second version of the first document;

determining a second degree of similarity between a third document obfuscation value corresponding to the second version of the first document and the second document obfuscation value; and wherein determining that the second document corresponds to the first document comprises determining that the second document corresponds to the second version of the first document based at least in part on the second degree of similarity.

9. The method of claim 4, further comprising: receiving, from the insurer system, status data indicating that information is requested to process the claim; sending, to the electronic device, an alert indicating that the information is requested; and causing display, via a user interface, of a request for the information.

10. The method of claim 4, further comprising:
determining a first portion of the first document obfuscation value that corresponds to a second portion of the second document obfuscation value;
identifying a third portion of the first document that corresponds to the first portion of the first document obfuscation value; and
causing display, via a user interface and based at least in part on identifying the third portion, of an indication that the third portion of the first document is similar to at least a portion of the second document.

11. A system comprising:
one or more processors; and
non-transitory computer-readable media storing computer-executable instructions that, when executed by the one or more processors, cause the one or more processors to perform operations comprising:
    storing a record indicating:
        a first document obfuscation value corresponding to a first document corresponding to a trade secret; and
        a block value generated based at least in part on the first document obfuscation value, the block value representing a block in a blockchain of a distributed-ledger system;
    receiving, from an electronic device, a second document indicated to have been misappropriated;
    generating, based at least in part on the second document, a second document obfuscation value corresponding to the second document;
    determining a degree of similarity between the first document obfuscation value and the second document obfuscation value;
    determining that the second document corresponds to the first document based at least in part on the degree of similarity;
    determining a first portion of the first document obfuscation value that corresponds to a second portion of the second document obfuscation value;
    identifying a third portion of the first document that corresponds to the first portion of the first document obfuscation value; and
    causing display, via a user interface and based at least in part on identifying the third portion, of an indication that the third portion of the first document is similar to at least a portion of the second document.

12. The system of claim 11, the operations further comprising:
    causing the first document obfuscation value to be segmented into first segments;
    causing the second document obfuscation value to be segmented into second segments; and
    wherein determining the degree of similarity comprises determining the degree of similarity based at least in part on determining a number of the first segments corresponding to the second segments.

13. The system of claim 11, the operations further comprising:
    determining a Levenshtein distance between first characteristics of the first document and second characteristics of the second document; and
    wherein determining the degree of similarity comprises determining the degree of similarity based at least in part on the Levenshtein distance.

14. The system of claim 11, wherein the block value comprises a first block value, and the operations further comprise:
    receiving, from the distributed-ledger system, a second block value corresponding to the second document obfuscation value;
    determining that the first block value corresponds to the second block value; and
    wherein determining that the second document corresponds to the first document comprises determining that the second document corresponds to the first document based at least in part on the first block value corresponding to the second block value.

15. The system of claim 11, wherein the record comprises a first record, the first record is associated with a first version of the first document, the degree of similarity comprises a first degree of similarity, and the operations further comprise:
    storing a second record associated with a second version of the first document, the second record associated with the first record based at least in part on the second record being associated with the second version of the first document;
    determining a second degree of similarity between a third document obfuscation value corresponding to the second version of the first document and the second document obfuscation value; and
    wherein determining that the second document corresponds to the first document comprises determining that the second document corresponds to the second version of the first document based at least in part on the second degree of similarity.

16. The system of claim 11, the operations further comprising:
    based at least in part on determining that the second document corresponds to the first document, causing a sequence of dialog boxes to be displayed via a user interface of the electronic device, the sequence of dialog boxes including text associated with submitting a claim for insurance coverage in association with an insurance policy for the trade secret;
    receiving input data including a response to the text; and
    sending, to an insurer system associated with an insurer that issued the insurance policy, at least one of the input data or a notification of the claim.

17. The system of claim 16, the operations further comprising:
    receiving, from the insurer system, status data indicating that information is requested to process the claim;
    sending, to the electronic device, an alert indicating that the information is requested; and
    causing display, via a user interface, of a request for the information.

* * * * *